(12) United States Patent
Okamura et al.

(10) Patent No.: US 12,466,185 B2
(45) Date of Patent: Nov. 11, 2025

(54) LIQUID EJECTING APPARATUS

(71) Applicant: SEIKO EPSON CORPORATION, Tokyo (JP)

(72) Inventors: Yu Okamura, Matsumoto (JP); Yoshiki Sugawara, Mikawa (JP)

(73) Assignee: SEIKO EPSON CORPORATION (JP)

( * ) Notice: Subject to any disclaimer, the term of this patent is extended or adjusted under 35 U.S.C. 154(b) by 202 days.

(21) Appl. No.: 18/454,918

(22) Filed: Aug. 24, 2023

(65) Prior Publication Data
US 2024/0066869 A1    Feb. 29, 2024

(30) Foreign Application Priority Data
Aug. 25, 2022   (JP) ................. 2022-134529

(51) Int. Cl.
*B41J 2/14* (2006.01)
*B41J 2/145* (2006.01)

(52) U.S. Cl.
CPC ...... *B41J 2/145* (2013.01); *B41J 2002/14362* (2013.01); *B41J 2202/19* (2013.01)

(58) Field of Classification Search
CPC .............. B41J 2/145; B41J 2002/14362; B41J 2202/19
See application file for complete search history.

(56) References Cited

U.S. PATENT DOCUMENTS

| 2021/0213737 | A1 | 7/2021 | Okamura et al. |
| 2023/0202199 | A1* | 6/2023 | Malatesta ........... B41J 2/21 347/20 |

FOREIGN PATENT DOCUMENTS

JP    2021-109398 A    8/2021

* cited by examiner

*Primary Examiner* — Jason S Uhlenhake
(74) *Attorney, Agent, or Firm* — Harness, Dickey & Pierce, P.L.C.

(57) ABSTRACT

There are provided a liquid ejecting head configured to eject a liquid in an ejection direction; and a support unit having a support body that supports the liquid ejecting head and a base portion that supports the support body, and the support body is rotatable about a rotation shaft extending in a direction orthogonal to the ejection direction with respect to the base portion.

20 Claims, 41 Drawing Sheets

FIG. 3
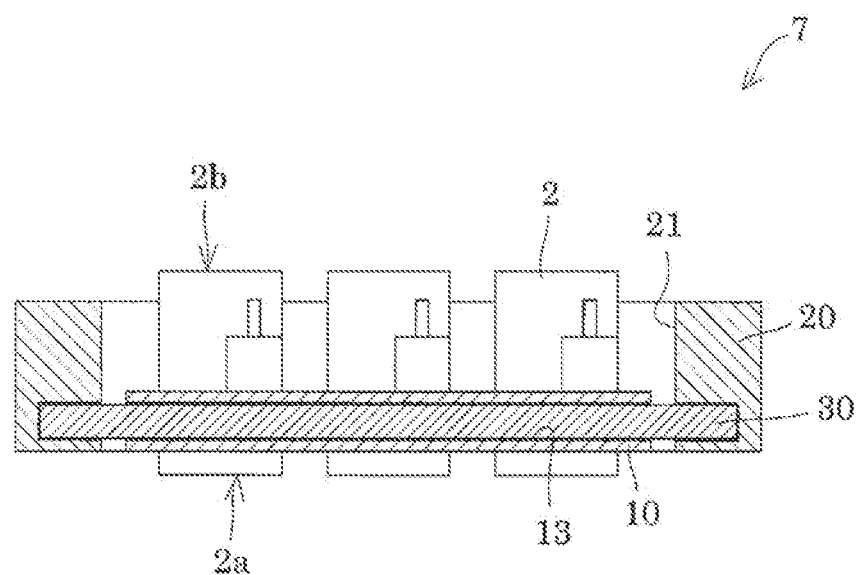
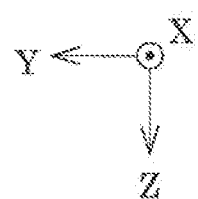

FIG. 9
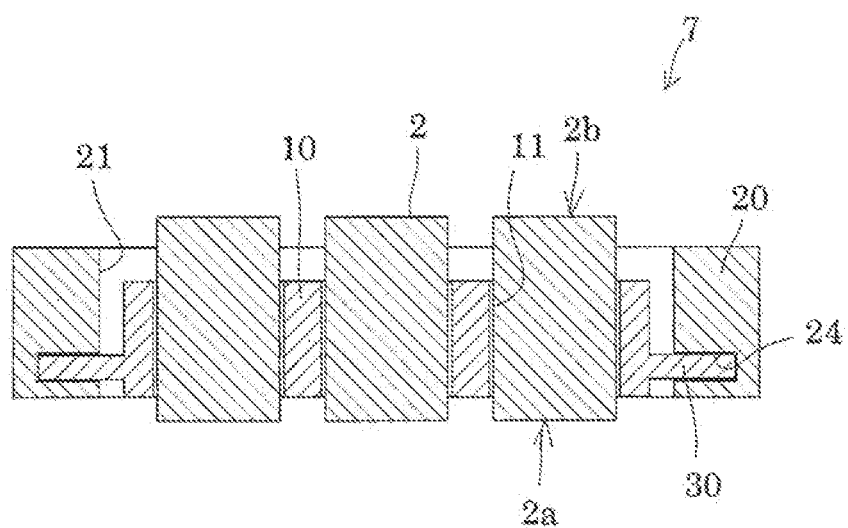
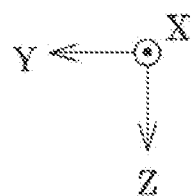

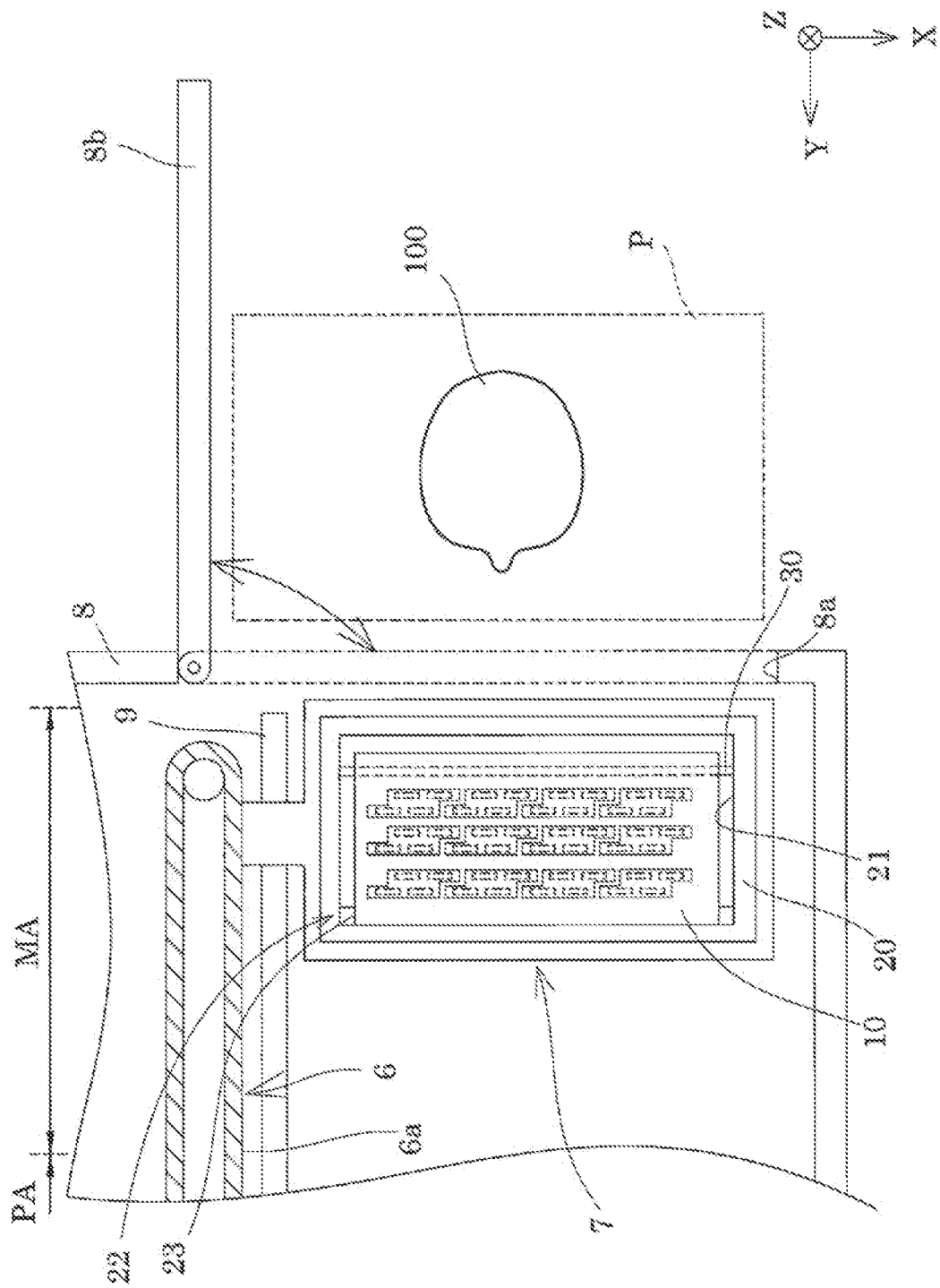

LIQUID EJECTING APPARATUS

The present application is based on, and claims priority from JP Application Serial Number 2022-134529, filed Aug. 25, 2022, the disclosure of which is hereby incorporated by reference herein in its entirety.

BACKGROUND

1. Technical Field

The present disclosure relates to a liquid ejecting apparatus including a liquid ejecting head that ejects a liquid, particularly to an ink jet type recording apparatus including an ink jet type recording head that ejects ink as a liquid.

2. Related Art

A liquid ejecting apparatus represented by an ink jet type recording apparatus, such as an ink jet type printer or plotter, includes a plurality of liquid ejecting heads that are capable of ejecting a liquid, such as ink stored in a cartridge, a tank or the like, as droplets. For example, JP-A-2021-109398 discloses a liquid ejecting apparatus in which a plurality of liquid ejecting heads are two-dimensionally disposed when viewed in an ejection direction of a droplet.

However, in a configuration in which a plurality of liquid ejecting heads are supported by a support unit, there is a problem that visibility and accessibility to each liquid ejecting head are poor, and it is difficult to perform maintenance work on the liquid ejecting heads.

SUMMARY

According to an aspect of the present disclosure, there is provided a liquid ejecting apparatus including: a plurality of liquid ejecting heads including a first liquid ejecting head that ejects a liquid in an ejection direction; and a support unit having a first support body that supports the first liquid ejecting head and a base portion that supports the first support body, in which the first support body is rotatable about a rotation shaft extending in a first direction orthogonal to the ejection direction with respect to the base portion.

BRIEF DESCRIPTION OF THE DRAWINGS

FIG. 3 is a sectional view of a main portion of the liquid ejecting apparatus according to Embodiment 1.

FIG. 9 is a sectional view of a main portion of Modification Example 1 of the liquid ejecting apparatus according to Embodiment 1.

FIG. 41 is a plan view of a main portion of a liquid ejecting apparatus according to another embodiment.

DESCRIPTION OF EMBODIMENTS

Figure 1:
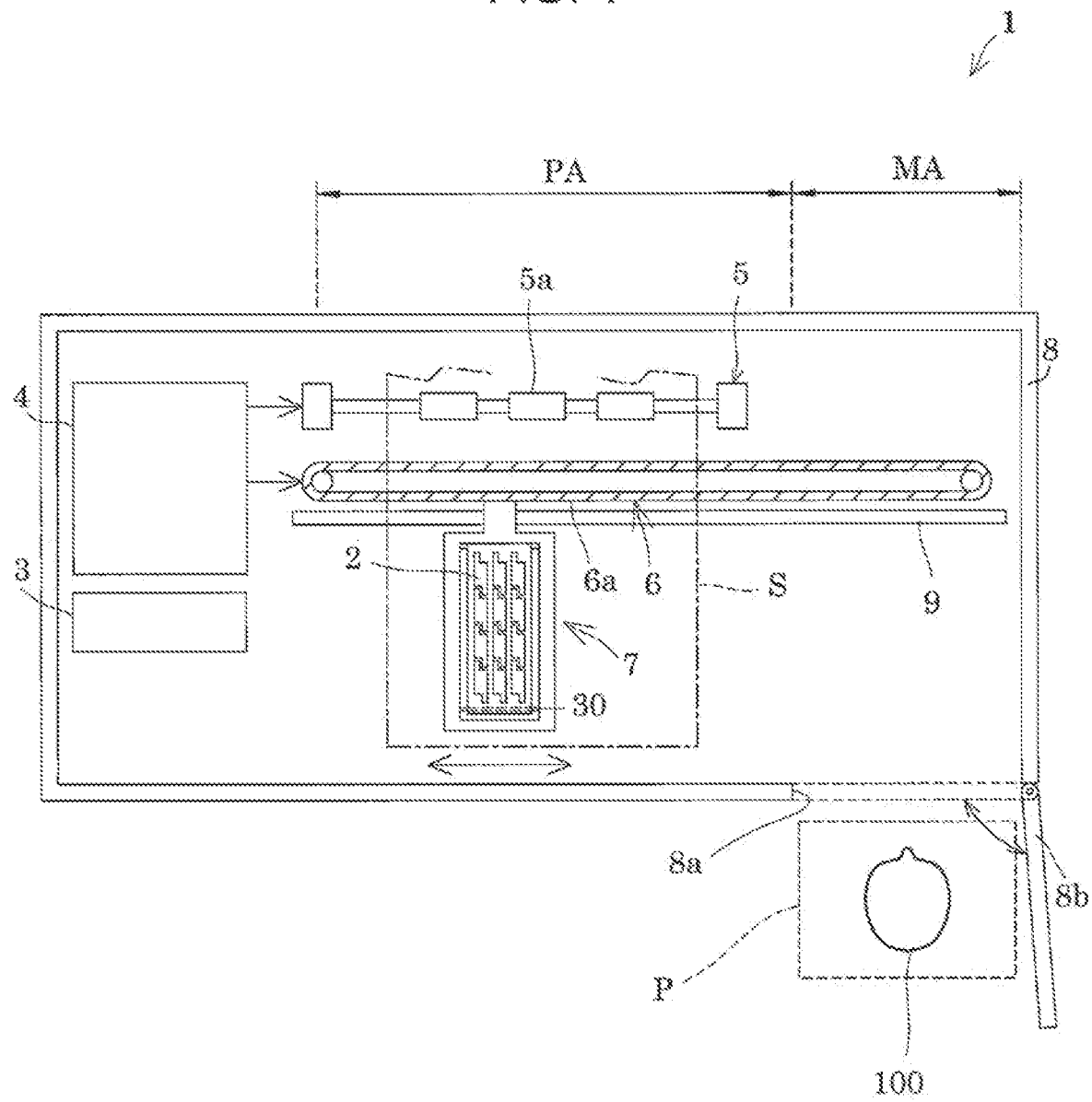
FIG. 1 is a view illustrating a schematic configuration of a liquid ejecting apparatus according to Embodiment 1.

Hereinafter, the present disclosure will be described in detail based on embodiments. However, the following description shows one aspect of the present disclosure, and can be changed in any manner within the scope of the present disclosure. Those having the same reference numerals in each drawing indicate the same members, and the description thereof will be omitted as appropriate. In each of the drawings, X, Y, and Z represent three spatial axes orthogonal to each other. In the present specification, the directions along these axes are the X direction, the Y direction, and the Z direction. The direction in which the arrows in each drawing are oriented is described as the positive (+) direction, and the opposite direction of the arrows is described as the negative (−) direction. In addition, the directions of the three spatial axes that do not limit the positive direction and the negative direction will be described as the X-axis direction, the Y-axis direction, and the Z-axis direction.

Embodiment 1

Figure 2:
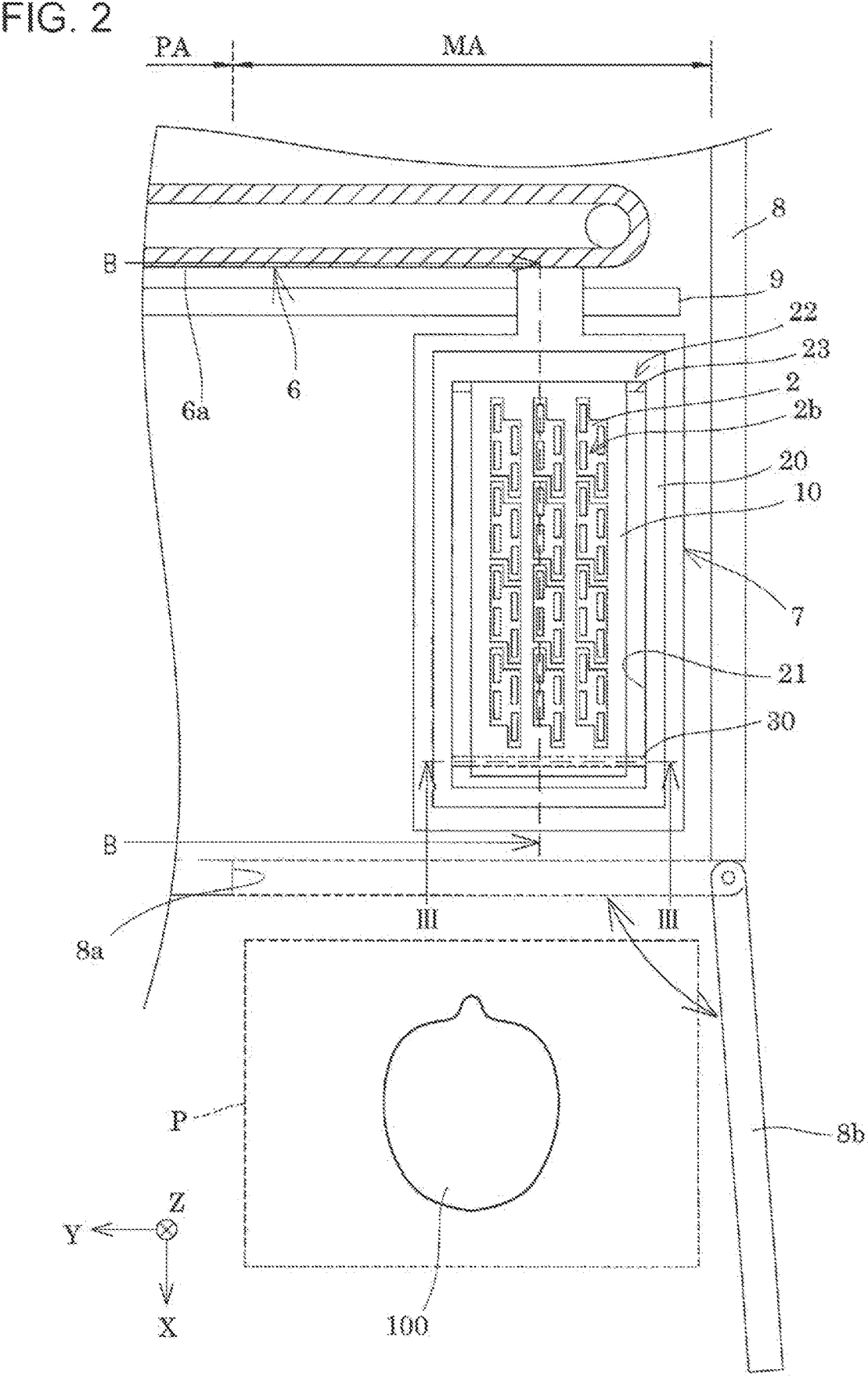
FIG. 2 is a plan view of a main portion of the liquid ejecting apparatus according to Embodiment 1.

FIG. 1 is a view illustrating a schematic configuration of a liquid ejecting apparatus 1 according to Embodiment 1 of the present disclosure. FIG. 2 is an enlarged view of the main portion of FIG. 1. In the present embodiment, the "first direction" is the +Y direction, and the "second direction" is the +X direction.

As illustrated in the drawing, the liquid ejecting apparatus 1 is an ink jet type recording apparatus that causes ink, which is one type of liquid, to be ejected and land on a printing medium S, and prints an image or the like based on an arrangement of dots formed on the medium S. As the medium S, any material such as a resin film or cloth can be used in addition to a recording paper sheet.

The liquid ejecting apparatus 1 includes a plurality of liquid ejecting heads 2, a liquid storage section 3, a control unit 4, which is a control section, a transport mechanism 5 that feeds out the medium S, a moving mechanism 6, a support unit 7, and a housing 8 in which theses are provided.

The liquid ejecting head 2 ejects ink supplied from the liquid storage section 3 that stores ink as ink droplets in the +Z direction to perform printing. In other words, the "ejection direction" of the ink droplets of the liquid ejecting head 2 refers to the direction in which the printing operation is performed. In the present embodiment, the +Z direction is the gravity direction. Therefore, the X-axis direction and the Y-axis direction orthogonal to the Z-axis direction are directions along the horizontal plane. In the present embodiment, a plurality of such liquid ejecting heads 2 are provided. The number of liquid ejecting heads 2 provided in the liquid ejecting apparatus 1 may be one, and the number thereof is not particularly limited.

The support unit 7 supports all the liquid ejecting heads 2. Details of the support unit 7 will be described later. The support unit 7 is a so-called carriage, and is provided to be movable in the shaft direction of a carriage shaft 9 fixed to the housing 8. The carriage shaft 9 is disposed such that the shaft direction is the Y-axis direction, and the support unit 7 can reciprocate in the Y-axis direction.

The liquid storage section 3 individually stores a plurality of types, for example, a plurality of colors of inks ejected from the liquid ejecting head 2. Examples of the liquid storage section 3 include a cartridge that can be attached to and detached from the liquid ejecting apparatus 1, a bag-like ink pack formed of a flexible film, an ink tank that can be refilled with ink, and the like. In addition, for example, a plurality of types of inks having different colors, components, and the like are stored in the liquid storage section 3. Further, the liquid storage section 3 may be divided into a main tank and a sub tank. The sub tank may be coupled to the liquid ejecting head 2, and the sub tank is refilled with the ink consumed by ejecting the ink droplets from the liquid ejecting head 2 from the main tank.

The control unit 4 includes a control device such as a central processing unit (CPU) or a field programmable gate array (FPGA), and a storage device such as a semiconductor memory. The control unit 4 totally controls each element of the liquid ejecting apparatus 1, that is, the liquid ejecting head 2, the transport mechanism 5, the moving mechanism 6, and the like by executing the program stored in the storage device by the control device.

The transport mechanism 5 transports the medium S in the X-axis direction, and has a transport roller 5a.

That is, the transport mechanism 5 transports the medium S in the X-axis direction by rotating the transport roller 5a. The transport roller 5a is rotated by driving a transport motor (not illustrated). The control unit 4 controls the transport of the medium S by controlling the drive of the medium transport motor. The transport mechanism 5 that transports the medium S is not limited to the one including the transport roller 5a, and may transport the medium S by a belt or a drum.

The moving mechanism 6 is a mechanism for reciprocating the liquid ejecting head 2 in the Y-axis direction, and includes a transport belt 6a fixed to the base portion 20 of the support unit 7. The transport belt 6a is an endless belt erected along the Y-axis direction. The transport belt 6a is rotated by driving a transport motor (not illustrated). The control unit 4 rotates the transport belt 6a by controlling the drive of the transport motor to reciprocate the liquid ejecting head 2 together with the support unit 7 in the Y-axis direction. The support unit 7 may be configured to mount the liquid storage section 3 together with the liquid ejecting head 2.

Figure 7:
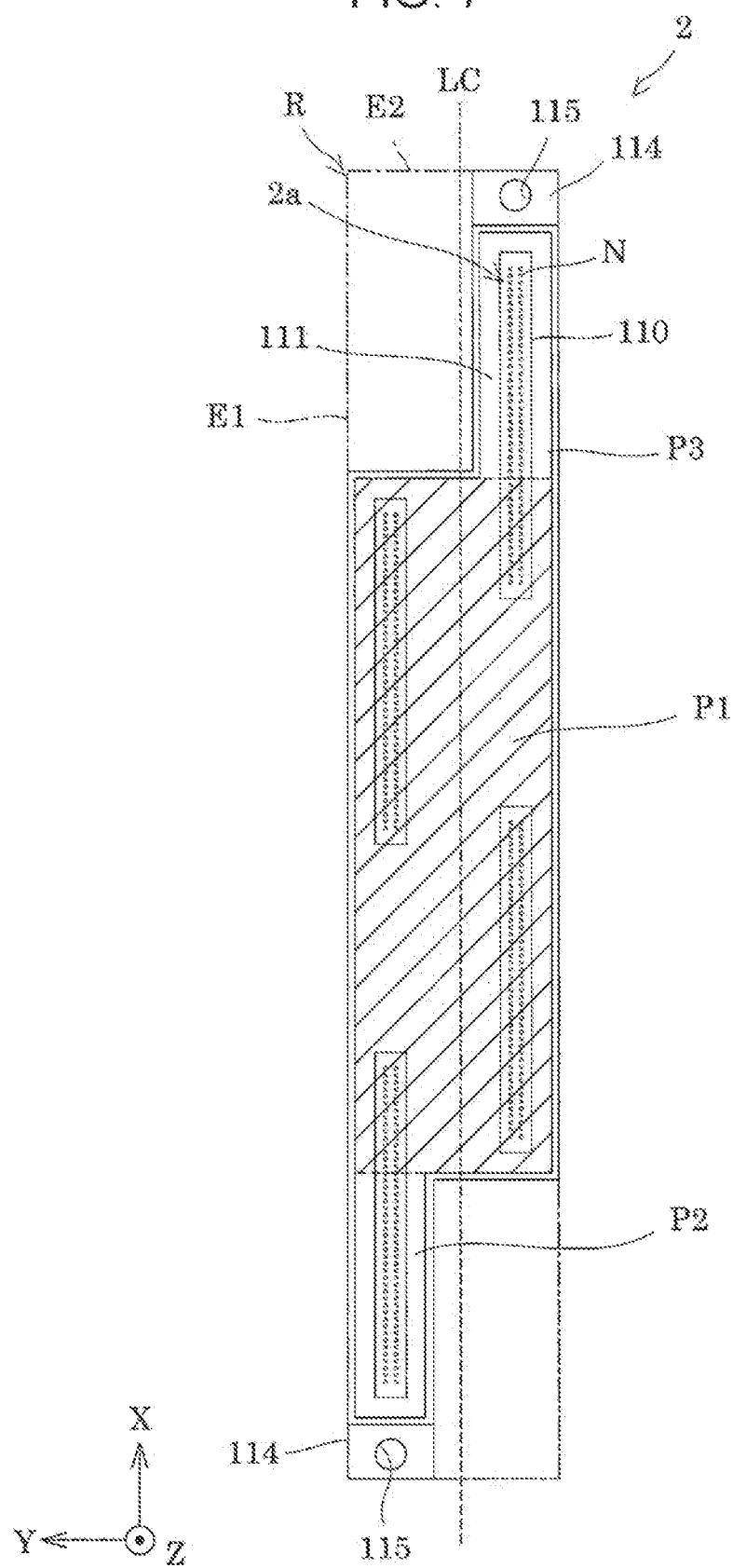
FIG. 7 is a plan view of the liquid ejecting head according to Embodiment 1.

Under the control of the control unit 4, the liquid ejecting head 2 executes an ejection operation of ejecting the ink supplied from the liquid storage section 3 in the +Z direction as ink droplets from each of a plurality of nozzles N (refer to FIG. 7). The ejection operation of ink droplets by the liquid ejecting head 2 is performed in parallel with the transport of the medium S by the transport mechanism 5 and the reciprocating movement of the liquid ejecting head 2 by the moving mechanism 6, and accordingly, an image is formed by ink on the surface of the medium S, that is, a so-called printing operation is performed. In the present embodiment, an area for performing printing on the medium S of the liquid ejecting apparatus 1 is referred to as a printing area PA.

The housing 8 has a hollow box shape that accommodates the liquid ejecting head 2, the control unit 4, the transport mechanism 5, the moving mechanism 6, the support unit 7, the carriage shaft 9, and the like inside.

The housing 8 includes an opening portion 8a and a lid member 8b that opens and closes the opening portion 8a. The opening portion 8a is provided at a position facing a maintenance area MA positioned in the −Y direction with respect to the printing area PA of the liquid ejecting apparatus 1 in the +X direction. That is, the opening portion 8a is positioned in the +X direction of the maintenance area MA. Although not particularly illustrated, the maintenance area MA includes a wiping unit that wipes a nozzle surface 2a of the liquid ejecting head 2, a cap member that covers the nozzle surface 2a of the liquid ejecting head 2, and a suction unit that suctions the ink or the like in the liquid ejecting head 2 via the cap member, and the like may be provided. In addition, the wiping unit, the cap member, the suction unit, and the like may be provided between the printing area PA and the maintenance area MA.

The lid member 8b opens and closes the opening portion 8a, and one end portion thereof is rotatably supported by the housing 8.

In the liquid ejecting apparatus 1, when an operator 100 performs maintenance on the liquid ejecting head 2, the operator 100 opens the opening portion 8a by the lid member 8b, stands at a work position P positioned in the +X direction of the opening portion 8a, and performs maintenance of the liquid ejecting head 2 positioned in the maintenance area MA in the housing 8 through the opening portion 8a. That is, in the present embodiment, the operator 100 and the maintenance area MA are at positions facing each other in the X-axis direction.

Figure 4:
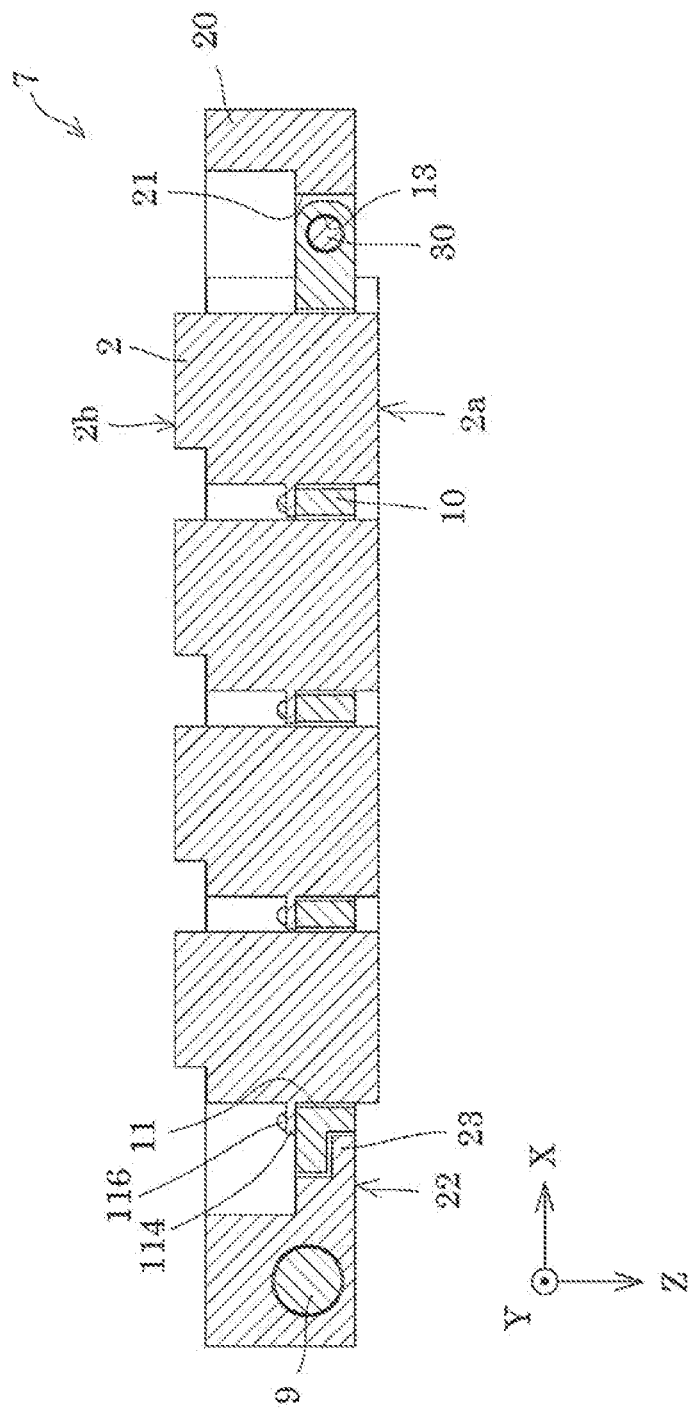
FIG. 4 is a sectional view of a main portion of the liquid ejecting apparatus according to Embodiment 1.
Figure 5:
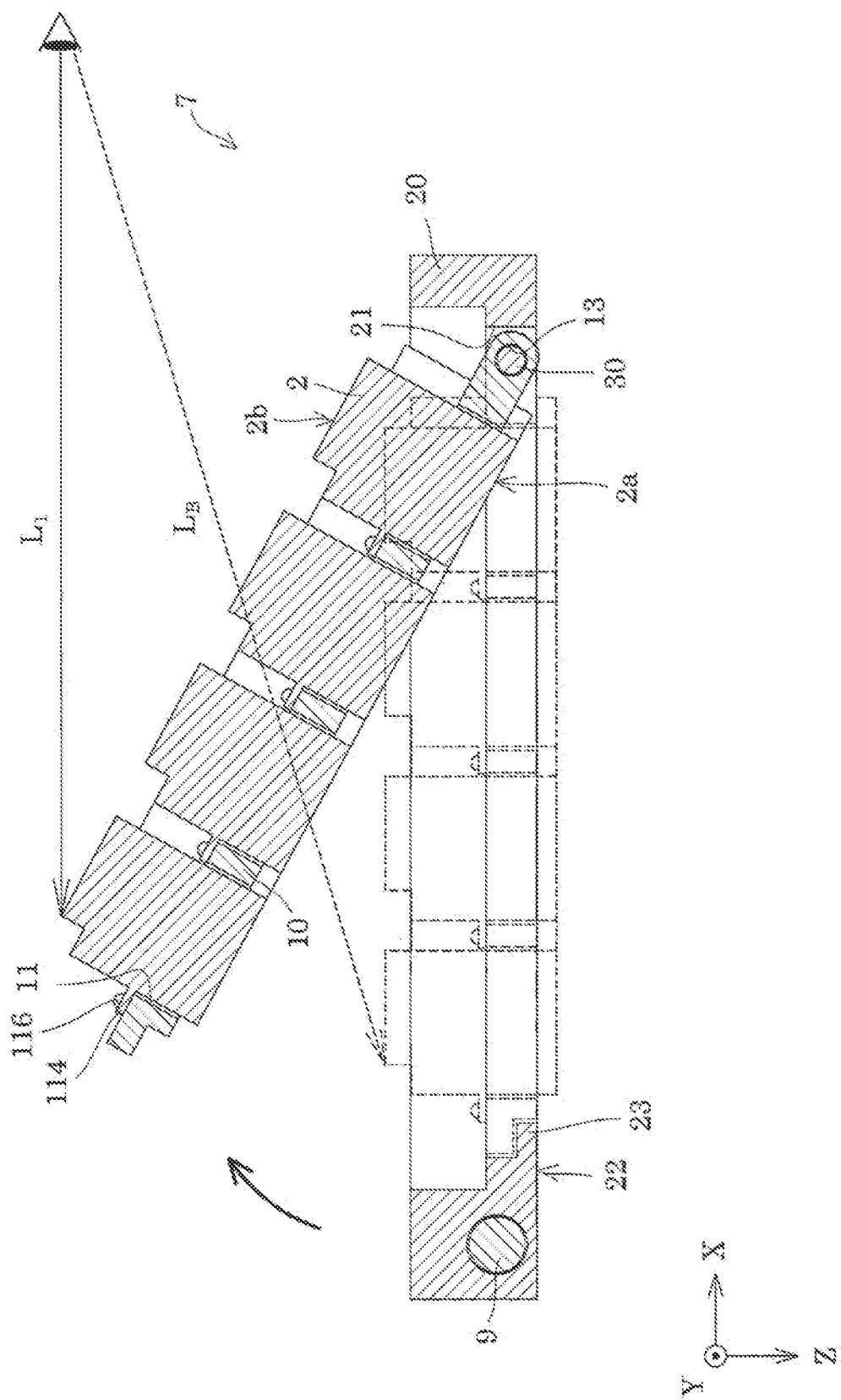
FIG. 5 is a sectional view of a main portion of the liquid ejecting apparatus according to Embodiment 1.
Figure 6:
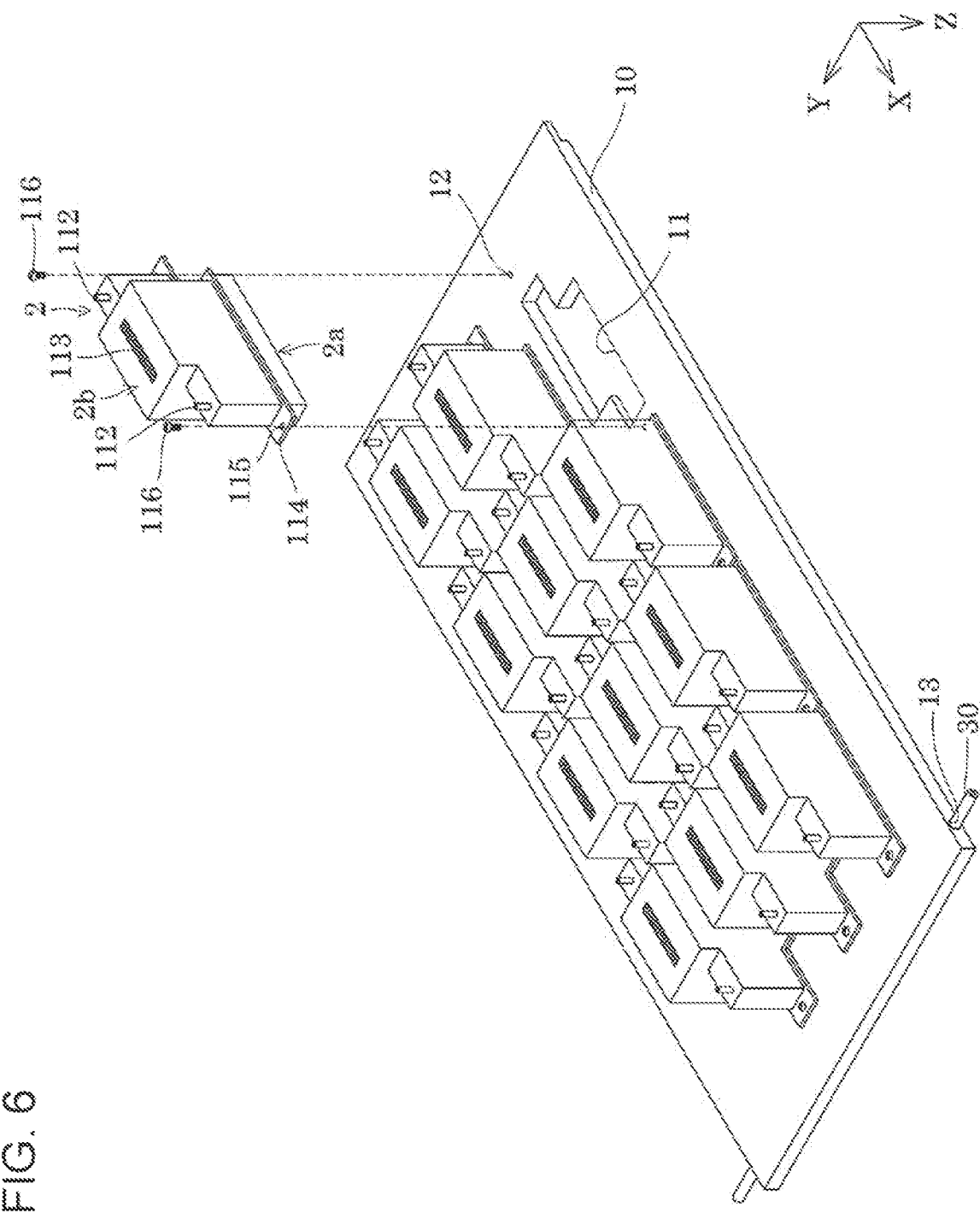
FIG. 6 is an exploded perspective view of a first support body and a liquid ejecting head according to Embodiment 1.

FIG. 3 is a sectional view taken along the line III-III in FIG. 2. FIG. 4 is a sectional view taken along the line B-B in FIG. 2, and is a view illustrating a printing posture of a support body 10. FIG. 5 is a sectional view taken along the line B-B in FIG. 2, and is a view illustrating an inclined posture of the support body 10. FIG. 6 is an exploded perspective view of a part of the liquid ejecting head 2 and the support body 10. FIG. 7 is a plan view of the liquid ejecting head 2 when viewed in the −Z direction.

As illustrated in FIG. 7, the liquid ejecting head 2 has the nozzle surface 2a in which the nozzle N opens on a surface in the +Z direction. The nozzle surface 2a may include only the surface of a so-called nozzle plate 110, which is a member through which the nozzle N opens, and may include the surface of the nozzle plate 110 where the nozzle N opens and the surface of a plate-shaped head cover 111 provided around the nozzle plate 110.

A flow path that communicates with the nozzle N and a pressure generation unit that causes a pressure change in the ink in the flow path are provided on the inside (not illustrated) of the liquid ejecting head 2. As the pressure generation unit, for example, the one that changes the volume of the flow path by deformation of the piezoelectric actuator having a piezoelectric material exhibiting an electromechanical conversion function, causes the pressure change in the ink in the flow path, and discharges the ink droplets from the nozzle N can be used. In addition, as other pressure generation unit, the one in which a heat generation element is disposed in the flow path to discharge the ink droplets from the nozzle N by bubbles generated due to the heat of the heat generation element, or a so-called electrostatic actuator that generates an electrostatic force between a vibration plate and an electrode, deforms the vibration plate by the electrostatic force, and discharges the ink droplets from the nozzle N can be used.

Further, as illustrated in FIG. 6, on an upper surface 2b of the liquid ejecting head 2 facing the −Z direction, two flow path coupling sections 112 communicating with the internal flow path, and an electrical coupling section 113 electrically coupled to the pressure generation unit on the inside, are provided. The ink from the liquid storage section 3 is supplied from the flow path coupling section 112 via a flow path member (not illustrated) provided outside the liquid ejecting head 2. The flow path member includes a tube or the like through which ink can flow, and couples the flow path coupling section 112 and the liquid storage section 3. That is, one end of the flow path member is attachably and detachably coupled to the flow path coupling section 112, and the other end of the flow path member is coupled to the liquid storage section 3. One flow path coupling section 112 may serve as a supply port for supplying ink from the liquid storage section 3 to the inside, and the other flow path coupling section 112 may serve as a discharge port for discharging the ink, which is not ejected from the nozzle N, to the outside of the liquid storage section 3 or the like.

Further, the electrical coupling section 113 is attachably and detachably coupled to an electrical wiring member (not illustrated) provided outside the liquid ejecting head 2. The electrical wiring member includes a flexible substrate and the like, and electrically couples the electrical coupling section 113 and the control unit 4.

As illustrated in FIG. 7, the liquid ejecting head 2 includes a first part P1 (a part indicated by hatching), a second part P2, and a third part P3 when viewed in the −Z direction.

When the liquid ejecting head 2 is viewed in a plan view in the +Z direction and a rectangle having the minimum area including the liquid ejecting head 2 is R, a long side E1 of a rectangle R overlaps a side along the +X direction of the outer periphery of the liquid ejecting head 2, and a short side E2 of the rectangle R overlaps a side along the +Y direction of the outer periphery of the liquid ejecting head 2. The center line parallel to the long side E1 of the virtual rectangle R is set to LC.

The first part P1 is a rectangular part through which the center line LC passes. The second part P2 is a rectangular part protruding from the first part P1 in the −X direction. The third part P3 is a rectangular part protruding from the first part P1 in the +X direction. That is, the second part P2, the first part P1, and the third part P3 are arranged in this order in the +X direction.

The second part P2 and the third part P3 are positioned in opposite directions along the Y axis with the center line LC interposed therebetween. The plurality of liquid ejecting heads 2 are arranged in the X-axis direction such that the second part P2 of one liquid ejecting head 2 and the third part P3 of the other liquid ejecting head 2 of the two liquid ejecting heads 2 arranged adjacent to each other along the X-axis direction face each other in the Y-axis direction.

In this manner, by arranging the second part P2 of one liquid ejecting head 2 and the third part P3 of the other liquid ejecting head 2 to face each other in the Y-axis direction, the nozzles N of the liquid ejecting heads 2 that are adjacent to each other along the X-axis direction can partially overlap each other in the X-axis direction to form a continuous row of the nozzles N in the X-axis direction. It should be noted that the second part P2 and the third part P3 have a width in the Y-axis direction that does not pass through the center line LC. Therefore, when the plurality of liquid ejecting heads 2 are arranged along the X-axis direction, the width occupied by the plurality of liquid ejecting heads 2 in the Y-axis direction can be further narrowed.

The liquid ejecting head 2 is supported by the support unit 7. As illustrated in FIGS. 2 to 6, the support unit 7 supports the plurality of liquid ejecting heads 2. The plurality of liquid ejecting heads 2 supported by the support unit 7 are aligned by three in the +Y direction and by four in the +X direction, for a total of twelve.

The support unit 7 includes the support body 10, the base portion 20, and a rotation shaft member 30.

The support body 10 is a plate-shaped member that supports the plurality of liquid ejecting heads 2. The support body 10 has a holding hole 11 for holding each of the liquid ejecting heads 2. The holding hole 11 is provided to penetrate the support body 10 in the Z-axis direction. Further, the holding holes 11 are independently provided for each of the liquid ejecting heads 2. It is needless to say that the holding holes 11 may be continuously provided over the plurality of liquid ejecting heads 2.

The liquid ejecting head 2 is inserted into the holding hole 11 in the +Z direction, and the flange section 114 of the liquid ejecting head 2 is supported by the peripheral edge portion of the holding hole 11. The liquid ejecting head 2 supported by the support body 10 protrudes from a surface where the nozzle surface 2a faces the +Z direction of the support body 10. In addition, the nozzle surface 2a of the liquid ejecting head 2 supported by the support body 10 may not protrude from the surface of the support body 10 facing the +Z direction.

Each of the liquid ejecting heads 2 includes the flange section 114 protruding from both end portions in the +X direction and the −X direction, and a first fixing hole 115 provided in the flange section 114 and penetrating in the Z-axis direction.

The support body 10 is provided with a second fixing hole 12 which is a female screw into which a screw 116, which is a fixing member for fixing each liquid ejecting head 2, is screwed. The liquid ejecting head 2 is fixed to the support body 10 by inserting the screw 116 into the first fixing hole 115 of the liquid ejecting head 2 and screwing the screw 116 into the second fixing hole 12 of the support body 10. That is, the liquid ejecting head 2 is fixed to the surface of the support body 10 facing the −Z direction by screwing the screw 116. Therefore, the liquid ejecting head 2 is attached to and detached from the support body 10 on the surface side of the support body 10 facing the −Z direction. It is needless to say that the liquid ejecting head 2 may be fixed to the support body 10 by screwing the screw 116 onto the surface of the support body 10 facing the +Z direction. That is, the liquid ejecting head 2 may be fixed to the support body 10 on the surface side of the support body 10 facing the +Z direction. Further, the method for fixing the liquid ejecting head 2 to the support body 10 is not limited to the fixing by the screw 116, and for example, the fixing may be performed by sandwiching the support body 10 and the liquid ejecting head 2 with a clamp or the like. However, the liquid ejecting head 2 is preferably fixed to the support body 10 with a configuration in which the liquid ejecting head 2 can be reliably fixed without being displaced during printing and can be easily attached and detached during maintenance, and fixing with the screw 116 is preferred.

The support body 10 of the present embodiment supports all the liquid ejecting heads 2. In the present embodiment, four liquid ejecting heads 2 are provided in parallel in one row in the +X direction, and three rows are aligned in the +Y direction. That is, the plurality of liquid ejecting heads 2 are aligned by four in the +X direction and by three in the +Y direction. Therefore, when the number of liquid ejecting heads 2 aligned in the +X direction is m (m is a natural number of 2 or more) and the number of liquid ejecting heads 2 aligned in the +Y direction is n (n is a natural number of 1 or more), the relationship of m>n is satisfied. The fact that the liquid ejecting heads 2 are aligned in the +X direction includes a case where the liquid ejecting heads 2 aligned adjacent to each other in the +X direction do not completely overlap each other when viewed in the +Y direction. Further, the fact that the liquid ejecting heads 2 are aligned in the +X direction includes a case where the liquid ejecting heads 2 aligned adjacent to each other in the +X direction partially overlap each other when viewed in the +Y direction. That is, m, which is the number of liquid ejecting heads 2 aligned in the +X direction, can also be referred to as the number of liquid ejecting heads 2 which are at different positions in the X-axis direction. Similarly, the fact that the liquid ejecting heads 2 are aligned in the +Y direction includes a case where the liquid ejecting heads 2 aligned adjacent to each other in the +Y direction do not completely overlap each other when viewed in the +X direction. Further, the fact that the liquid ejecting heads 2 are aligned in the +Y direction includes a case where the liquid ejecting heads 2 aligned adjacent to each other in the +Y direction partially overlap each other when viewed in the +X direction. That is, n, which is the number of liquid ejecting heads 2 aligned in the +Y direction, can also be referred to as the number of liquid ejecting heads 2 which are at different positions in the Y-axis direction. The rules for aligning the liquid ejecting heads 2 in the +X direction and the +Y direction are the same thereafter.

Due to such an arrangement of the liquid ejecting heads 2, the support body 10 is elongated in the +X direction in which the number of liquid ejecting heads 2 aligned is large, and shortened in the +Y direction. Here, the fact that the support body 10 is elongated in the +X direction means that the support body 10 of the present embodiment has a rectangular shape when viewed in the +Z direction, and thus the support body 10 has a shape in which a side along the +X direction is a long side and a side along the +Y direction is a short side. It is needless to say that the shape of the support body 10 is not particularly limited, and may be a polygonal shape when viewed in the +Z direction, and may be basically an elliptical shape or a rectangular shape with both end portions in the longitudinal direction having a semicircular shape, so-called rounded corner rectangular shape (also referred to as a track shape).

The end portion of the base portion 20 in the −Z direction is supported by the carriage shaft 9. The base portion 20 has a support hole 21 for supporting the support body 10 and exposing the nozzle surface 2a of the liquid ejecting head 2 supported by the support body 10 in the +Z direction. The support hole 21 has a rectangular shape when viewed in the +Z direction, and is provided to penetrate the base portion 20 in the Z-axis direction.

The rotation shaft member 30 is held by the base portion 20 to traverse the inside of the support hole 21. In the present embodiment, the rotation shaft member 30 is disposed in the support hole 21 at the end portion in the +X direction such that the +Y direction is the shaft direction. The rotation shaft member 30 may be integrally provided with the base portion 20, or may be a separate body fixed to the base portion 20. Further, the rotation shaft member 30 may be held rotatably with respect to the base portion 20, or may be fixed to the base portion 20 not to rotate.

The support body 10 is supported by the rotation shaft member 30 fixed to the base portion 20.

The support body 10 has a through-hole 13 penetrating in the +Y direction at an end portion in the +X direction. The rotation shaft member 30 is inserted into the through-hole 13 of the support body 10. In addition, the support body 10 is rotatable about the rotation shaft member 30. That is, the support body 10 is rotatable about a virtual "rotation shaft" extending in the +Y direction. In the present embodiment, the "rotation shaft" around which the support body 10 is rotatable coincides with the rotation shaft member 30.

The end portion of the support body 10 in the −X direction abuts on the end portion of the base portion 20 on the −X direction side that defines the support hole 21, and a restriction mechanism 22 that restricts the end portion of the support body 10 from rotationally moving in the +Z direction with respect to the base portion 20 is provided. In the present embodiment, the restriction mechanism 22 has a protrusion portion 23 that protrudes in the +X direction from the end portion of the support hole 21 in the −X direction. The surface of the protrusion portion 23 facing the −Z direction abuts on the surface of the end portion of the support body 10 in the −X direction facing the +Z direction, and accordingly, the end portion of the support body 10 in the −X direction is restricted from rotationally moving in the +Z direction. That is, from the state where the end portion in the −X direction abuts on the protrusion portion 23, the support body 10 is only allowed to rotationally move the end portion in the −X direction in the −Z direction.

The rotation shaft member 30 may be fixed to the support body 10 and the support body 10 may be provided to be rotatable with respect to the base portion 20 integrally with the rotation shaft member 30. A case where the rotation shaft member 30 is fixed to the support body 10 in this manner includes a case where the support body 10 is rotatable about a virtual "rotation shaft" of which the shaft direction coincides with the rotation shaft member 30.

It is needless to say that the rotation shaft member 30 may be rotatably supported by the base portion 20, and the support body 10 may be rotatably supported by the rotation shaft member 30. That is, the rotation shaft member 30 may be rotatable without being fixed to both the base portion 20 and the support body 10.

As described above, the support body 10 is rotatably provided about the "rotation shaft" extending in the +Y direction that coincides with the rotation shaft member 30 with respect to the base portion 20. That is, the support body 10 of the present embodiment corresponds to the "first support body." Further, in the present embodiment, all the liquid ejecting heads 2 are supported by the support body 10. Therefore, any one of the plurality of liquid ejecting heads 2 supported by the support body 10 corresponds to the "first liquid ejecting head."

Here, when ink droplets are ejected from the liquid ejecting head 2 for the printing operation, as illustrated in FIG. 4, the support body 10 has the nozzle surface 2a of the liquid ejecting head 2 along XY plane defined by the X axis and the Y axis, in other words, is in a horizontal posture in which the surface of the support body 10 that holds the liquid ejecting head 2 is along the XY plane. The posture of the support body 10 illustrated in FIG. 4 is referred to as a printing posture. On the other hand, when performing the maintenance of the liquid ejecting head 2, as illustrated in FIG. 5, the support body 10 rotates about the rotation shaft extending in the +Y direction with respect to the base portion 20, and in the present embodiment, about the rotation shaft member 30. As a result, an inclined posture in which the surface of the support body 10 that holds the liquid ejecting head 2 is inclined about the rotation shaft along the +Y direction with respect to the XY plane. The inclined posture of the present embodiment is a posture in which the end portion of the support body 10 in the −X direction is positioned in the −Z direction with respect to the base portion 20. In other words, the base portion 20 is disposed in the −X direction with respect to the operator 100 performing the maintenance of the liquid ejecting head 2, and the rotation shaft that coincides with the rotation shaft member 30 of the present embodiment is disposed in the +X direction with respect to the center of the base portion 20 in the +X direction. That is, the base portion 20 is disposed in the −X direction with respect to the operator 100, and the inclined posture is a posture in which the upper surface 2b of the liquid ejecting head 2 faces the operator 100. Furthermore, that is, the base portion 20 is disposed in the −X direction with respect to the opening portion 8a, and the inclined posture is a posture in which the upper surface 2b of the liquid ejecting head 2 faces the opening portion 8a. In addition, the maintenance of the liquid ejecting head 2 refers to, for example, replacement work of the liquid ejecting head 2, cleaning work of the nozzle surface 2a, and the like. Further, the replacement work of the liquid ejecting head 2 includes, for example, the work of attaching and detaching the liquid ejecting head 2 to and from the support body 10, the work of attaching and detaching the above-described flow path member (not illustrated) to and from the flow path coupling section 112 of the liquid ejecting head 2, or the above-described electrical wiring member (not illustrated) to and from the electrical coupling section 113, and the work of fastening with the screw 116. Hereinafter, the rotation direction in which the support body 10 is rotated in the −Z direction with respect to the base portion 20 is referred to as "forward direction", and the rotation direction in which the support body 10 is rotated in the +Z direction with respect to the base portion 20 is referred to as "reverse direction." In the present embodiment, the support body 10 is in an inclined posture rotated in the forward direction.

The operator 100 performing the maintenance stands at the work position P of the opening portion 8a of the housing 8 in the +X direction, puts the upper body or the arm into the inside of the housing 8 from the opening portion 8a, and performs the maintenance of the liquid ejecting head 2 supported in an inclined posture. When performing the maintenance of the liquid ejecting head 2 in this manner, the support body 10 is in an inclined posture rotated about the rotation shaft extending in the +Y direction, which is disposed in the +X direction with respect to the center of the base portion 20 in the +X direction. Therefore, a distance $L_1$ between the operator 100 and the liquid ejecting head 2 disposed at the end in the −X direction is shorter than a distance $L_B$ between the operator 100 and the liquid ejecting head 2 disposed at the end in the −X direction in the printing posture, and maintenance work can be easily performed. Further, in the inclined posture, since the support body 10 is inclined in the direction facing the operator 100 in the X-axis direction, the operator 100 can particularly easily visually recognize the liquid ejecting head 2 in the −X direction, and the maintenance work of the liquid ejecting head 2 can be easily performed. Incidentally, when the operator 100 performs maintenance of the liquid ejecting head 2 in the printing posture, it is difficult to perform the work because the distance $L_B$ between the operator 100 and the liquid ejecting head 2 positioned in the −X direction is long.

Further, in the printing posture, the liquid ejecting head 2 positioned in the −X direction is hidden behind the liquid ejecting head 2 positioned in the +X direction when viewed from the operator 100, and the screw 116 and the like are hard to be visually recognized, and it is difficult to perform maintenance work.

In particular, in the present embodiment, in the inclined posture, since the upper surface 2b of the liquid ejecting head 2 is in a posture facing the operator 100, that is, the opening portion 8a, maintenance of the upper surface 2b side of the liquid ejecting head 2 can be easily performed.

Further, in the present embodiment, since the support body 10 supports all the liquid ejecting heads 2, the frequency of the rotational operation for rotating the support body 10 is reduced when the maintenance of the plurality of liquid ejecting heads 2 is performed, and the time required for maintenance can be shortened.

Modification Example 1

Figure 8:
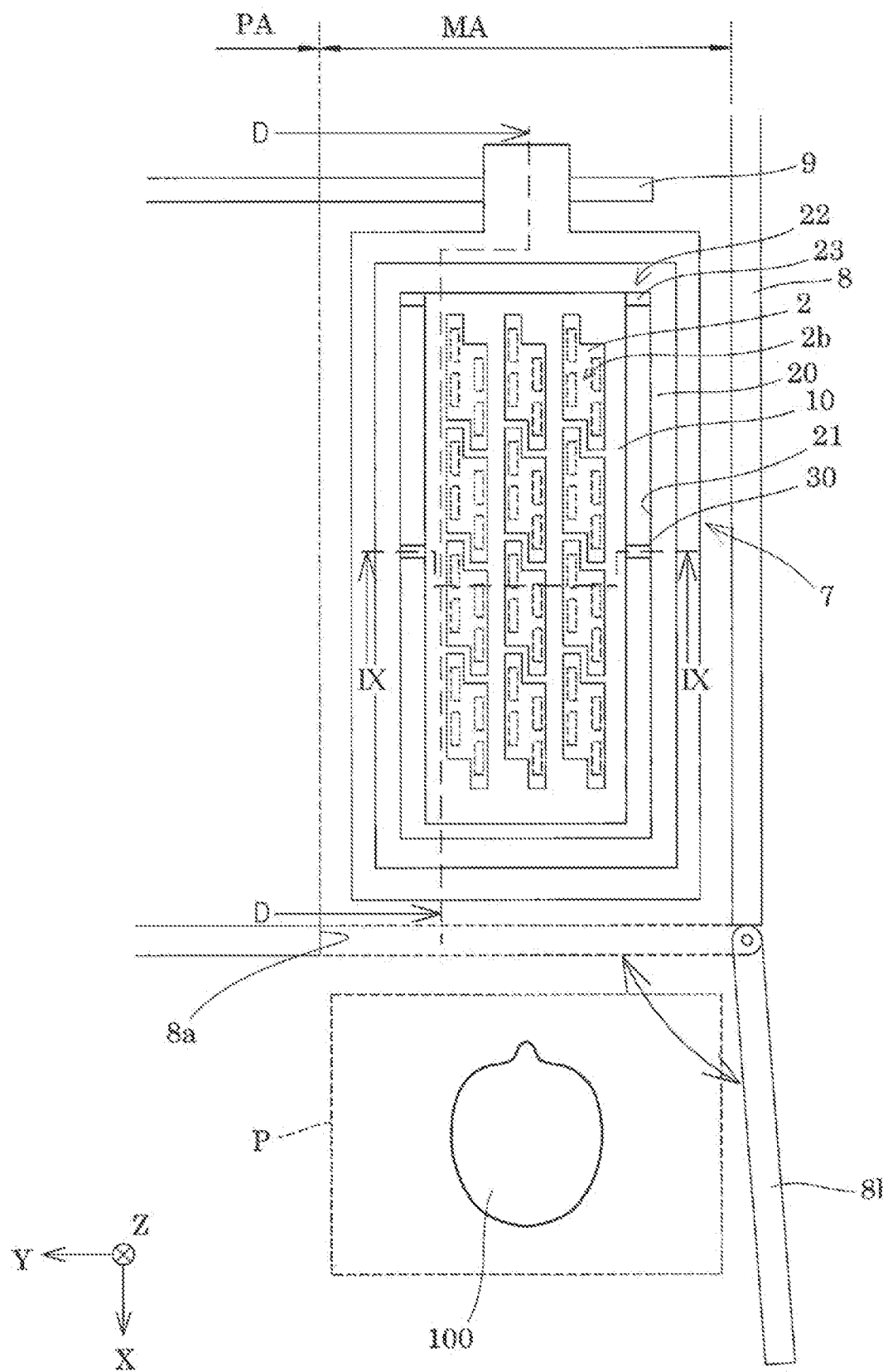
FIG. 8 is a plan view of a main portion of Modification Example 1 of the liquid ejecting apparatus according to Embodiment 1.

FIG. 8 is a plan view of a main portion of a modification example of the liquid ejecting apparatus 1 of Embodiment 1 when viewed in the +Z direction.

Figure 10:
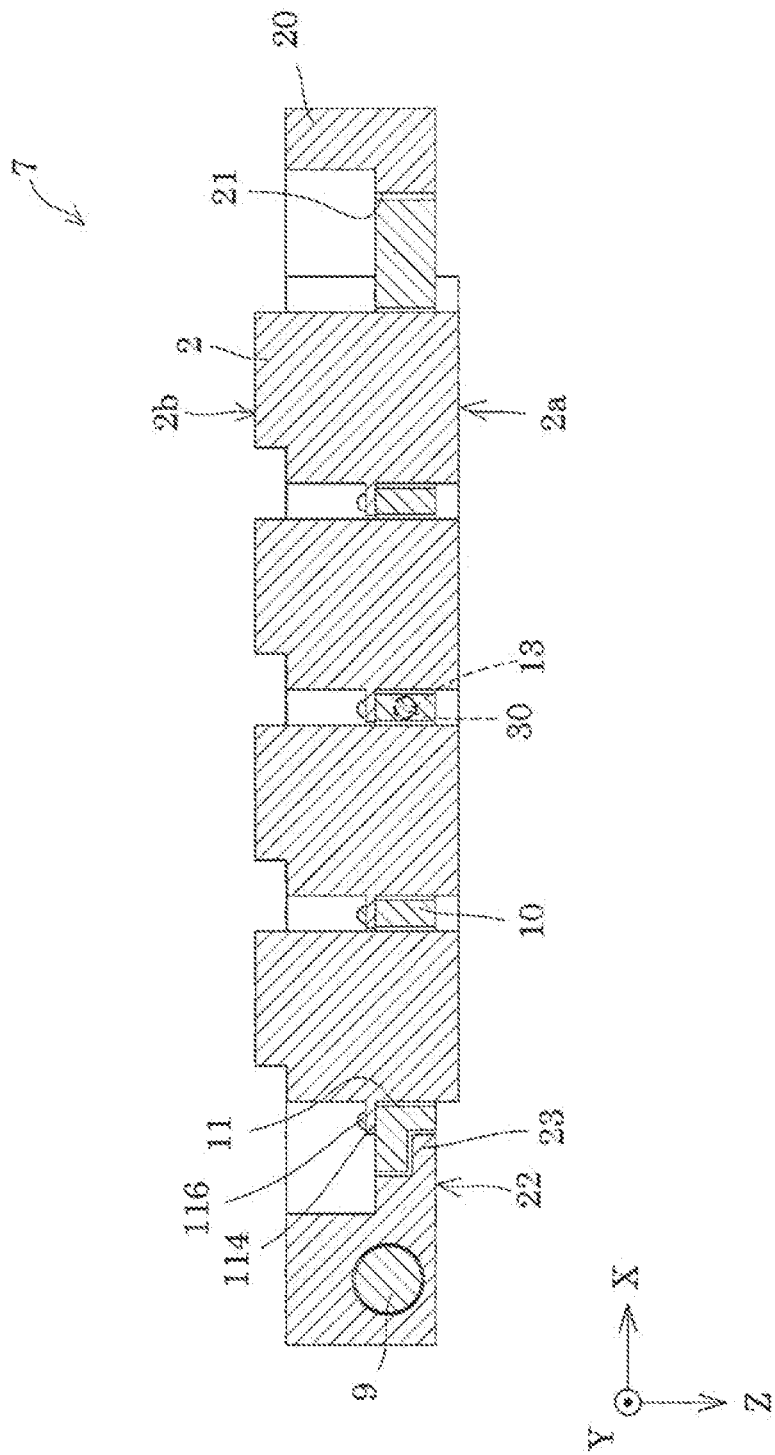
FIG. 10 is a sectional view of a main portion of Modification Example 1 of the liquid ejecting apparatus according to Embodiment 1.
Figure 11:
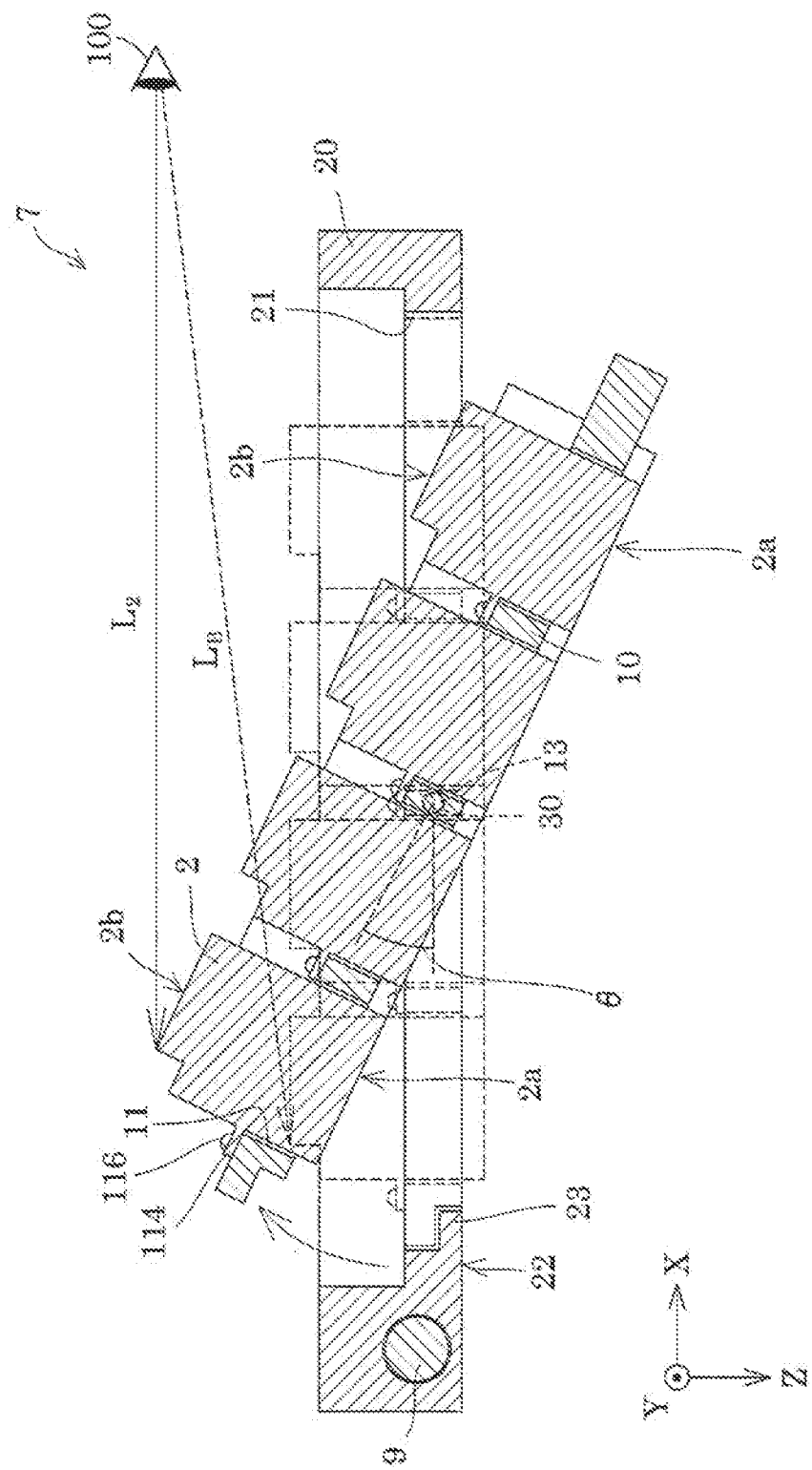
FIG. 11 is a sectional view of a main portion of Modification Example 1 of the liquid ejecting apparatus according to Embodiment 1.

FIG. 9 is a sectional view taken along the line IX-IX in FIG. 8. FIG. 10 is a sectional view taken along the line D-D in FIG. 8 and is a view illustrating a printing posture of the support body 10. FIG. 11 is a sectional view taken along the line D-D in FIG. 8 and is a view illustrating an inclined posture of the support body 10. Also in the present modification example, the support body 10 corresponds to the "first support body", and any one of all the liquid ejecting heads 2 supported by the support body 10 corresponds to the "first liquid ejecting head." Further, in the present modification example, the "first direction" is the +Y direction, and the "second direction" is the +X direction.

As illustrated in the drawing, the rotation shaft of the support body 10 is provided at the center portion of the base portion 20 in the +X direction. The center portion of the base portion 20 in the +X direction is a center area when the base portion 20 is divided into three in the +X direction. Specifically, the rotation shaft member 30 extending in the Y-axis direction from the side surfaces of the support body 10 in the +Y direction and the −Y direction is provided. The rotation shaft member 30 is disposed at the center portion of the support body 10 in the +X direction. The rotation shaft member 30 may be integrally provided with the support body 10, or may be a member in which separate bodies are fixed to each other. The two rotation shaft members 30 provided on both sides of the support body 10 in the Y-axis direction are disposed to be coaxial with each other.

The base portion 20 is provided with two bearing holes 24 which are opened on the inner surface of the support hole 21 and into which the rotation shaft members 30 are respectively inserted. The support body 10 is provided to be rotatable about the same virtual "rotation shaft" as the rotation shaft member 30 with respect to the base portion 20 by inserting the rotation shaft member 30 into the bearing hole 24. That is, the support body 10 is positioned at the center portion of the base portion 20 in the +X direction and is rotatably provided about a rotation shaft extending in the +Y direction.

As described above, even in the configuration in which the rotation shaft of the support body 10 with respect to the base portion 20 is positioned at the center portion in the +X direction, similarly to the above-described Embodiment 1, the support body 10 can take the printing posture illustrated in FIG. 10 and the inclined posture illustrated in FIG. 11. As illustrated in FIG. 11, when the support body 10 is in the inclined posture, a distance $L_2$ between the operator 100 and the liquid ejecting head 2 disposed in the −X direction is shorter than the distance $L_B$ in the printing posture. Therefore, the visibility of the liquid ejecting head 2 can be improved and the maintenance work can be easily performed.

Further, as in Modification Example 1, by providing the rotation shaft of the support body 10 at the center portion in the +X direction, as illustrated in FIG. 11, when the support body 10 is rotated into an inclined posture, the end portion of the support body 10 in the −X direction moves in the −Z direction and the end portion in the +X direction moves in the +Z direction. Therefore, the space for rotating the support body 10 in the −Z direction can be reduced, and the size of the liquid ejecting apparatus 1 in the Z-axis direction can be reduced.

In addition, the rotation shaft of the support body 10 may not be provided at the center portion of the base portion 20 in the +X direction, and may be provided at the end portion of the base portion 20 in the −X direction. Modification Example 2

Figure 12:
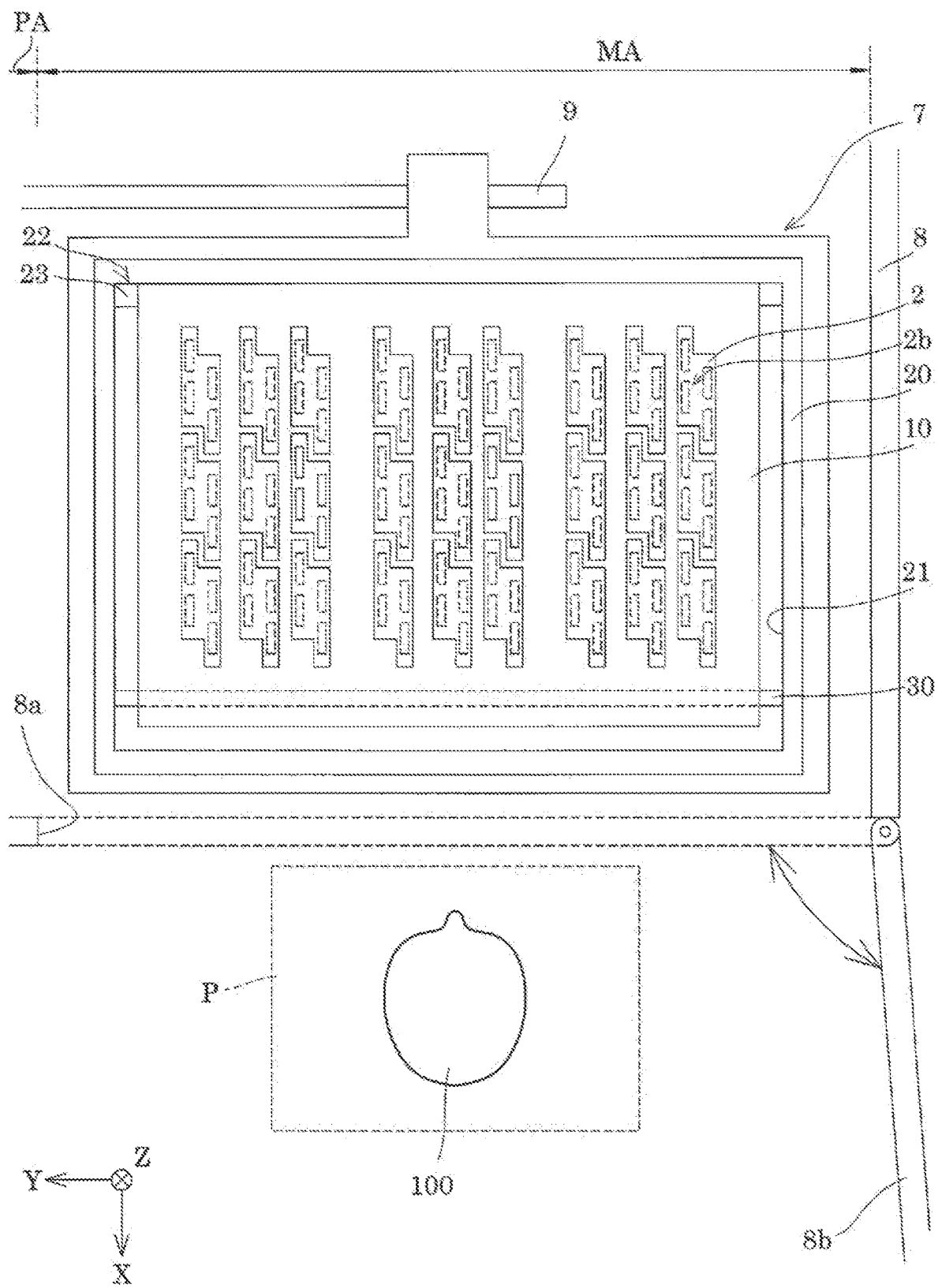
FIG. 12 is a plan view of a main portion of Modification Example 2 of the liquid ejecting apparatus according to Embodiment 1.

FIG. 12 is a plan view of a main portion of a modification example of the liquid ejecting apparatus 1 of Embodiment 1 when viewed in the +Z direction. Also in the present modification example, the support body 10 corresponds to the "first support body", and any one of all the liquid ejecting heads 2 supported by the support body 10 corresponds to the "first liquid ejecting head." Further, in the present modification example, the "first direction" is the +Y direction, and the "second direction" is the +X direction.

As illustrated in FIG. 12, in the support body 10, nine rows of three liquid ejecting heads 2 aligned in the +X direction are provided in the +Y direction. That is, the plurality of liquid ejecting heads 2 are disposed such that the number of the liquid ejecting heads 2 aligned in the +X direction is three and the number of the liquid ejecting heads 2 aligned in the +Y direction is nine. That is, when the number of liquid ejecting heads 2 aligned in the +X direction is m (m is a natural number of 1 or more) and the number of liquid ejecting heads 2 aligned in the +Y direction is n (n is a natural number of 2 or more), the relationship of m<n is satisfied.

In this manner, when the number m of the liquid ejecting heads 2 aligned in the +X direction when viewed in the +Z direction and the number n of the liquid ejecting heads 2 aligned in the +Y direction satisfy m<n, the support body 10 is elongated in the +Y direction in which the number of liquid ejecting heads 2 is large, and shortened in the +X direction. That is, the width of the support body 10 in the +Y direction is larger than the width in the +X direction. In this manner, since the support body 10 is shortened in the +X direction, the distance from the operator 100 to the liquid ejecting head 2 positioned in the −X direction farthest can be shortened, and the maintenance work of the liquid ejecting head 2 can be easily performed.

Embodiment 2

Figure 13:
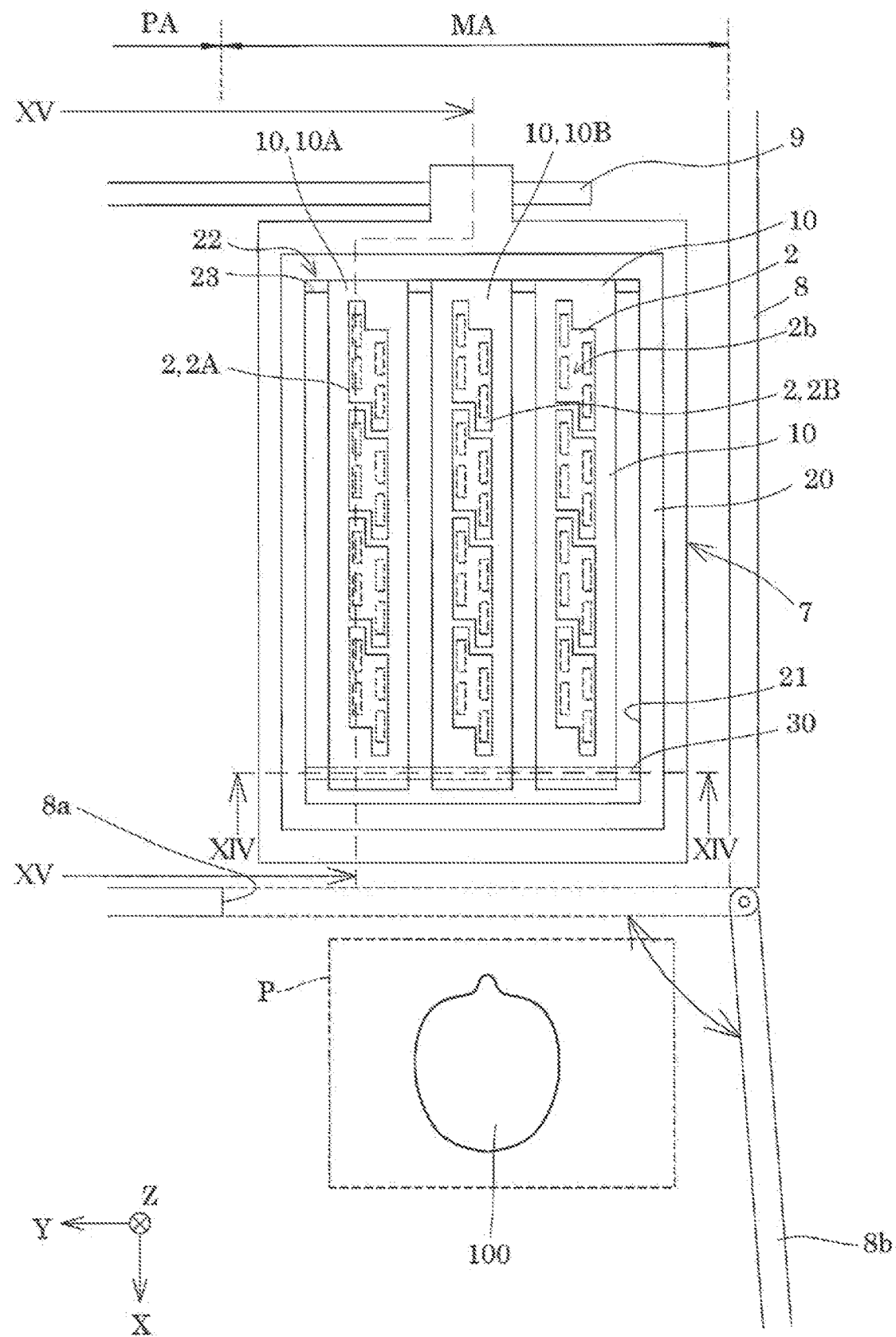
FIG. 13 is a plan view of a main portion of a liquid ejecting apparatus according to Embodiment 2.
Figure 14:
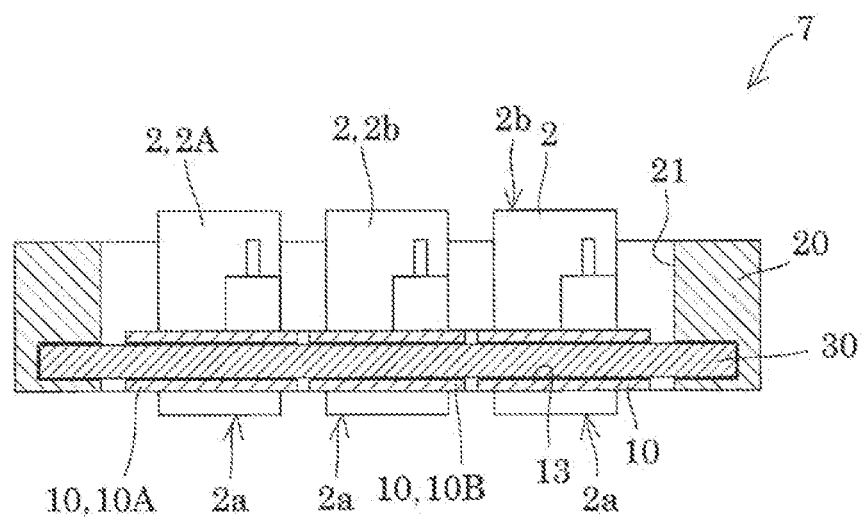
FIG. 14 is a sectional view of a main portion of the liquid ejecting apparatus according to Embodiment 2.
Figure 15:
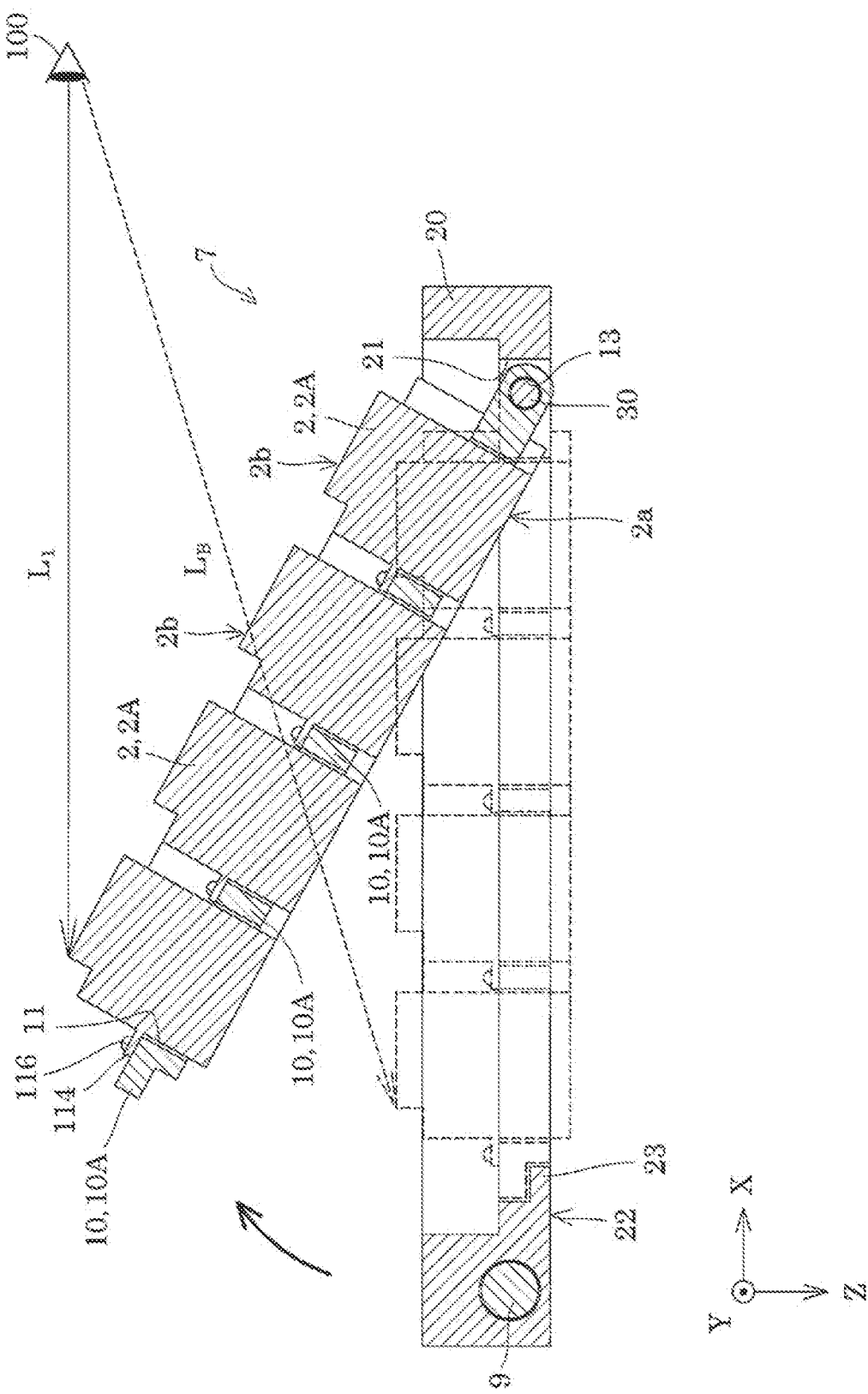
FIG. 15 is a sectional view of a main portion of the liquid ejecting apparatus according to Embodiment 2.
Figure 16:
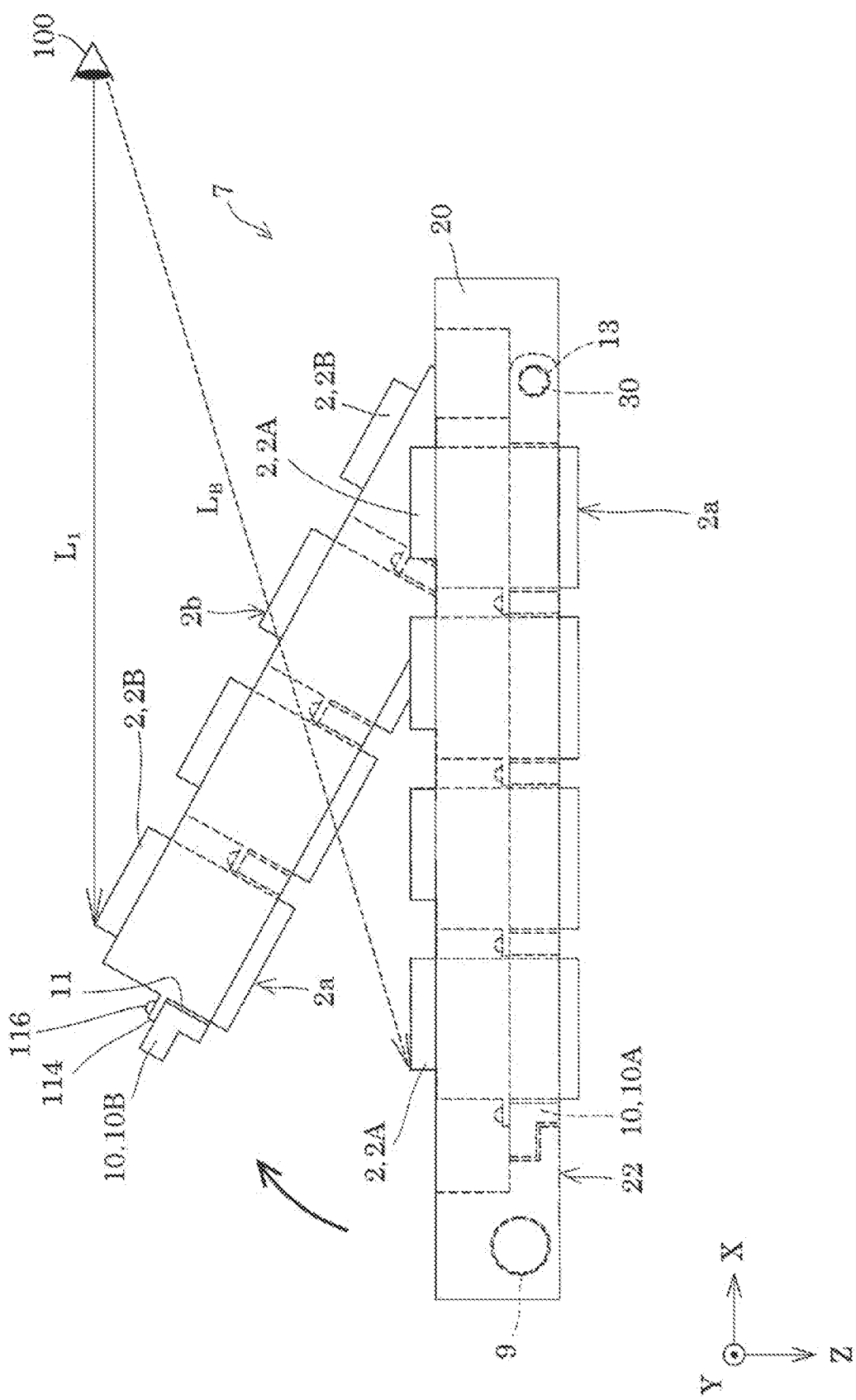
FIG. 16 is a side view of the liquid ejecting apparatus according to Embodiment 2.

FIG. 13 is a plan view of a main portion of the liquid ejecting apparatus 1 according to Embodiment 2 of the present disclosure when viewed in the +Z direction. FIG. 14 is a sectional view taken along the line XIV-XIV in FIG. 13. FIG. 15 is a sectional view taken along the line XV-XV in FIG. 13 and is a view illustrating an inclined posture of the first support body 10A. FIG. 16 is a side view of the support unit 7 when viewed in the −Y direction, and is a view illustrating an inclined posture of a second support body 10B. The same reference numerals will be given to the same members as those in the above-described embodiment, and overlapping description thereof will be omitted. Further, in the present embodiment, the "first direction" is the +Y direction, and the "second direction" is the +X direction.

As illustrated in the drawing, the support unit 7 of the present embodiment supports a plurality of liquid ejecting heads 2. The plurality of liquid ejecting heads 2 supported by the support unit 7 are aligned by three in the +Y direction and by four in the +X direction, for a total of twelve.

The support unit 7 includes the plurality of support bodies 10, the base portion 20, and the rotation shaft member 30.

Three support bodies 10 are provided in the present embodiment. Each of the support bodies 10 supports the plurality of liquid ejecting heads 2. In the present embodiment, each support body 10 supports four liquid ejecting heads 2. The four liquid ejecting heads 2 supported by each of the support bodies 10 are provided in parallel in the +X direction. That is, the four liquid ejecting heads 2 are disposed at the same positions in the +Y direction but at different positions in the +X direction. That is, the three support bodies 10 of the present embodiment have a configuration in which the support body 10 of Embodiment 1 is divided into three in the +Y direction. Therefore, the width of the support body 10 in the +X direction when viewed in the +Z direction is larger than the width in the +Y direction. That is, the support body 10 is elongated in the +X direction when viewed in the +Z direction. These three support bodies 10 are provided in parallel in the +Y direction at the same position in the +X direction. In addition, in the entire support unit 7, four rows of liquid ejecting heads 2 provided in parallel along the X-axis direction are provided in three rows along the Y-axis direction. That is, the plurality of liquid ejecting heads 2 are aligned by 4 in the +X direction and by three in the +Y direction. Therefore, when the number of liquid ejecting heads 2 aligned in the +X direction is m (m is a natural number of 2 or more) and the number of liquid ejecting heads 2 aligned in the +Y direction is n (n is a natural number of 1 or more), the relationship of m>n is satisfied.

The base portion 20 has a support hole 21 for supporting the support body 10 and exposing the nozzle surface 2a of the liquid ejecting head 2 supported by the support body 10 in the +Z direction. The support hole 21 is provided to penetrate the base portion 20 in the Z-axis direction. The support holes 21 may be provided independently corresponding to each support body 10, or may be provided in common for the plurality of support bodies 10. In the present embodiment, one support hole 21 is provided in common to the three support bodies 10.

The rotation shaft member 30 is disposed in the end portion of the support hole 21 in the +X direction such that the +Y direction is the shaft direction, similarly to Embodiment 1.

The rotation shaft member 30 may be integrally provided with the base portion 20, or may be a separate body fixed to the base portion 20. Further, the rotation shaft member 30 may be held rotatably with respect to the base portion 20, or may be fixed to the base portion 20 not to rotate.

The support body 10 is supported by the rotation shaft member 30 fixed to the base portion 20.

The support body 10 has a through-hole 13 penetrating in the +Y direction at an end portion in the +X direction. The rotation shaft member 30 is inserted into the through-hole 13 of the support body 10. In addition, the support body 10 is rotatable about the rotation shaft member 30. That is, the support body 10 is rotatable about a virtual "rotation shaft" extending in the +Y direction. In the present embodiment, the "rotation shaft" around which the support body 10 is rotatable coincides with the rotation shaft member 30.

Further, the three support bodies 10 of the present embodiment are rotatably provided by the common rotation shaft member 30. Further, each support body 10 is independently rotatable with respect to the base portion 20. That is, the support body 10 is provided separately for each head group in which a plurality of liquid ejecting heads 2 are provided in parallel in the +X direction, and each support body 10 is provided rotatably for each head group with respect to the base portion 20.

The end portions of each support body 10 in the −X direction abut on the end portion of the base portion 20 on the −X direction side that defines the support hole 21, and the restriction mechanism 22 that restricts the end portions of each support body 10 from rotationally moving in the +Z direction with respect to the base portion 20 is provided. In the present embodiment, the restriction mechanism 22 has a protrusion portion 23 that protrudes in the +X direction from the end portion of the support hole 21 in the −X direction. The surface of the protrusion portion 23 facing the −Z direction abuts on the surface of the end portions of each support body 10 in the −X direction facing the +Z direction, and accordingly, the end portions of each support body 10 in the −X direction is restricted from rotationally moving in the +Z direction.

That is, from the state where the end portion in the −X direction abuts on the protrusion portion 23, each support body 10 is only allowed to rotationally move the end portion in the −X direction in the −Z direction.

Here, in the present embodiment, any one of the plurality of support bodies 10 is the "first support body 10A," and any one of the plurality of liquid ejecting heads 2 supported by the first support body 10A is the "first liquid ejecting head 2A." In addition, any one of the support bodies 10 other than the first support body 10A is the "second support body 10B," and any one of the plurality of liquid ejecting heads 2 supported by the second support body 10B is the "second liquid ejecting head 2B." In the present embodiment, among the three support bodies 10, the support body 10 positioned most in the +Y direction is referred to as the first support body 10A, and the support body 10 at the center in the +Y direction is referred to as the second support body 10B. That is, the first support body 10A and the second support body 10B are aligned in the +Y direction. As described above, the first support body 10A and the second support body 10B have the same configuration, but it is needless to say that the number of the liquid ejecting heads 2 supported by the first support bodies 10A and the second support bodies 10B and the positions in the +X direction with respect to the base portion 20 may be different. Further, the support body 10 other than the first support body 10A and the second support body 10B may be the first support body 10A, the second support body 10B, or other support bodies.

In this manner, by providing the support unit 7 with the first support body 10A and the second support body 10B, it is possible to rotate only the support body 10 that supports the liquid ejecting head 2 to which the maintenance is performed. For example, as illustrated in FIG. 16, when the maintenance of the second liquid ejecting head 2B is performed, by rotating only the second support body 10B, a space can be provided on both sides of the second liquid ejecting head 2B in the +Y direction and the −Y direction. Therefore, by rotating only the support body 10 that supports the liquid ejecting head 2 which is a maintenance target, it is possible to secure spaces in the +Y direction and −Y direction of the liquid ejecting head 2 which is the maintenance target, and it is possible to make it easier to perform the maintenance work of the liquid ejecting head 2.

Further, in the present embodiment, since each support body 10 supports each group of the liquid ejecting heads 2 aligned in the +X direction, when the maintenance of the plurality of liquid ejecting heads 2 is performed, as compared with the case where the support body supports the single body of the liquid ejecting head 2, the frequency of the rotational operation for rotating the support body 10 is reduced, and the time required for maintenance can be shortened.

Further, in the present embodiment, since the plurality of support bodies 10 are rotatable about the common rotation shaft member 30, the number of components is reduced as compared with the case where different rotation shaft members are provided for each support body 10, and the cost can be reduced.

Further, in the present embodiment, the support body 10 is elongated in the +X direction, the base portion 20 is disposed in the −X direction with respect to the operator 100 performing the maintenance of the liquid ejecting head 2, and the rotation shaft is disposed in the +X direction with respect to the center of the base portion 20 in the +X direction in the printing posture. With reference to the opening portion 8a of the housing 8, the base portion 20 is disposed in the −X direction with respect to the opening portion 8a of the housing 8, and the rotation shaft is disposed in the +X direction with respect to the center of the base portion 20 in the +X direction in the printing posture. Further, with reference to the carriage shaft 9, the base portion 20 is disposed in the +X direction with respect to the carriage shaft 9, and the rotation shaft is disposed in the +X direction with respect to the center of the base portion 20 in the +X direction in the printing posture. In this manner, since the support body 10 is elongated in the +X direction, the distance between the operator 100 and the liquid ejecting head 2 disposed far from the operator 100 is long, but by arranging the rotation shaft on the front side, that is, on the +X direction side when viewed from the operator 100, access to the liquid ejecting head 2 far from the operator 100 is good. Therefore, the maintenance work of the liquid ejecting head 2 far from the operator 100 can be easily performed.

In the present embodiment, a gap in the Y-axis direction between the liquid ejecting head 2 supported by one support body 10 and the liquid ejecting head 2 supported by the other support body 10 out of the adjacent support bodies 10 is longer than the dimension of the liquid ejecting head 2 in the Y-axis direction, but not limited thereto. That is, in order to densely lay out the plurality of liquid ejecting heads 2 on the support unit 7, a gap in the Y-axis direction between the liquid ejecting head 2 supported by one support body 10 and the liquid ejecting head 2 supported by the other support body 10 out of the adjacent support bodies 10 may be shorter than the dimension of the liquid ejecting head 2 in the Y-axis direction. Even in such a configuration, by rotating only the support body 10 that supports the liquid ejecting head 2 which is a maintenance target, it is possible to secure spaces in the +Y direction and −Y direction of the liquid ejecting head 2 which is the maintenance target, and it is possible to make it easier to perform the maintenance work of the liquid ejecting head 2.

Modification Example 1

Figure 17:
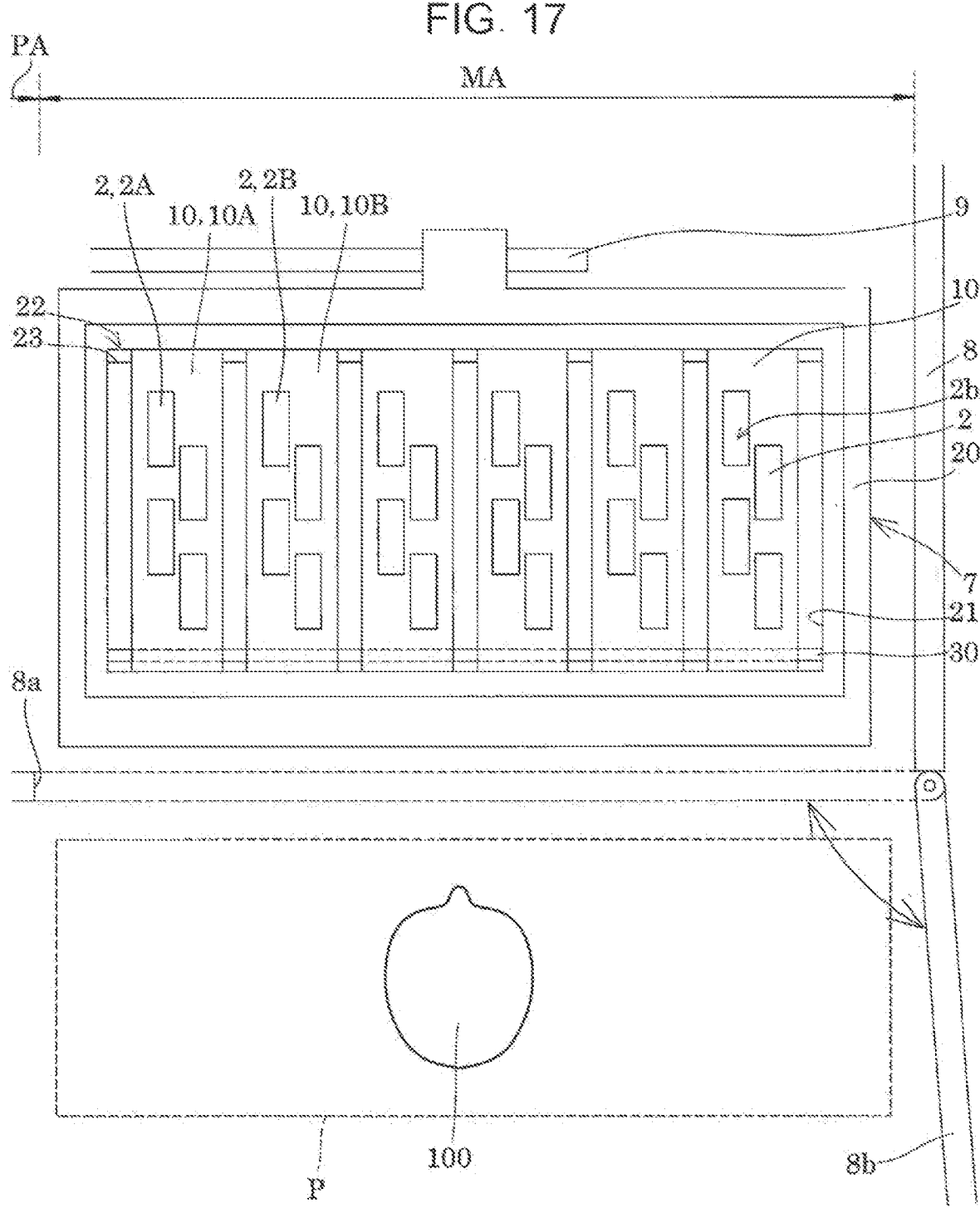
FIG. 17 is a plan view of a main portion of Modification Example 1 of the liquid ejecting apparatus according to Embodiment 2.

FIG. 17 is a plan view of a main portion of a modification example of the liquid ejecting apparatus 1 according to Embodiment 2 of the present disclosure when viewed in the +Z direction. In the present modification example, the "first direction" is the +Y direction, and the "second direction" is the +X direction.

As illustrated in FIG. 17, the support unit 7 includes the plurality of support bodies 10, the base portion 20, and the rotation shaft member 30.

Each of the support bodies 10 supports the plurality of liquid ejecting heads 2. The liquid ejecting head 2 of the present modification example is not particularly illustrated except that the liquid ejecting head 2 has a rectangular shape when viewed in the −Z direction, but similarly to the liquid ejecting head 2 of the above-described Embodiment 1, the nozzle N, the nozzle surface 2a, the nozzle plate 110, the head cover 111, the flow path coupling section 112, the electrical coupling section 113, the flange section 114, and the first fixing hole 115 are provided. It is needless to say that, also in the present modification example, the liquid ejecting head 2 of the above-described Embodiment 1 can also be used.

The plurality of liquid ejecting heads 2 supported by each of the support bodies 10 are disposed in a staggered manner along the +X direction. Here, the fact that arrangement of the plurality of liquid ejecting heads 2 in a staggered manner along the +X direction means that the liquid ejecting heads 2 provided in parallel in the +X direction are alternately disposed to be deviated in the Y-axis direction. In other words, the rows of the liquid ejecting heads 2 provided in parallel in the +X direction are provided in parallel in two rows in the +Y direction, and the rows of the two rows of liquid ejecting heads 2 are disposed with a half pitch deviation in the +X direction. In this manner, by arranging the plurality of liquid ejecting heads 2 in a staggered manner along the +X direction, the nozzles N of the two liquid ejecting heads 2 partially overlap each other in the +X direction, and continuous rows of the nozzles N in the +X direction can be formed. In the present modification example, the plurality of liquid ejecting heads 2 supported by each of the support bodies 10 are aligned by four in the X-axis direction and by two in the Y-axis direction. Therefore, each of the support bodies 10 is elongated in the +X direction and shortened in the +Y direction.

Six support bodies 10 are provided in the present modification example. The six support bodies 10 are provided in parallel in the +Y direction at the same position in the +X direction. That is, the six support bodies 10 of the present modification example have a configuration in which the support body 10 of Embodiment 1 is divided into six in the +Y direction.

When the plurality of liquid ejecting heads 2 supported by the support unit 7 by the six support bodies 10 in this manner are aligned by four in the +X direction and by twelve in the +Y direction, that is, when the number of liquid ejecting heads 2 aligned in the +X direction is m (m is a natural number of 1 or more) and the number of liquid ejecting heads 2 aligned in the +Y direction is n (n is a natural number of 2 or more) in the support unit 7, the relationship of m<n is satisfied. Therefore, the entire support unit 7 is elongated in the +Y direction and shortened in the +X direction.

The base portion 20 is provided with the same support holes 21 as those in the above-described Embodiment 2. The rotation shaft member 30 of which the shaft direction is the +Y direction is provided at the end portion of the support hole 21 in the +X direction.

The five support bodies 10 are rotatably supported by the common rotation shaft member 30, similarly to the above-described Embodiment 2.

Here, in FIG. 17, any one of the plurality of support bodies 10 is the "first support body 10A," and any one of the plurality of liquid ejecting heads 2 supported by the first support body 10A is the "first liquid ejecting head 2A." In addition, any one of the support bodies 10 other than the first support body 10A is the "second support body 10B," and any one of the plurality of liquid ejecting heads 2 supported by the second support body 10B is the "second liquid ejecting head 2B." In the present modification example, among the six support bodies 10, the support body 10 positioned most in the +Y direction is referred to as the first support body 10A, and the support body 10 positioned in the −Y direction of the first support body 10A is referred to as the second support body 10B. As described above, the first support body 10A and the second support body 10B have the same configuration, but it is needless to say that the number of the liquid ejecting heads 2 supported by the first support bodies 10A and the second support bodies 10B and the positions in the +X direction with respect to the base portion 20 may be different. Further, the support body 10 other than the first support body 10A and the second support body 10B may be the first support body 10A, the second support body 10B, or other support bodies.

As described above, in the support unit 7, when the relationship of m<n is satisfied as the number of the liquid ejecting heads 2 aligned in the +X direction is m and the number of the liquid ejecting heads 2 aligned in the +Y direction is n, the liquid ejecting heads 2 are densely packed in the +Y direction, but by providing the plurality of support bodies 10 divided in the +Y direction, each support body 10 can be rotated individually. Therefore, by rotating only the support body 10 that supports the liquid ejecting head 2 to which the maintenance is performed, it is possible to secure work spaces on both sides of the liquid ejecting head 2, to which the maintenance is performed, in the Y-axis direction. Therefore, maintenance of the liquid ejecting head 2 can be easily performed.

Modification Example 2

Figure 18:
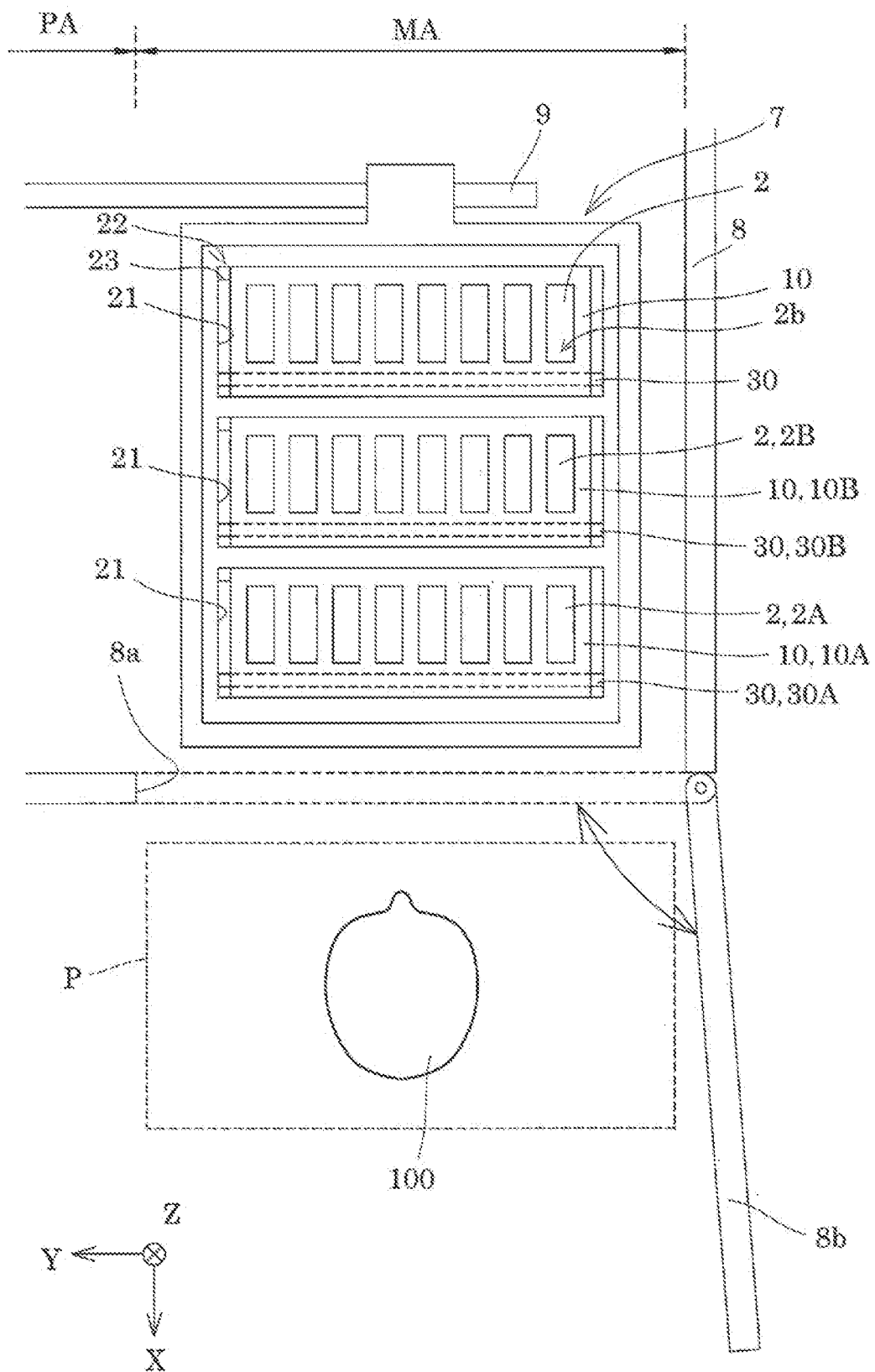
FIG. 18 is a plan view of a main portion of Modification Example 2 of the liquid ejecting apparatus according to Embodiment 2.

FIG. 18 is a plan view of a main portion of a modification example of the liquid ejecting apparatus 1 of Embodiment 2 when viewed in the +Z direction. In the present modification example, the "first direction" is the +Y direction, and the "second direction" is the +X direction.

As illustrated in FIG. 18, the support unit 7 includes the plurality of support bodies 10, the base portion 20, and the plurality of rotation shaft members 30.

Each of the support bodies 10 supports the plurality of liquid ejecting heads 2. The plurality of liquid ejecting heads 2 supported by each of the support bodies 10 are provided in parallel along the +Y direction. That is, the plurality of liquid ejecting heads 2 are disposed at the same position in the +X direction and different positions in the +Y direction on each support body 10. In the present modification example, the plurality of liquid ejecting heads 2 in each of the support bodies 10 are aligned by one in the +X direction and by eight in the +Y direction. Therefore, each of the support bodies 10 is elongated in the +Y direction and shortened in the +X direction.

Three support bodies 10 are provided in the present modification example. The three support bodies 10 are provided in parallel in the +X direction. That is, the three support bodies 10 are disposed at the same positions in the +Y direction but at different positions in the +X direction. Therefore, the plurality of liquid ejecting heads 2 supported by the support unit 7 are aligned by three in the +X direction and by eight in the +Y direction. That is, when the number of liquid ejecting heads 2 aligned in the +X direction is m (m is a natural number of 1 or more) and the number of liquid ejecting heads 2 aligned in the +Y direction is n (n is a natural number of 2 or more) in the support unit 7, the relationship of m<n is satisfied. Therefore, the entire support unit 7 is elongated in the +Y direction and shortened in the +X direction.

The base portion 20 is provided with the support hole 21 for holding the support body 10. The support holes 21 are provided independently for each support body 10. That is, three support holes 21 are provided in parallel in the +X direction in the base portion 20.

The rotation shaft members 30 of which the shaft direction is the +Y direction are provided respectively at the end portions of each of the support holes 21 in the +X direction. Each support body 10 is respectively rotatably supported by the rotation shaft member 30 with respect to the base portion 20. That is, each support body 10 is rotatable with respect to the base portion 20 by the independent rotation shaft member 30.

Here, in the present modification example, similarly to the above-described Embodiment 2, any one of the plurality of support bodies 10 is the "first support body 10A," and any one of the plurality of liquid ejecting heads 2 supported by the first support body 10A is the "first liquid ejecting head 2A." In addition, any one of the support bodies 10 other than the first support body 10A is the "second support body 10B," and any one of the plurality of liquid ejecting heads 2 supported by the second support body 10B is the "second liquid ejecting head 2B." In the present modification example, among the three support bodies, the support body 10 positioned most in the +X direction is referred to as the first support body 10A, and the support body 10 positioned in the −X direction of the first support body 10A, that is, the support body 10 at the center among the support bodies 10 aligned in the +X direction, is referred to as the second support body 10B. That is, the first support body 10A and the second support body 10B are aligned in the +X direction. As described above, the first support body 10A and the second support body 10B have the same configuration, but it is needless to say that the number of the liquid ejecting heads 2 supported by the first support bodies 10A and the second support bodies 10B and the positions in the +Y direction with respect to the base portion 20 may be different. Further, the support body 10 other than the first support body 10A and the second support body 10B may be the first support body 10A, the second support body 10B, or other support bodies 10. Further, in the present modification example, the rotation shaft member 30 that rotatably supports the first support body 10A is referred to as a "first rotation shaft member 30A", and the rotation shaft member 30 that rotatably supports the second support body 10B is referred to as a "second rotation shaft member 30B." That is, the first support body 10A is rotatable about the first rotation shaft member 30A, and the second support body 10B is rotatable about the second rotation shaft member 30B.

In this manner, by providing the support unit 7 with the first support body 10A and the second support body 10B, it is possible to rotate only the support body 10 that supports the liquid ejecting head 2 to which the maintenance is performed. In this manner, by rotating only the support body 10 that supports the liquid ejecting head 2 to which the maintenance is performed, it is possible to secure spaces in the −X direction of the liquid ejecting head 2 which is the maintenance target, and it is possible to make it easier to perform the maintenance work of the liquid ejecting head 2.

Further, in the present modification example, since each support body 10 supports each group of the liquid ejecting heads 2 aligned in the +Y direction, when the maintenance of the plurality of liquid ejecting heads 2 is performed, as compared with the case where the support body supports the single body of the liquid ejecting head 2, the frequency of the rotational operation for rotating the support body 10 is reduced, and the time required for maintenance can be shortened.

Further, the support body 10 is shortened in the +X direction, and the support body 10 rotates with the end portion in the +X direction as a rotation shaft. Therefore, it is possible to reduce the height at which the end portion in the −X direction moves in the Z-axis direction when the support body 10 is rotated. Therefore, it is not necessary to secure a space for rotating the support body 10 in the housing 8, and the size of the liquid ejecting apparatus 1 can be reduced in the Z-axis direction.

In addition, when the number of liquid ejecting heads 2 aligned in the +X direction is m (m is a natural number of 1 or more) and the number of liquid ejecting heads 2 aligned in the +Y direction is n (n is a natural number of 2 or more) in the support unit 7, the relationship of m<n is satisfied. Therefore, the entire support unit 7 is elongated in the +Y direction and shortened in the +X direction. In this manner, since the support unit 7 is shortened in the +X direction, the distance from the operator 100 to the liquid ejecting head 2 positioned in the −X direction farthest can be shortened, and maintenance work of the liquid ejecting head 2 can be easily performed.

Embodiment 3

Figure 19:
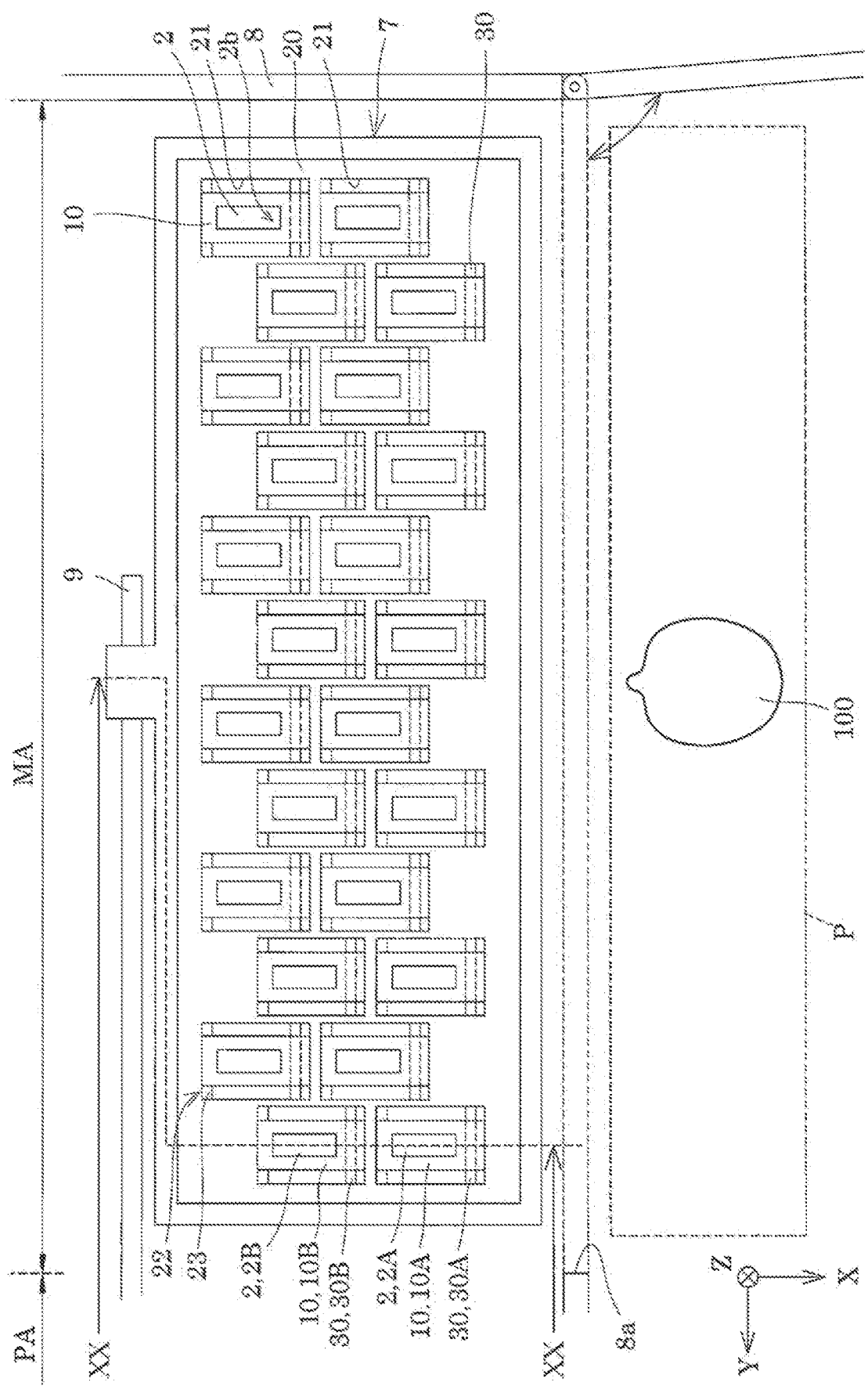
FIG. 19 is a plan view of a main portion of a liquid ejecting apparatus according to Embodiment 3.
Figure 20:
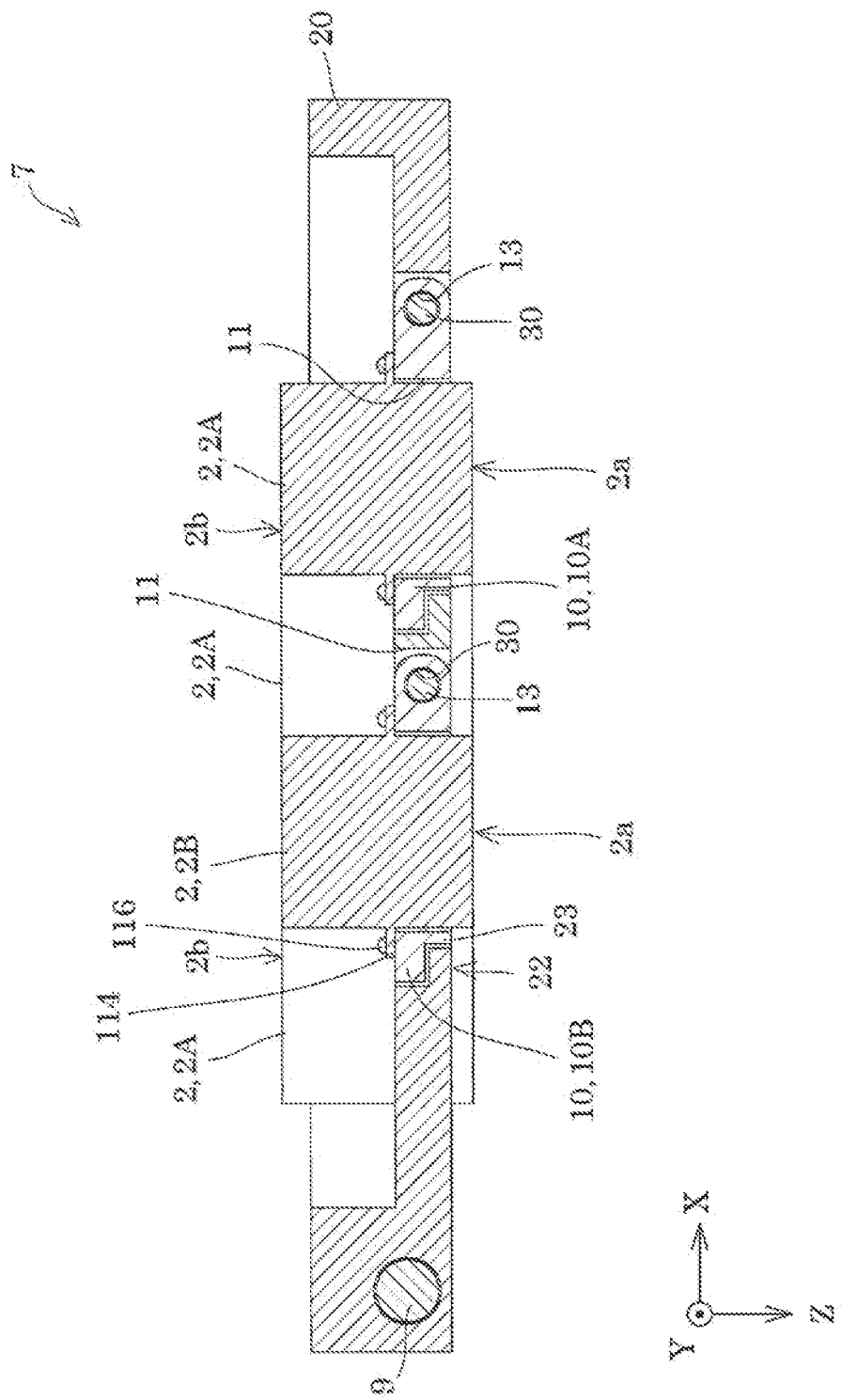
FIG. 20 is a sectional view of a main portion of the liquid ejecting apparatus according to Embodiment 3.

FIG. 19 is a plan view of a main portion of the liquid ejecting apparatus 1 according to Embodiment 3 of the present disclosure when viewed in the +Z direction. FIG. 20 is a sectional view taken along the line XX-XX in FIG. 19 and is a view illustrating an inclined posture of the support body.

The same reference numerals will be given to the same members as those in the above-described embodiment, and overlapping description thereof will be omitted.

Further, in the present embodiment, the "first direction" is the +Y direction, and the "second direction" is the +X direction.

As illustrated in the drawing, the support unit 7 supports the plurality of liquid ejecting heads 2. The support unit 7 includes the plurality of support bodies 10, the base portion 20, and the plurality of rotation shaft members 30.

Each of the support bodies 10 supports each one of the liquid ejecting heads 2. In the present embodiment, the support unit 7 has twenty four support bodies 10 and supports twenty four liquid ejecting heads 2. Further, the base portion 20 is provided with the support hole 21 for holding each of the support bodies 10. In the present embodiment, the support holes 21 are provided independently for each support body 10. Further, four support holes 21 are provided in parallel in one row in a staggered manner in the +X direction, and six rows are provided in parallel in the +Y direction.

Similarly to Embodiment 1, the rotation shaft member 30 is held by the base portion 20 to traverse the inside of the support hole 21. In the present embodiment, the rotation shaft member 30 is disposed in the support hole 21 at the end portion in the +X direction such that the +Y direction is the shaft direction.

The support body 10 is supported by the rotation shaft member 30 fixed to the base portion 20.

The support body 10 has a through-hole 13 penetrating in the +Y direction at an end portion in the +X direction. The rotation shaft member 30 is inserted into the through-hole 13 of the support body 10. In addition, the support body 10 is rotatable about the rotation shaft member 30. That is, the support body 10 is rotatable about a virtual "rotation shaft" extending in the +Y direction. In the present embodiment, the "rotation shaft" around which the support body 10 is rotatable coincides with the rotation shaft member 30.

Further, in the support unit 7, the plurality of liquid ejecting heads 2 are aligned by four in the +X direction and by twelve are aligned in the +Y direction. That is, when the number of liquid ejecting heads 2 aligned in the +X direction is m (m is a natural number of 1 or more) and the number of liquid ejecting heads 2 aligned in the +Y direction is n (n is a natural number of 2 or more), the relationship of m<n is satisfied. Therefore, the support unit 7 is elongated in the +Y direction and shortened in the +X direction.

The end portion of the support body 10 in the −X direction abuts on the end portion of the base portion 20 on the −X direction side that defines the support hole 21, and a restriction mechanism 22 that restricts the end portion of the support body 10 from rotationally moving in the +Z direction with respect to the base portion 20 is provided. In the present embodiment, the restriction mechanism 22 has a protrusion portion 23 that protrudes in the +X direction from the end portion of the support hole 21 in the −X direction. The surface of the protrusion portion 23 facing the −Z direction abuts on the surface of the end portion of the support body 10 in the −X direction facing the +Z direction, and accordingly, the end portion of the support body 10 in the −X direction is restricted from rotationally moving in the +Z direction. That is, from the state where the end portion in the −X direction abuts on the protrusion portion 23, the support body 10 is only allowed to rotationally move the end portion in the −X direction in the −Z direction.

Here, in the present embodiment, any one of the plurality of support bodies 10 is the "first support body 10A," and the liquid ejecting head 2 supported by the first support body 10A is the "first liquid ejecting head 2A." In addition, any one of the support bodies 10 other than the first support body 10A is the "second support body 10B," and the liquid ejecting head 2 supported by the second support body 10B is the "second liquid ejecting head 2B."

Further, the rotation shaft member 30 that rotatably supports the first support body 10A is referred to as the "first rotation shaft member 30A", and the rotation shaft member 30 that rotatably supports the second support body 10B is referred to as the "second rotation shaft member 30B." In the present embodiment, of the two support bodies 10 positioned in the +Y direction, the support body 10 in the +X direction is referred to as the first support body 10A, and the support body 10 in the −X direction is referred to as the second support body 10B. As described above, the first support body 10A and the second support body 10B have the same configuration. Further, the support body other than the first support body 10A and the second support body 10B may be the first support body 10A, the second support body 10B, or other support bodies 10.

As described above, since the support body 10 supports one liquid ejecting head 2, the dimensions of the support body 10 in the +X direction and the +Y direction when viewed in the +Z direction are small, and when the support body 10 is rotated, it is possible to reduce the height at which the end portion in the −X direction moves in the Z-axis direction. Therefore, it is not necessary to secure a space for rotating the support body 10 in the housing 8, and the size of the liquid ejecting apparatus 1 can be reduced in the Z-axis direction.

Further, since the support body 10 that individually supports the liquid ejecting head 2 rotates individually, only the support body 10 that supports the liquid ejecting head 2 to which the maintenance is performed can be rotated. At this time, by setting the printing posture such that the support body 10 around the liquid ejecting head 2 to which the maintenance is performed is not rotated, a work space is secured around the liquid ejecting head 2 that performs the maintenance, and the maintenance work of the liquid ejecting head 2 is performed. That is, by not rotating the support body 10 in the +Y direction and the −Y direction of the liquid ejecting head 2 to which the maintenance work is performed, it is possible to secure the work space in the +Y direction and the −Y direction of the liquid ejecting head 2 that performs the maintenance. Further, by not rotating the support body 10 in the +X direction and the −X direction of the liquid ejecting head 2 to which the maintenance is performed, a work space can be secured in the −X direction of the liquid ejecting head 2 to which the maintenance is performed, the +X direction thereof is not hidden by another support body 10 or liquid ejecting head 2, and the maintenance work of the liquid ejecting head 2 can be easily performed.

Furthermore, since the support unit 7 is shortened in the +X direction, the distance from the operator 100 to the liquid ejecting head 2 positioned in the −X direction farthest can be shortened, and the maintenance work of the liquid ejecting head 2 can be easily performed.

In the present embodiment, the plurality of sets including the support body 10 and the liquid ejecting head 2 are provided in parallel in both the +X direction and the +Y direction, that is, two-dimensionally disposed. The present disclosure is not limited to this, and the plurality of sets including the support body 10 and the liquid ejecting head 2 may be provided in parallel only in the +X direction or only in the +Y direction, that is, one-dimensionally disposed.

Modification Example 1

Figure 21:
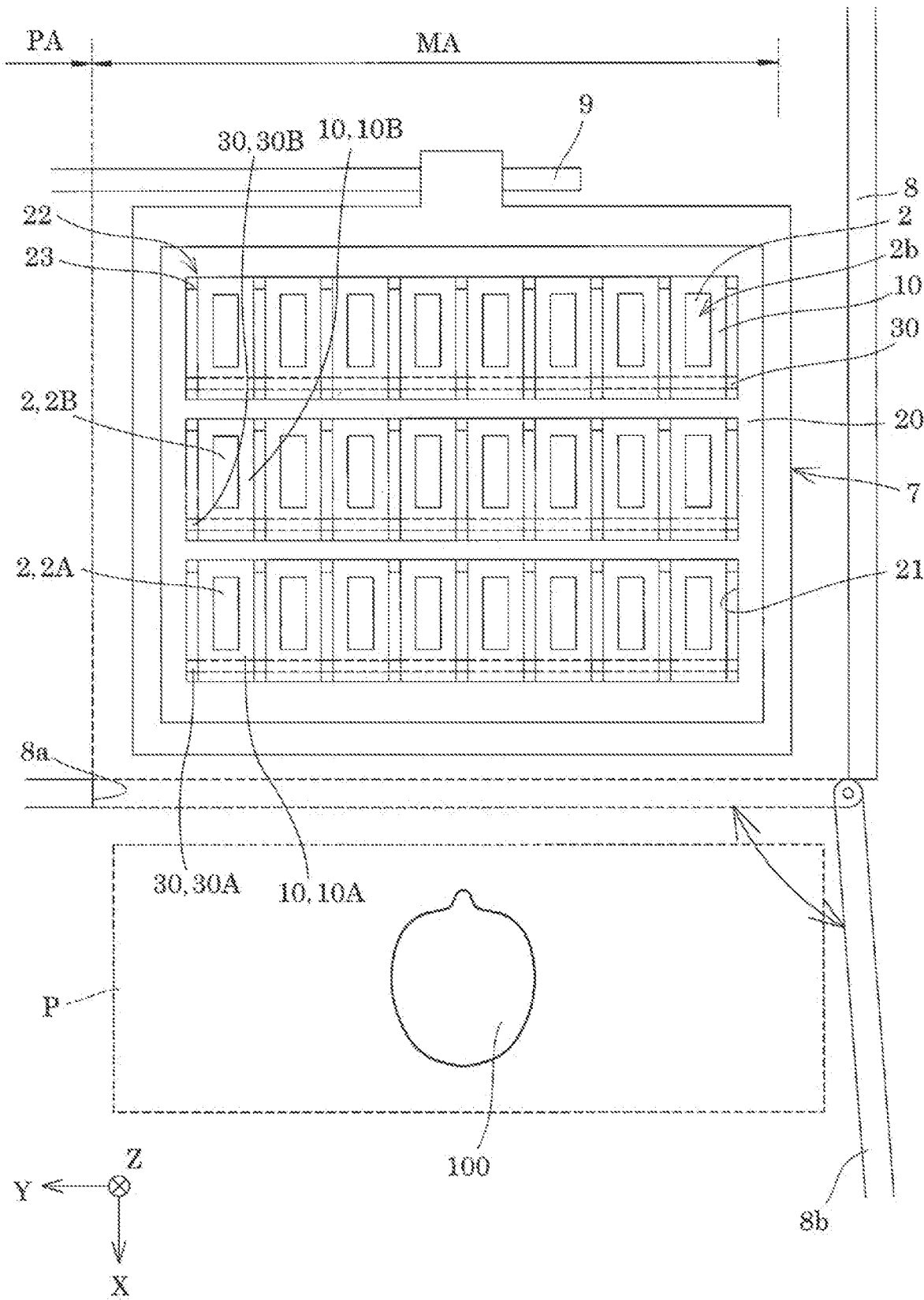
FIG. 21 is a plan view of a main portion of Modification Example 1 of the liquid ejecting apparatus according to Embodiment 3.

FIG. 21 is a plan view of a main portion of a modification example of the liquid ejecting apparatus 1 according to Embodiment 3 of the present disclosure when viewed in the +Z direction. Further, in the present modification example, the "first direction" is the +Y direction, and the "second direction" is the +X direction.

As illustrated in the drawing, the support unit 7 includes the plurality of support bodies 10, the base portion 20, and the plurality of rotation shaft members 30.

Each of the support bodies 10 supports each one of the liquid ejecting heads 2. In the present modification example, the support unit has twenty four support bodies 10 and supports twenty four liquid ejecting heads 2. Further, the base portion 20 is provided with the support hole 21 for holding each of the support bodies 10. Three support holes 21 are provided in parallel in the +X direction.

Similarly to the above-described Embodiment 3, the rotation shaft member 30 is disposed in the support hole 21 at the end portion in the +X direction such that the +Y direction is the shaft direction.

In addition, eight support bodies 10 are supported in each of the support holes 21. The eight support bodies 10 supported by one support hole 21 are provided in parallel in the +Y direction. The eight support bodies 10 supported by the one support hole 21 are rotatably supported by the common rotation shaft member 30.

That is, in the support unit 7, the plurality of liquid ejecting heads 2 are aligned by three in the +X direction and by eight in the +Y direction. That is, when the number of liquid ejecting heads 2 aligned in the +X direction is m (m is a natural number of 1 or more) and the number of liquid ejecting heads 2 aligned in the +Y direction is n (n is a natural number of 2 or more), the relationship of m<n is satisfied. Therefore, the support unit 7 is elongated in the +Y direction and shortened in the +X direction.

Here, in the present modification example, any one of the plurality of support bodies 10 is the "first support body 10A," and the liquid ejecting head 2 supported by the first support body 10A is the "first liquid ejecting head 2A."

In addition, any one of the support bodies 10 other than the first support body 10A is the "second support body 10B," and the liquid ejecting head 2 supported by the second support body 10B is the "second liquid ejecting head 2B." In the present modification example, among the support bodies 10, the support body 10 positioned most in the +Y direction and the +X direction is referred to as the first support body 10A, and the support body 10 positioned in the −X direction of the first support body 10A is referred to as the second support body 10B. As described above, the first support body 10A and the second support body 10B have the same configuration. Further, the support body other than the first support body 10A and the second support body 10B may be the first support body 10A, the second support body 10B, or other support bodies 10. Further, in the present modification example, the rotation shaft member 30 that rotatably supports the first support body 10A is referred to as a "first rotation shaft member 30A", and the rotation shaft member 30 that rotatably supports the second support body 10B is referred to as a "second rotation shaft member 30B." That is, the first support body 10A is rotatable about the first rotation shaft member 30A, and the second support body 10B is rotatable about the second rotation shaft member 30B.

Even in such a configuration, since the support body 10 supports one liquid ejecting head 2, the dimensions of the support body 10 in the +X direction and the +Y direction when viewed in the +Z direction are small, and when the support body 10 is rotated, it is possible to reduce the height at which the end portion in the −X direction moves in the Z-axis direction. Therefore, it is not necessary to secure a space for rotating the support body 10 in the housing 8, and the size of the liquid ejecting apparatus 1 can be reduced in the Z-axis direction.

Further, since the support body 10 that individually supports the liquid ejecting head 2 rotates individually, only the support body 10 that supports the liquid ejecting head 2 to which the maintenance is performed can be rotated. At this time, by setting the printing posture such that the support body 10 around the liquid ejecting head 2 to which the maintenance is performed is not rotated, a work space is secured around the liquid ejecting head 2 that performs the maintenance, and the maintenance work of the liquid ejecting head 2 is performed.

In addition, since the support unit 7 is shortened in the +X direction, the distance from the operator 100 to the liquid ejecting head 2 positioned in the −X direction farthest can be shortened, and the maintenance work of the liquid ejecting head 2 can be easily performed.

Further, since the rotation shaft member 30 common to the plurality of support bodies 10 is provided, the number of components can be reduced and the cost can be reduced.

Embodiment 4

Figure 22:
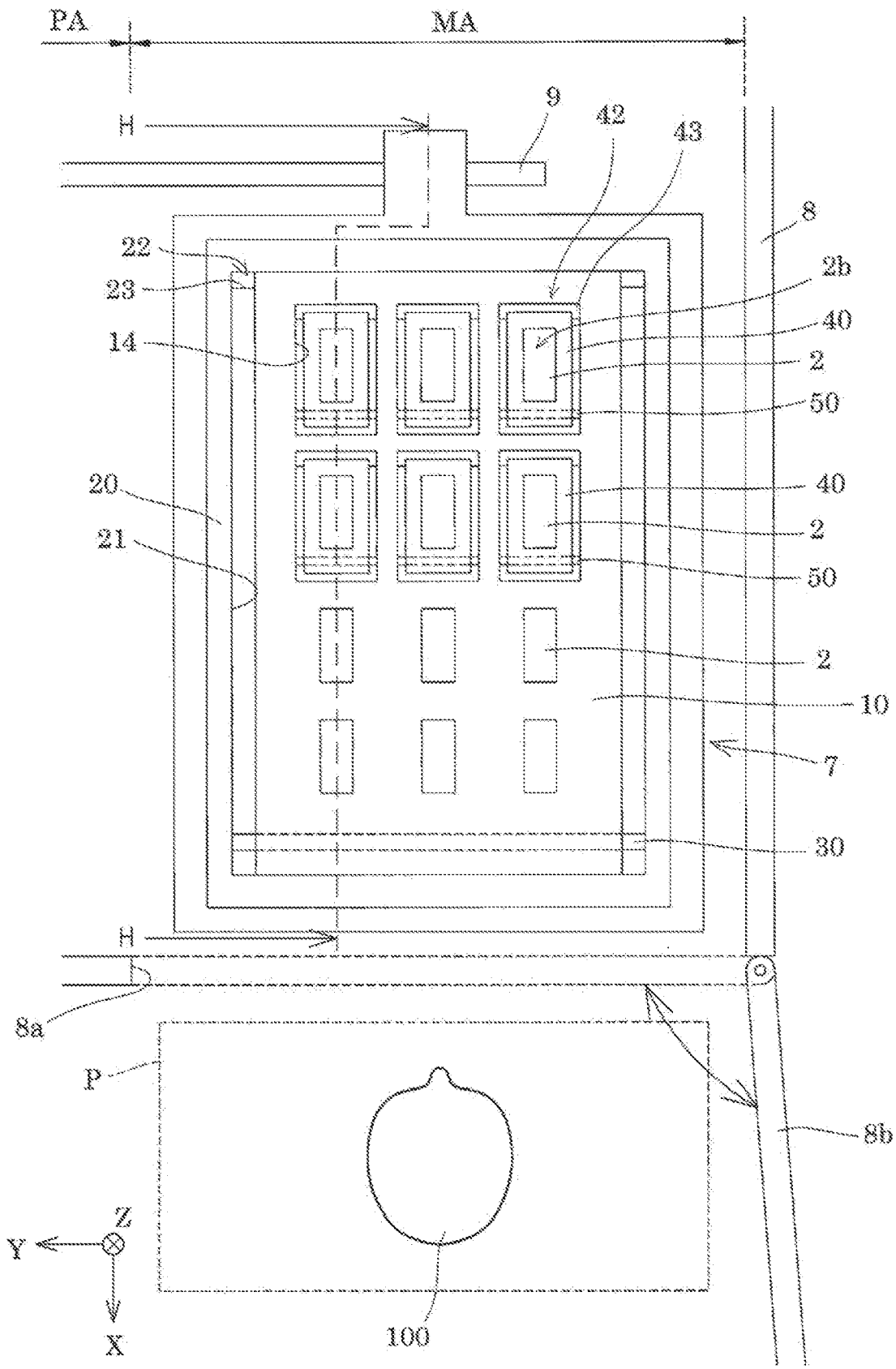
FIG. 22 is a plan view of a main portion of a liquid ejecting apparatus according to Embodiment 4.
Figure 23:
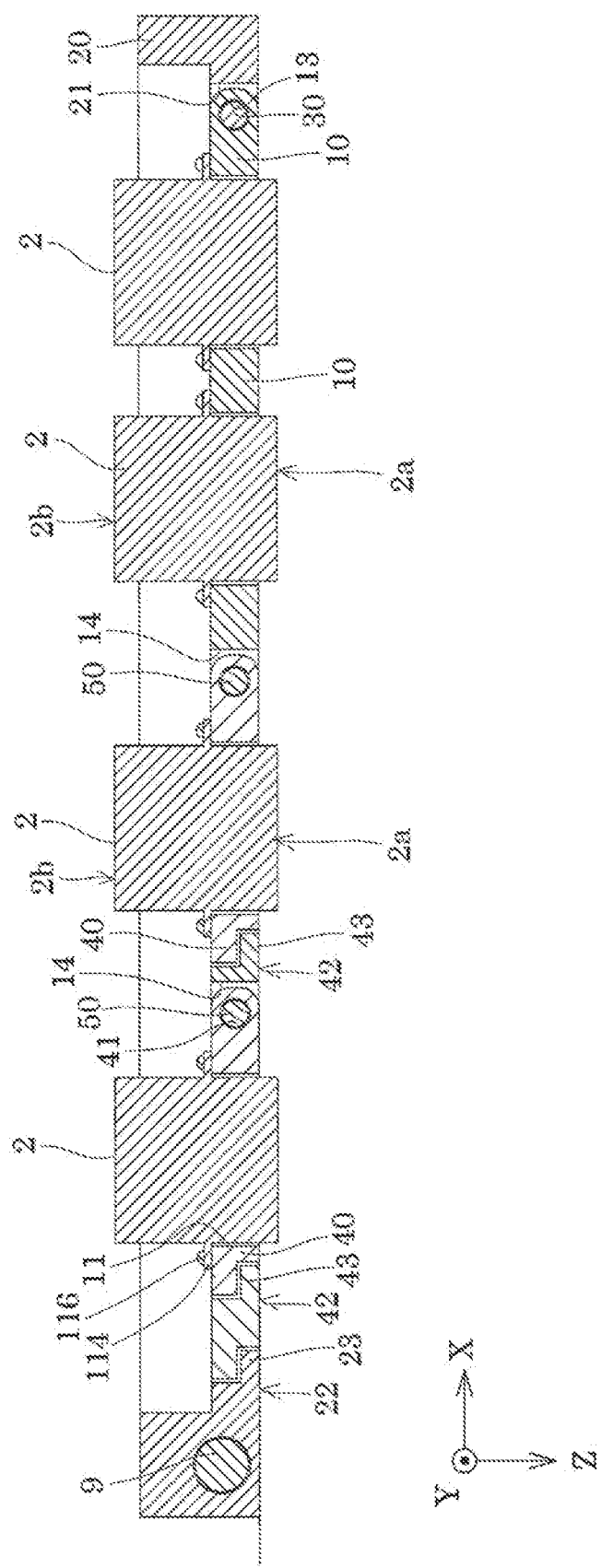
FIG. 23 is a sectional view of a main portion of the liquid ejecting apparatus according to Embodiment 4.
Figure 24:
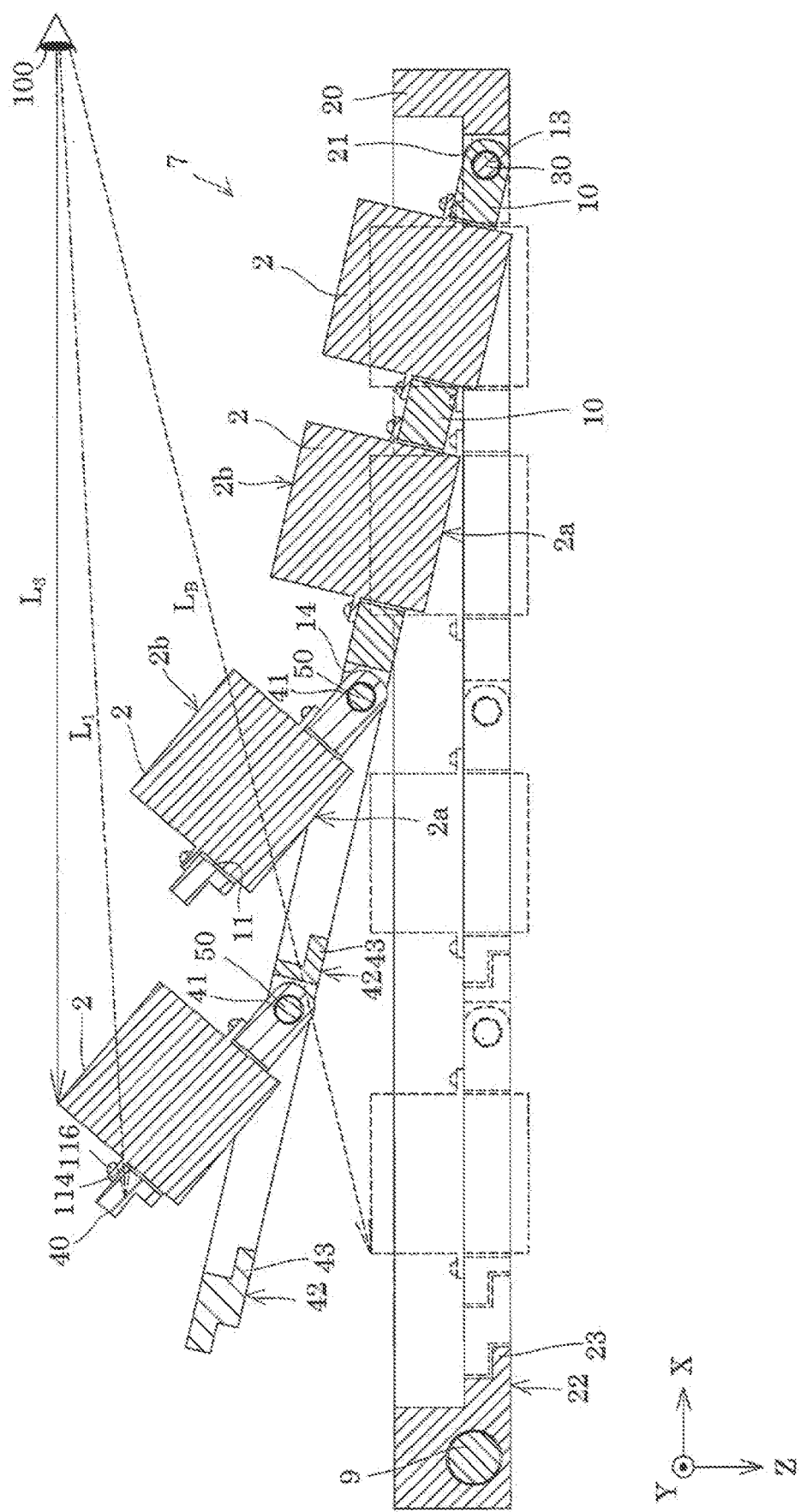
FIG. 24 is a sectional view of a main portion of the liquid ejecting apparatus according to Embodiment 4.

FIG. 22 is a plan view of a main portion of the liquid ejecting apparatus 1 according to Embodiment 4 of the present disclosure when viewed in the +Z direction. FIG. 23 is a sectional view taken along the line H-H of FIG. 22 and is a view illustrating a printing posture. FIG. 24 is a sectional view taken along the line H-H of FIG. 22 and is a view illustrating an inclined posture. The same reference numerals will be given to the same members as those in the above-described embodiment, and overlapping description thereof will be omitted. Further, in the present embodiment, the "first direction" is the +Y direction, and the "second direction" is the +X direction.

As illustrated in the drawing, the support unit 7 of the present embodiment supports a plurality of liquid ejecting heads 2. The plurality of liquid ejecting heads 2 supported by the support unit 7 are aligned by three in the +Y direction and by four in the +X direction, for a total of twelve.

The support unit 7 includes a support body 10, a base portion 20, a rotation shaft member 30, a plurality of sub-support bodies 40, and a sub-rotation shaft member 50.

Since the support body 10, the base portion 20, and the rotation shaft member 30 have the same basic configurations as those in Embodiment 1, the overlapping description thereof will be omitted.

Each of the sub-support bodies 40 is rotatable about a rotation shaft extending in the +Y direction with respect to the support body 10. Further, each of the sub-support bodies 40 is disposed in the -X direction with respect to the center of the support body 10 in the +X direction.

Each of the sub-support bodies 40 supports one liquid ejecting head 2. The sub-support body 40 is provided for two liquid ejecting heads 2 in the -X direction out of four liquid ejecting heads 2 aligned in the +X direction. That is, since the two liquid ejecting heads 2 in the -X direction are aligned by three in the +Y direction, the sub-support body 40 is provided for a total of six liquid ejecting heads 2.

Further, of the four liquid ejecting heads 2 aligned in the +X direction, two liquid ejecting heads 2 in the +X direction are directly supported on the support body 10. That is, since the two liquid ejecting heads 2 in the +X direction are aligned by three in the +Y direction, the support body 10 supports the six liquid ejecting heads 2. That is, in the present embodiment, the plurality of liquid ejecting heads 2 directly supported by the support body 10 and the plurality of liquid ejecting heads 2 indirectly supported by the support body 10 via the sub-support body 40 are included. Therefore, the support body 10 that directly or indirectly supports all the liquid ejecting heads 2 corresponds to the "first support body." Further, any one of the plurality of liquid ejecting heads 2 directly or indirectly supported by the support body 10 corresponds to the "first liquid ejecting head."

Specifically, the support body 10 is provided with a sub-holding hole 14 for holding each of the sub-support bodies 40 to penetrate in the Z-axis direction. The sub-rotation shaft member 50 of which the shaft direction is the +Y direction is held at the end portion of the sub-holding hole 14 in the +X direction.

A sub-through-hole 41 that penetrates the sub-support body 40 in the +Y direction is provided at the end portion of the sub-support body 40 in the +X direction. The sub-rotation shaft member 50 is inserted into the sub-through-hole 41 of the sub-support body 40. In addition, the sub-support body 40 is rotatable about the shaft of the sub-rotation shaft member 50. That is, the sub-support body 40 is rotatable about a virtual "rotation shaft" extending in the +Y direction. In the present embodiment, the "rotation shaft" around which the sub-support body 40 is rotatable coincides with the center shaft of the sub-rotation shaft member 50.

The end portion of the sub-support body 40 in the -X direction abuts on the end portion of the support body 10 on the -X direction side that defines the sub-holding hole 14, and a sub-restriction section 42 that restricts the end portion of the sub-support body 40 in the -X direction from rotationally moving in the +Z direction with respect to the support body 10 is provided. In the present embodiment, the sub-restriction section 42 has a protrusion portion 43 protruding in the +X direction at the opening edge portion of the sub-holding hole 14. The surface of the protrusion portion 43 facing the -Z direction abuts on the surface of the end portion of the sub-support body 40 facing the +Z direction, and accordingly, the end portion of the sub-support body 40 in the -X direction is restricted from rotationally moving in the +Z direction. That is, from the state where the end portion in the -X direction abuts on the sub-restriction section 42, the sub-support body 40 is only allowed to rotationally move the end portion in the -X direction in the -Z direction.

The sub-rotation shaft member 50 may be fixed to the sub-support body 40 and rotatably supported by the support body 10. A case where sub-rotation shaft member 50 is fixed to the sub-support body 40 in this manner includes a case where the sub-support body 40 is rotatable about the "rotation shaft" that coincides with the sub-rotation shaft member 50.

In such a configuration in which the support unit 7 has the sub-support body 40, the support body 10 and the sub-support body 40 can take the printing posture in which the nozzle surface 2a is along the XY plane as illustrated in FIG. 23, and the inclined posture in which the support body 10 rotates and is inclined with respect to the base portion 20 and the sub-support body 40 rotates and is inclined with respect to the support body 10 as illustrated in FIG. 24. That is, as illustrated in FIG. 24, in the inclined posture, the sub-support body 40 can be further inclined with respect to the support body 10 inclined with respect to the horizontal posture. Therefore, it is possible to make it easier for the operator 100 to visually recognize the liquid ejecting head 2 by setting the inclined posture in which the liquid ejecting head 2 in the -X direction, which is particularly far from the operator 100, is supported by the sub-support body 40 and rotated. In addition, a distance $L_3$ between the operator 100 and the liquid ejecting head 2 supported by the sub-support body 40 in the -X direction, which is far from the operator 100, in the inclined posture, can be further shortened as compared with the distance $L_1$ between the operator 100 and the liquid ejecting head 2 in the -X direction, which is far from the operator 100 in a state where the sub-support body 40 is not further inclined with respect to the support body 10 inclined with respect to the horizontal posture. Therefore, the maintenance work of the liquid ejecting head 2 far from the operator 100 can be easily performed. It is needless to say that, since the liquid ejecting head 2 disposed in the +X direction close to the operator 100 is inclined similarly to the above-described Embodiment 1, the maintenance work of the liquid ejecting head 2 disposed in the +X direction can be easily performed.

Further, in the present embodiment, since the sub-support body 40 supports one liquid ejecting head 2, by rotating only the sub-support body 40 that supports the liquid ejecting head 2 to which the maintenance is performed, it is possible to secure the work space around the liquid ejecting head 2 to which the maintenance is performed. Therefore, the maintenance of the liquid ejecting head 2 can be more easily performed.

Modification Example 1

Figure 25:
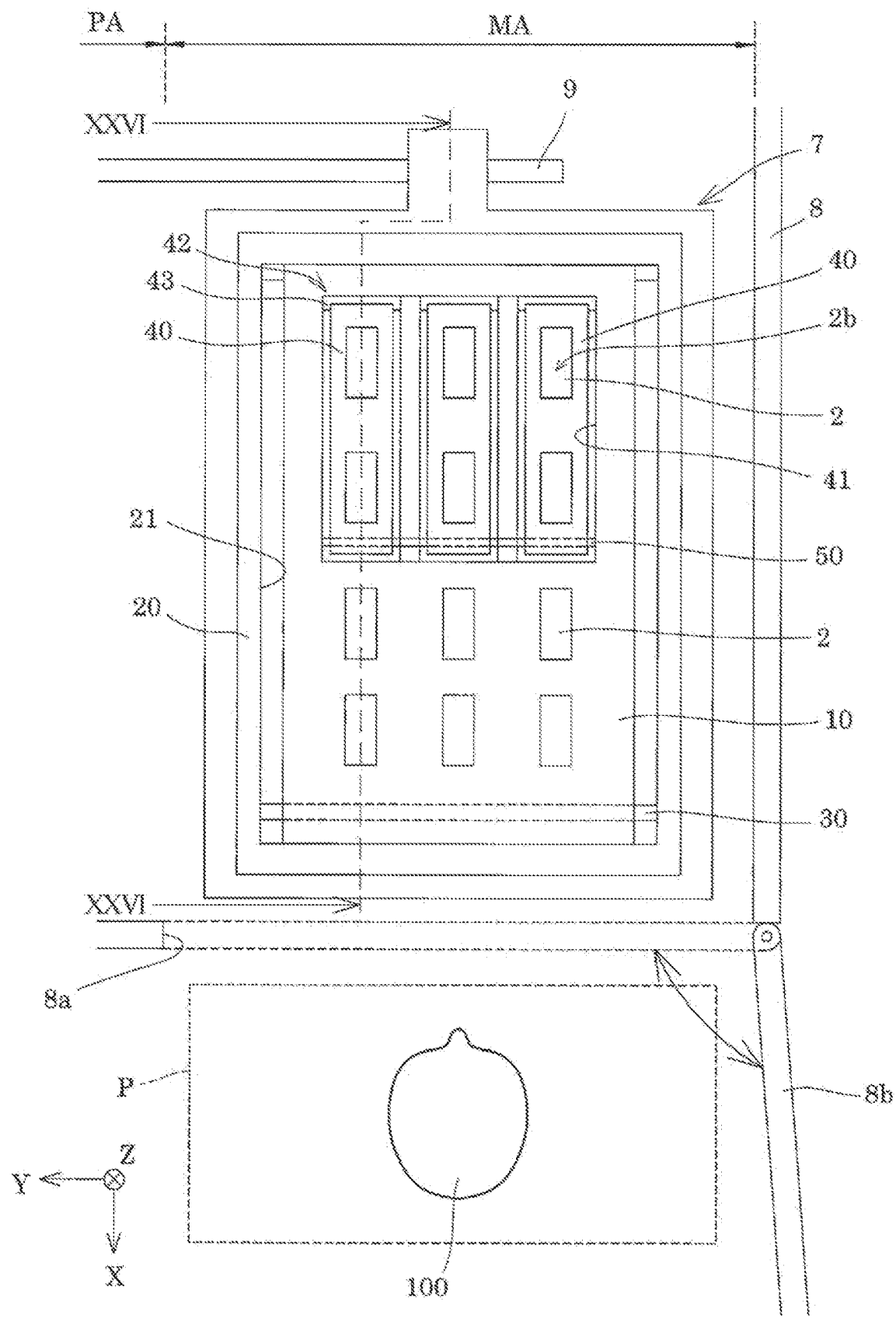
FIG. 25 is a plan view of a main portion of Modification Example 1 of the liquid ejecting apparatus according to Embodiment 4.
Figure 26:
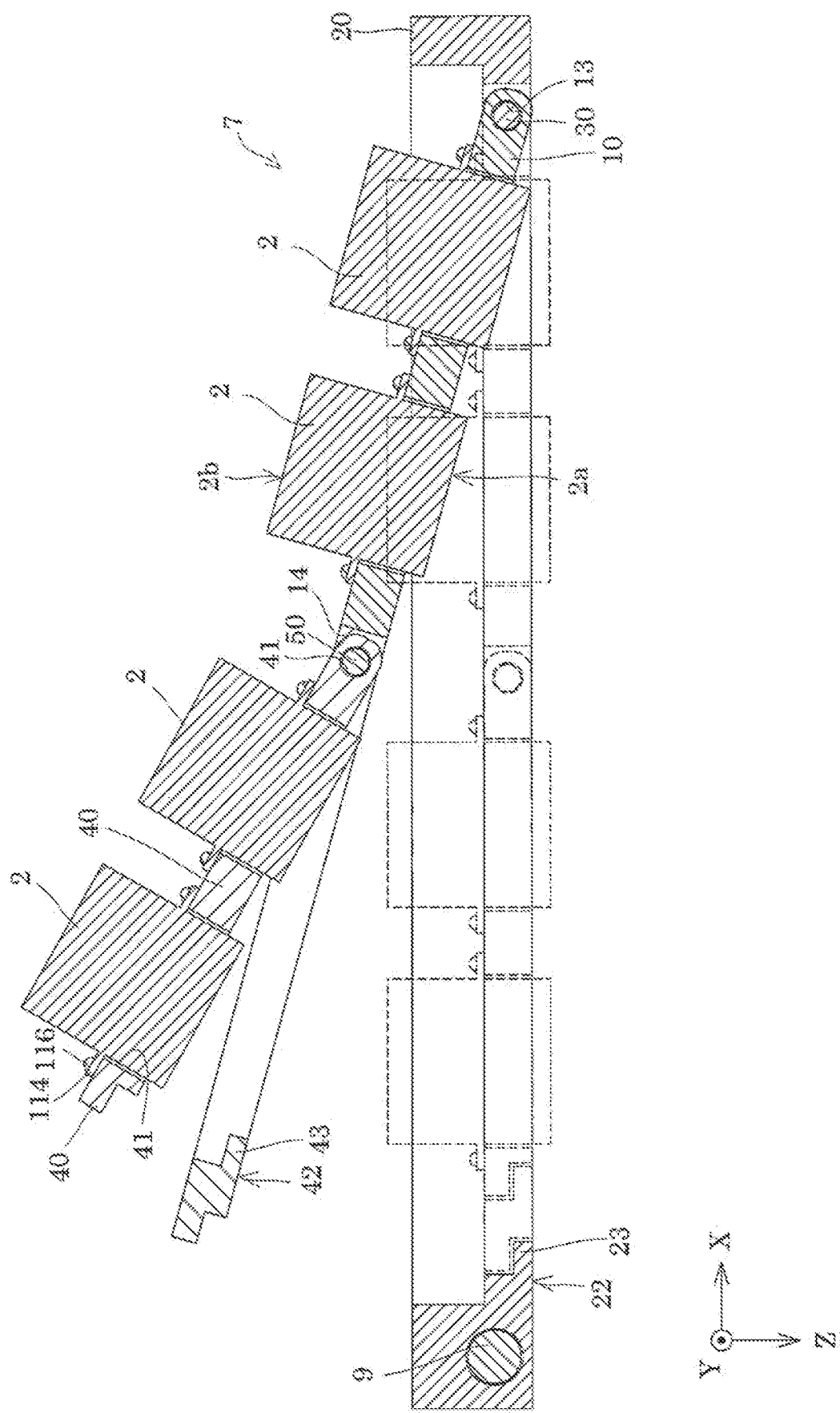
FIG. 26 is a sectional view of a main portion of Modification Example 1 of the liquid ejecting apparatus according to Embodiment 4.

FIG. 25 is a plan view of a main portion of a modification example of the liquid ejecting apparatus 1 of Embodiment 4 when viewed in the +Z direction. FIG. 26 is a sectional view taken along the line XXVI-XXVI of FIG. 25 and is a view illustrating an inclined posture. In the present modification example, the "first direction" is the +Y direction, and the "second direction" is the +X direction. Further, the support body 10 that directly or indirectly supports all the liquid ejecting heads 2 corresponds to the "first support body." Furthermore, any one of the plurality of liquid ejecting heads 2 directly or indirectly supported by the support body 10 corresponds to the "first liquid ejecting head."

As illustrated in the drawing, the sub-support body 40 commonly supports two rows of liquid ejecting heads 2 aligned in the +X direction. Even with such a configuration, the same effect as that of the above-described Embodiment 4 can be achieved.

The sub-support body 40 may commonly support three rows of liquid ejecting heads 2 aligned in the +Y direction. Further, the sub-support body 40 may commonly support two liquid ejecting heads 2 in the +X direction and three in the +Y direction, for a total of six liquid ejecting heads. That is, the number of the sub-support bodies 40 may be one.

Embodiment 5

Figure 27:
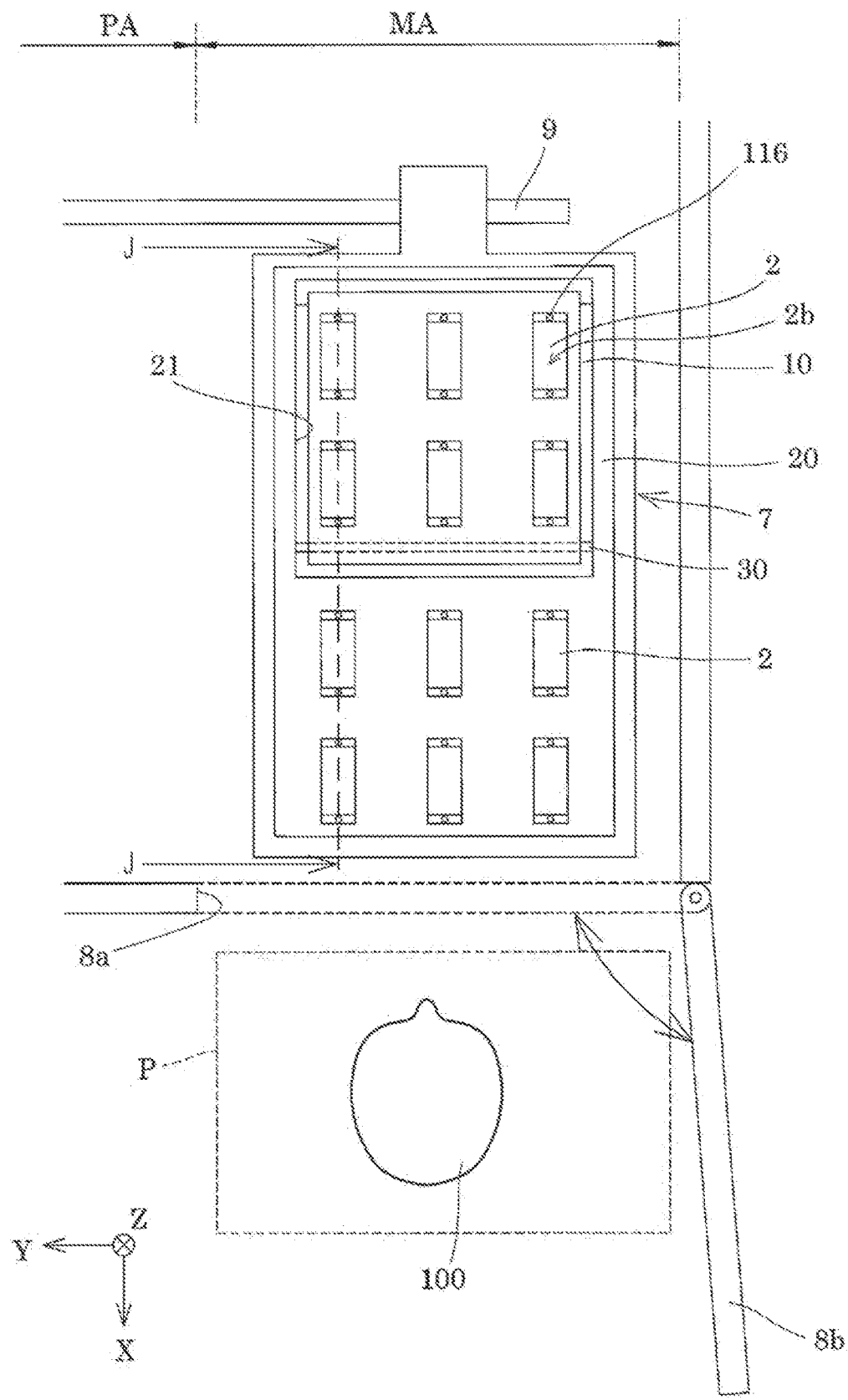
FIG. 27 is a plan view of a main portion of a liquid ejecting apparatus according to Embodiment 5.
Figure 28:
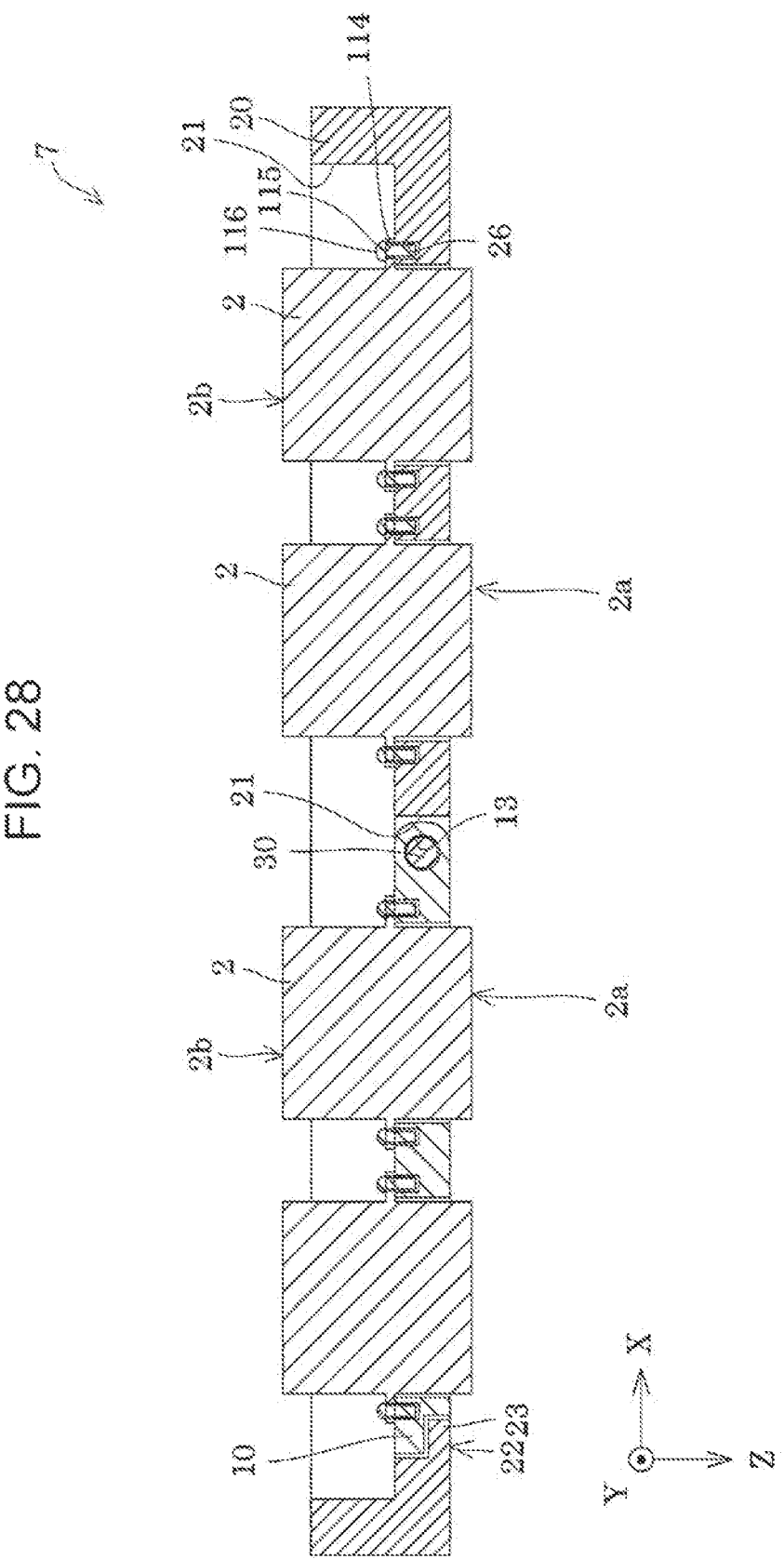
FIG. 28 is a sectional view of a main portion of a liquid ejecting apparatus according to Embodiment 5.
Figure 29:
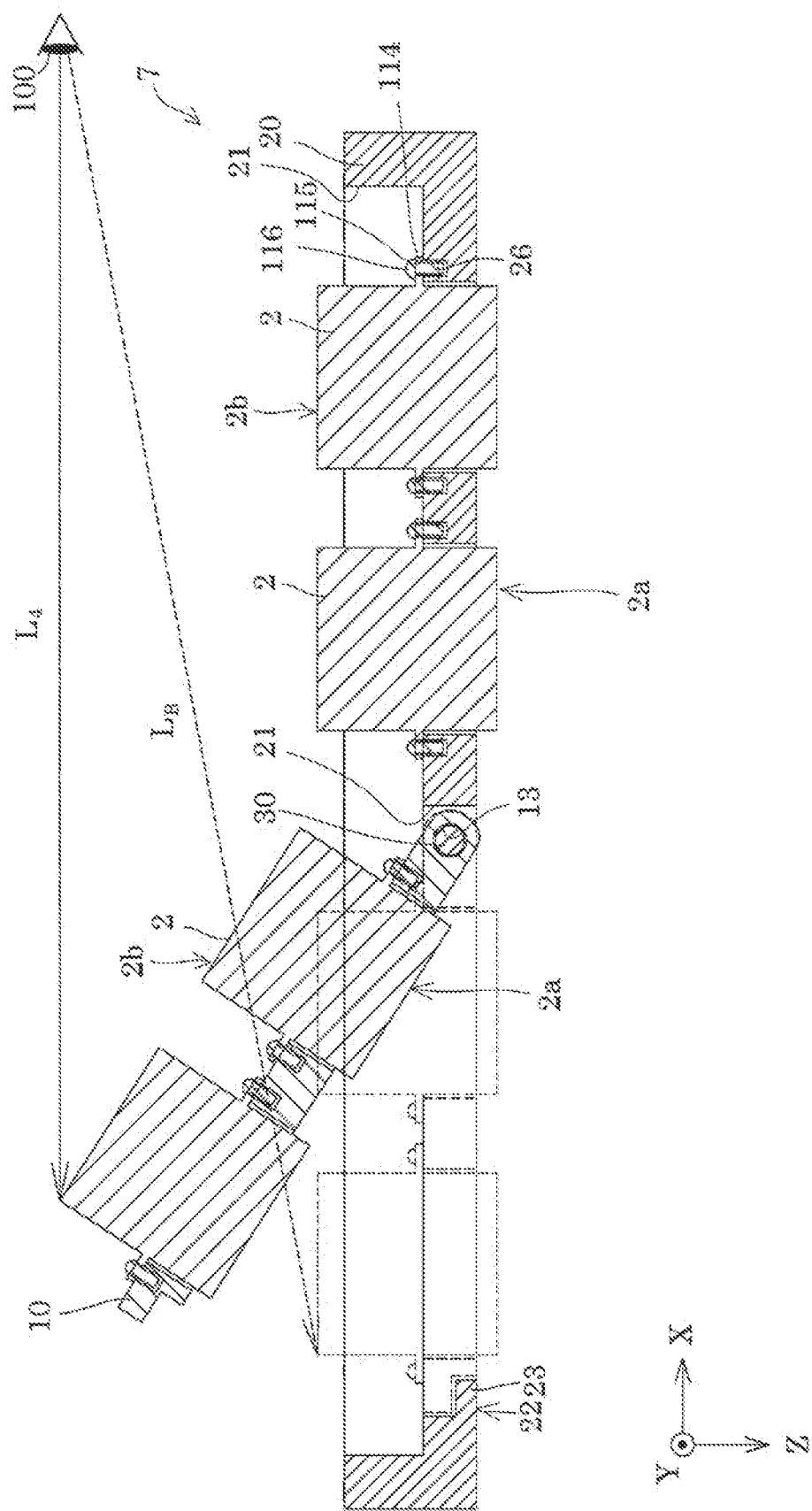
FIG. 29 is a sectional view of a main portion of the liquid ejecting apparatus according to Embodiment 5.

FIG. 27 is a plan view of a main portion of the liquid ejecting apparatus 1 according to Embodiment 5 of the present disclosure when viewed in the +Z direction. FIG. 28 is a sectional view taken along the line J-J of FIG. 27 and is a view illustrating a printing posture. FIG. 29 is a sectional view taken along the line J-J of FIG. 27 and is a view illustrating an inclined posture. The same reference numerals will be given to the same members as those in the above-described embodiment, and overlapping description thereof will be omitted. Further, in the present embodiment, the "first direction" is the +Y direction, and the "second direction" is the +X direction.

As illustrated in the drawing, the support unit 7 of the present embodiment supports a plurality of liquid ejecting heads 2. The plurality of liquid ejecting heads 2 supported by the support unit 7 are aligned by three in the +Y direction and by four in the +X direction, for a total of twelve.

The support unit 7 includes the support body 10, the base portion 20, and the rotation shaft member 30.

The support body 10 supports six liquid ejecting head 2. The six liquid ejecting heads 2 supported by the support body 10 are aligned by two in the +X direction and by three in the +Y direction on the support body 10. In the present embodiment, the support body 10 that supports the six liquid ejecting heads 2 corresponds to the "first support body," and any one of the six liquid ejecting heads 2 supported by the support body 10 corresponds to the "first liquid ejecting head."

The support body 10 is disposed in the −X direction with respect to the center of the base portion 20 in the +X direction. That is, the support hole 21 of the base portion 20 is disposed in the −X direction with respect to the center in the +X direction.

The rotation shaft member 30 is fixed to the end portion of the support hole 21 in the +X direction such that the +Y direction is the shaft direction. In addition, the end portion of the support body 10 in the +X direction is provided with the through-hole 13 into which the rotation shaft member 30 is inserted in the +Y direction. Therefore, the support body 10 is provided to be rotatable about a rotation shaft extending in the +Y direction at the end portion in the +X direction. That is, the base portion 20 is disposed in the −X direction with respect to the operator 100 performing the maintenance of the liquid ejecting head 2, and the rotation shaft is disposed in the +X direction with respect to the center of the support body 10 in the +X direction in the printing posture.

Further, at least one liquid ejecting head 2 other than the liquid ejecting head 2 supported by the support body 10 is directly supported on the base portion 20. In the present embodiment, the six liquid ejecting heads 2 are directly supported by the base portion 20. The fact that the liquid ejecting head 2 is directly supported by the base portion 20 also includes the fact that the liquid ejecting head 2 is fixed to the base portion 20 via another member that does not rotate and move. The six liquid ejecting heads 2 supported by the base portion 20 are positioned in the +X direction with respect to the first support body 10 of the base portion 20. The base portion 20 is provided with a second holding hole 25 penetrating in the +Z direction in order to directly hold the liquid ejecting head 2. The second holding hole 25 is provided independently for each of the liquid ejecting heads 2. It is needless to say that the second holding hole 25 may be provided in common to the plurality of liquid ejecting heads 2. Further, the base portion 20 is provided with a third fixing hole 26 which is a female screw into which the screw 116, into which the first fixing hole 115 of the liquid ejecting head 2 is inserted, is screwed.

At the time of printing, the support unit 7 can take a printing posture in which the nozzle surface 2a of the liquid ejecting head 2 is the direction along the XY plane, as illustrated in FIG. 28. Further, at the time of maintenance, the support unit 7 can take an inclined posture in which only the liquid ejecting head 2 supported by the support body 10 is rotated, as illustrated in FIG. 29. In the printing posture, a distance L4 between the operator 100 and the liquid ejecting head 2 disposed in the −X direction is closer than the distance $L_B$ in the printing posture, and the maintenance work of the liquid ejecting head 2 positioned in the −X direction far from the operator 100 can be easily performed. Further, in the inclined posture, since the support body 10 is inclined in the direction facing the operator 100 in the X-axis direction, the operator 100 can easily visually recognize the liquid ejecting head 2, and the maintenance work of the liquid ejecting head 2 positioned in the −X direction far from the operator 100 can be easily performed. Incidentally, in the inclined posture, the liquid ejecting head 2 positioned in the +X direction close to the operator 100 is not inclined, but the distance between the operator 100 and the liquid ejecting head 2 is short and the liquid ejecting head 2 is easily visually recognized. Therefore, it is easier to perform the maintenance work of the liquid ejecting head 2 as compared with the liquid ejecting head 2 which is far from the operator 100.

Further, in the present embodiment, since the support body 10 supports and rotates only some of the liquid ejecting heads 2, the size that supports all the liquid ejecting heads 2 becomes unnecessary, and the size can be reduced. Therefore, the space for rotating the support body 10 in the Z-axis direction can be made relatively small, and the size of the liquid ejecting apparatus 1 in the Z-axis direction can be reduced.

In the present embodiment, one support body 10 is rotatably provided with respect to the base portion 20, but the present embodiment is not limited to this. The plurality of support bodies 10 may be rotatably provided with respect to the base portion 20. Further, the number of liquid ejecting heads 2 supported by one support body 10 may be one.

Other Modification Examples

Although each embodiment of the present disclosure has been described above, the basic configuration of the present disclosure is not limited to the above embodiments.

In each of the above-described embodiments, the protrusion portion 23 is provided as the restriction mechanism 22 such that the end portion of the support body 10 in the −X direction does not move in the +Z direction, but the configuration of the restriction mechanism 22 is not particularly limited to this. A modification example of the restriction mechanism 22 will be described with reference to FIGS. 30 to 37.

Figure 30:
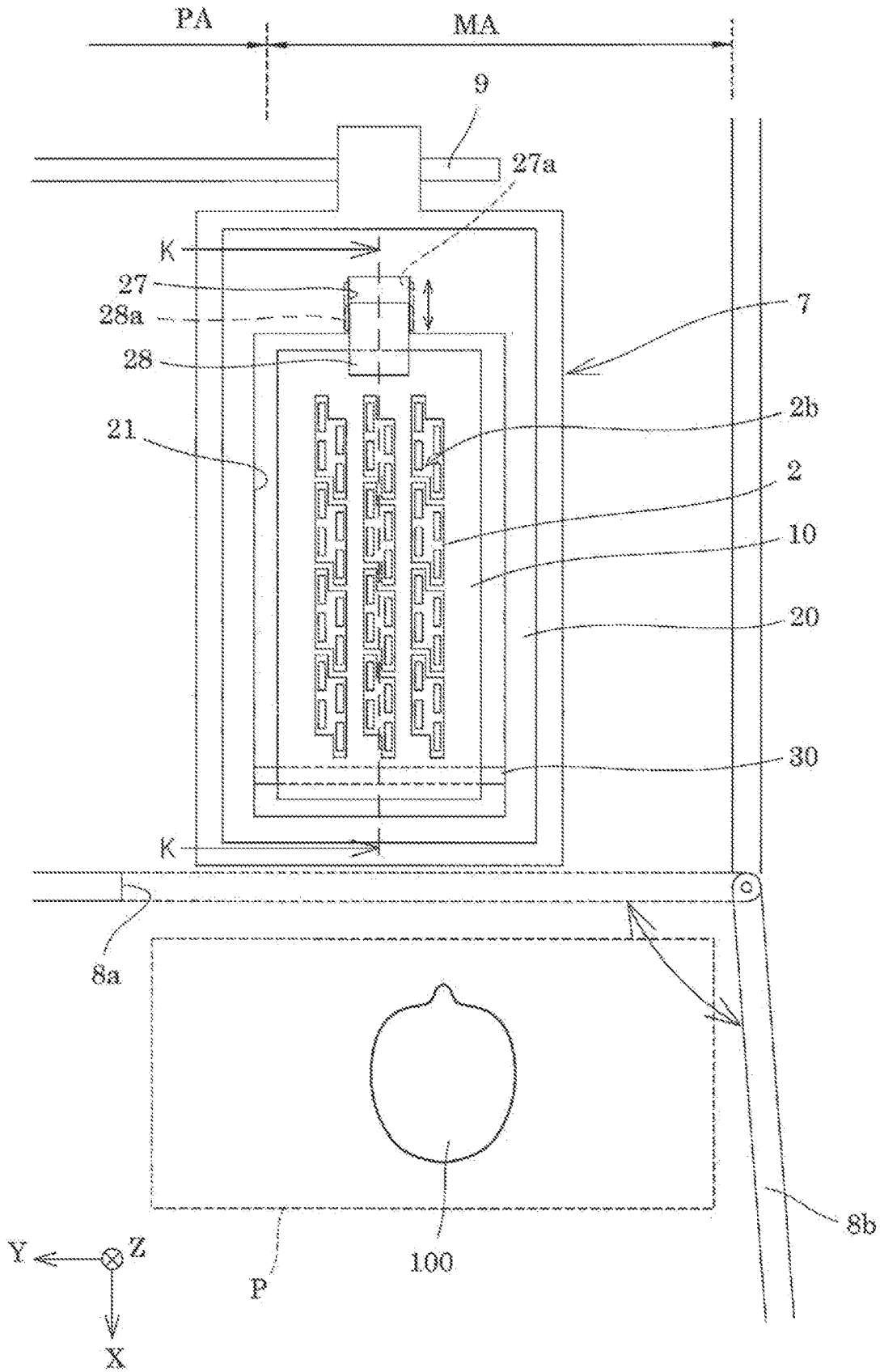
FIG. 30 is a plan view of a main portion of a liquid ejecting apparatus illustrating a modification example of a restriction mechanism.
Figure 31:
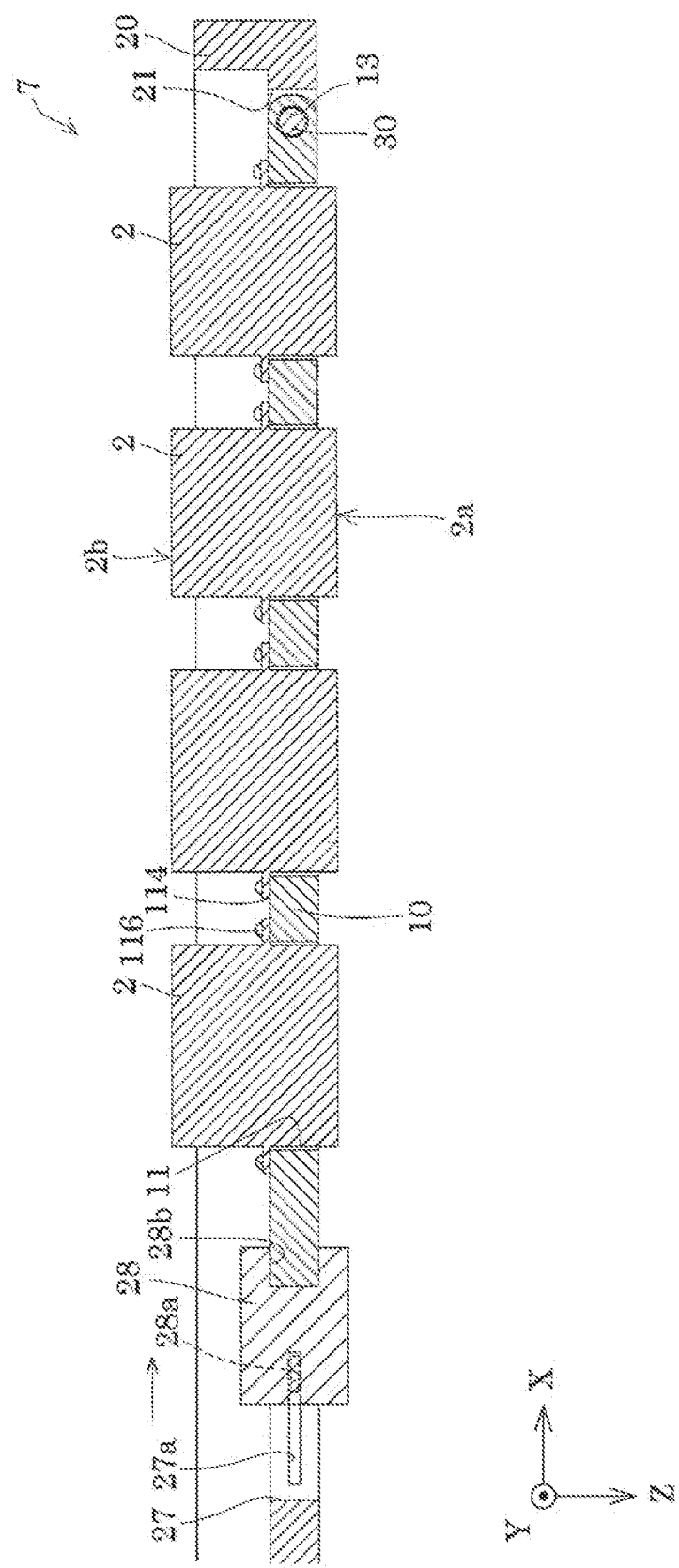
FIG. 31 is a sectional view of a main portion of the liquid ejecting apparatus illustrating a modification example of the restriction mechanism.
Figure 32:
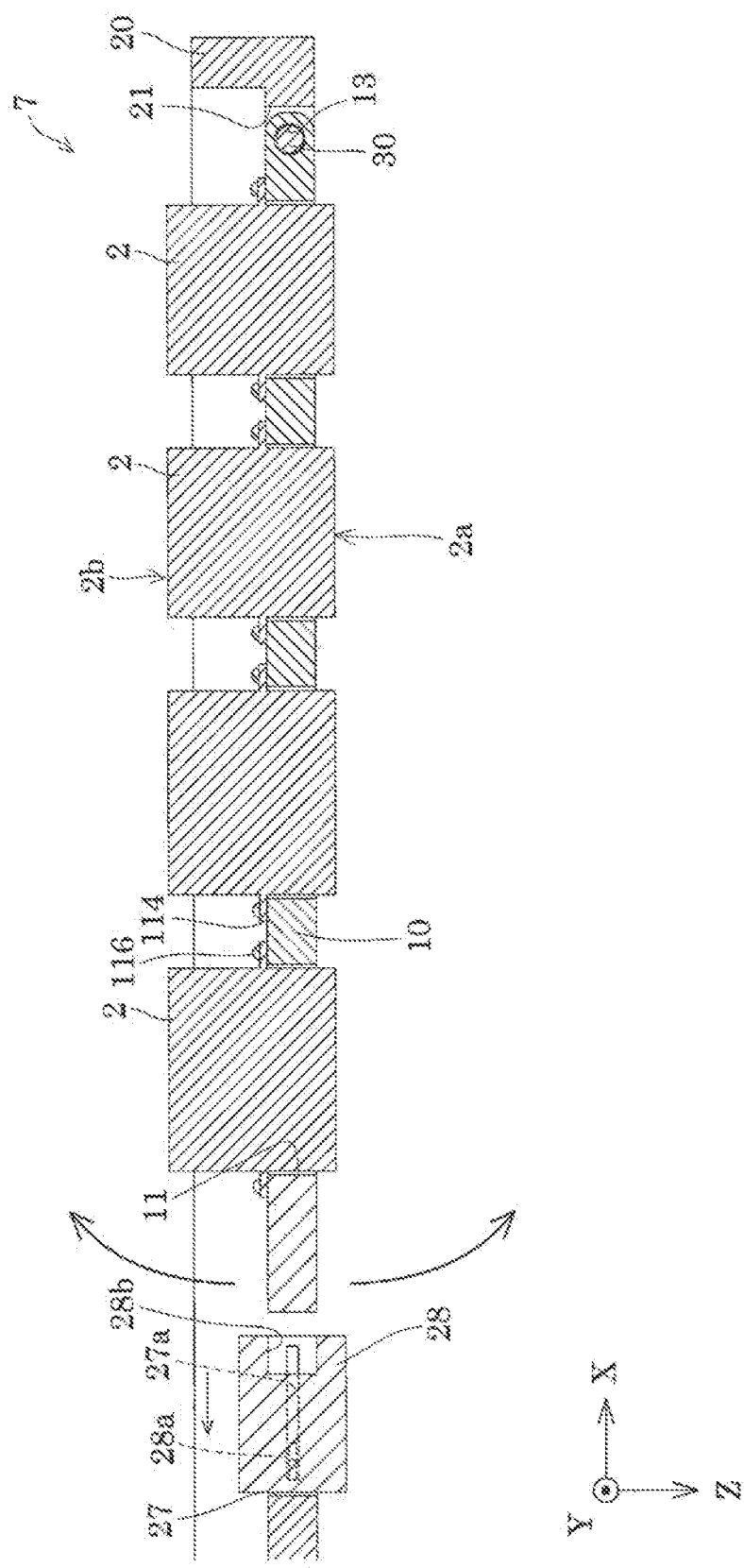
FIG. 32 is a sectional view of a main portion of the liquid ejecting apparatus illustrating a modification example of the restriction mechanism.
Figure 33:
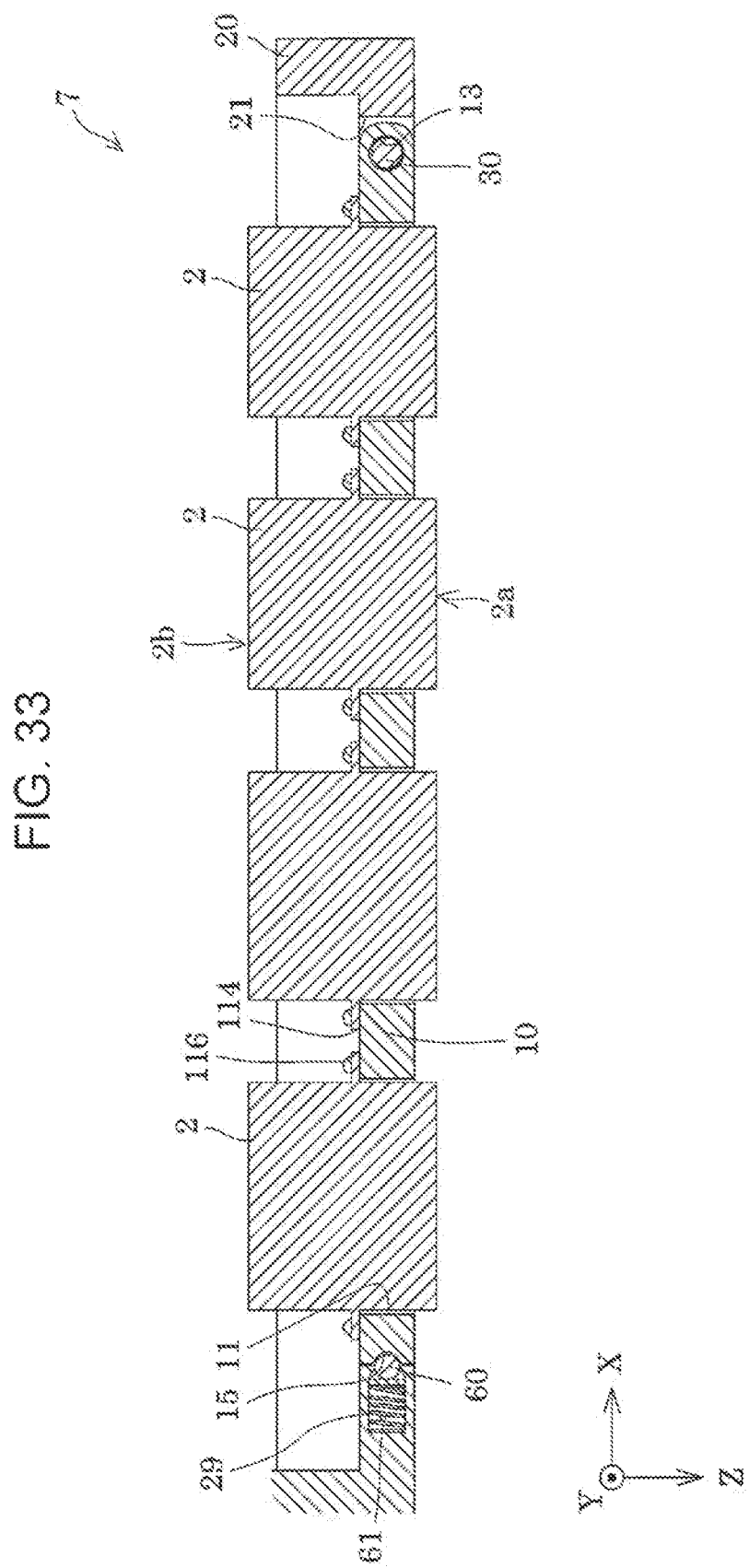
FIG. 33 is a sectional view of a main portion of the liquid ejecting apparatus illustrating a modification example of the restriction mechanism.
Figure 34:
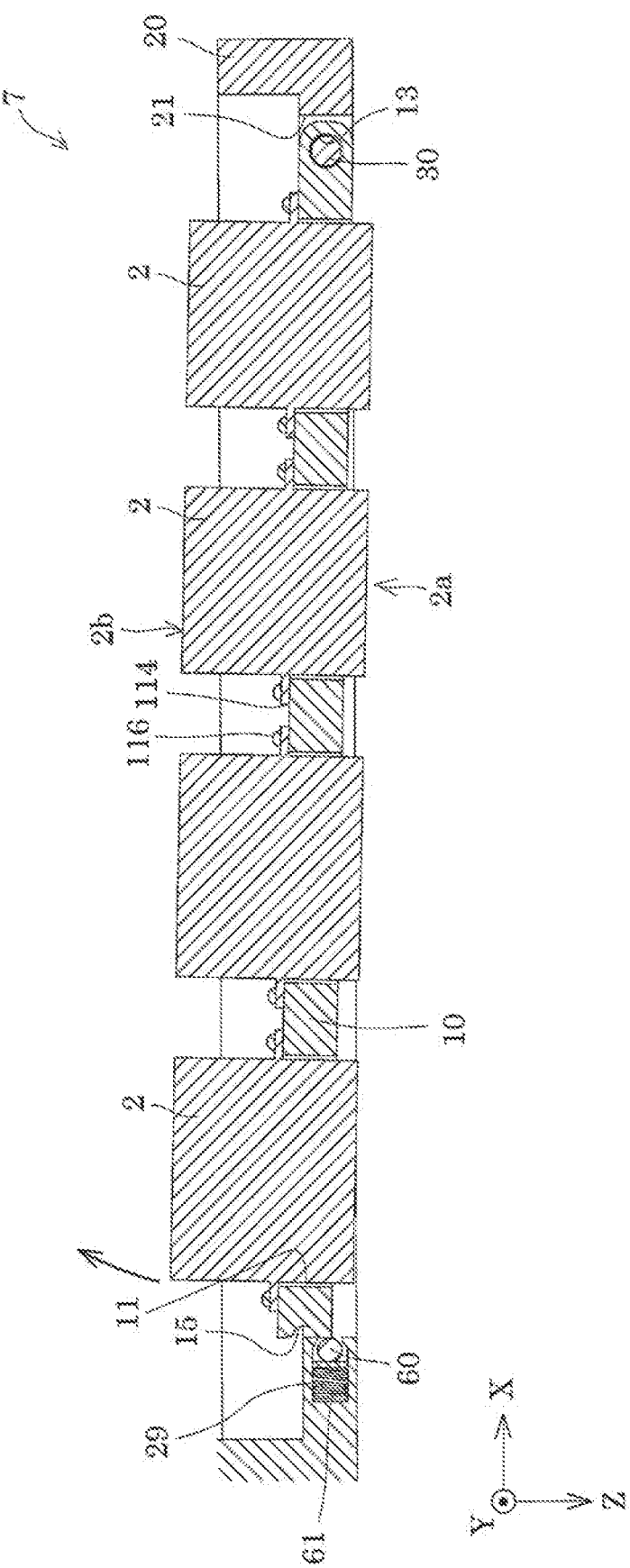
FIG. 34 is a sectional view of a main portion of the liquid ejecting apparatus illustrating a modification example of the restriction mechanism.
Figure 35:
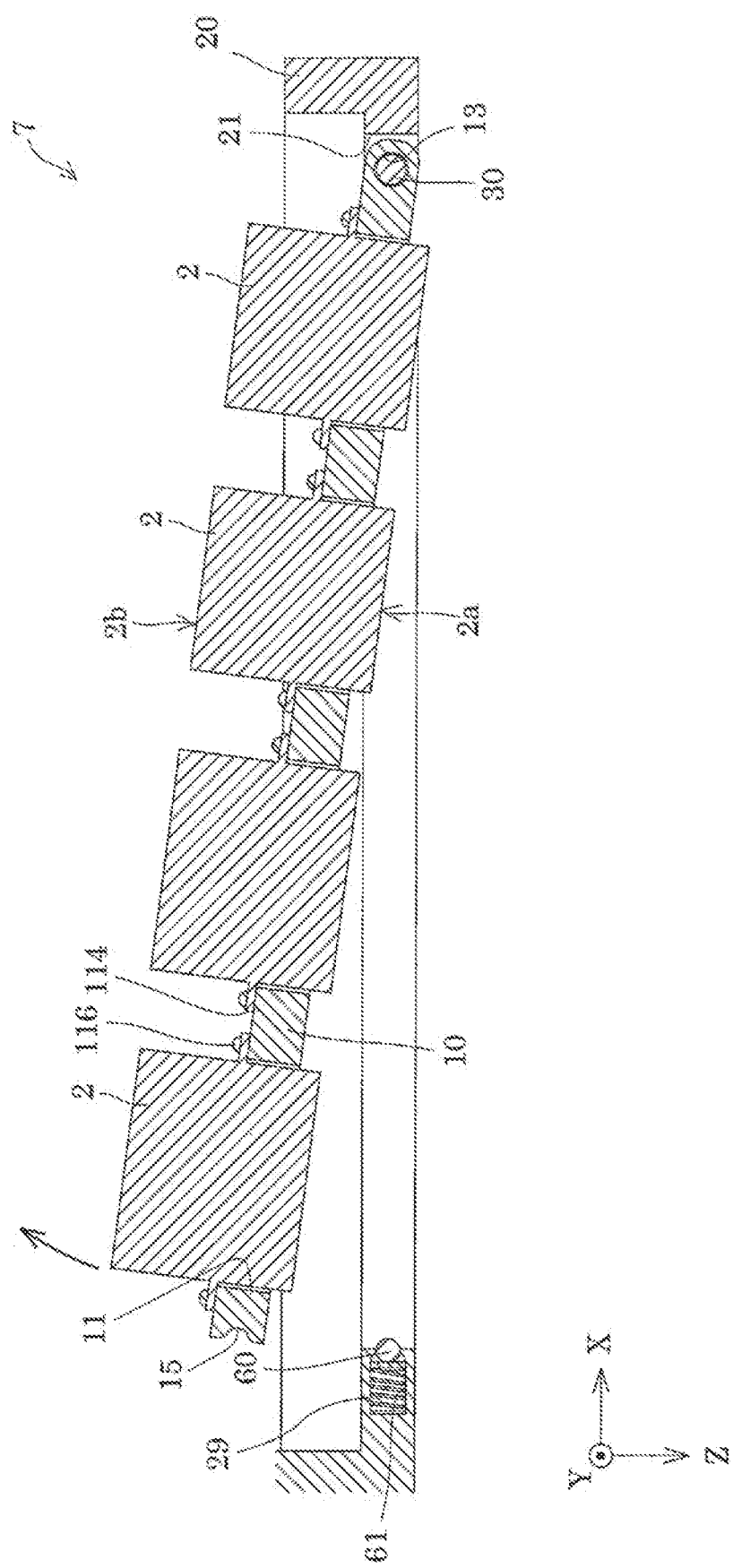
FIG. 35 is a sectional view of a main portion of the liquid ejecting apparatus illustrating a modification example of the restriction mechanism.
Figure 36:
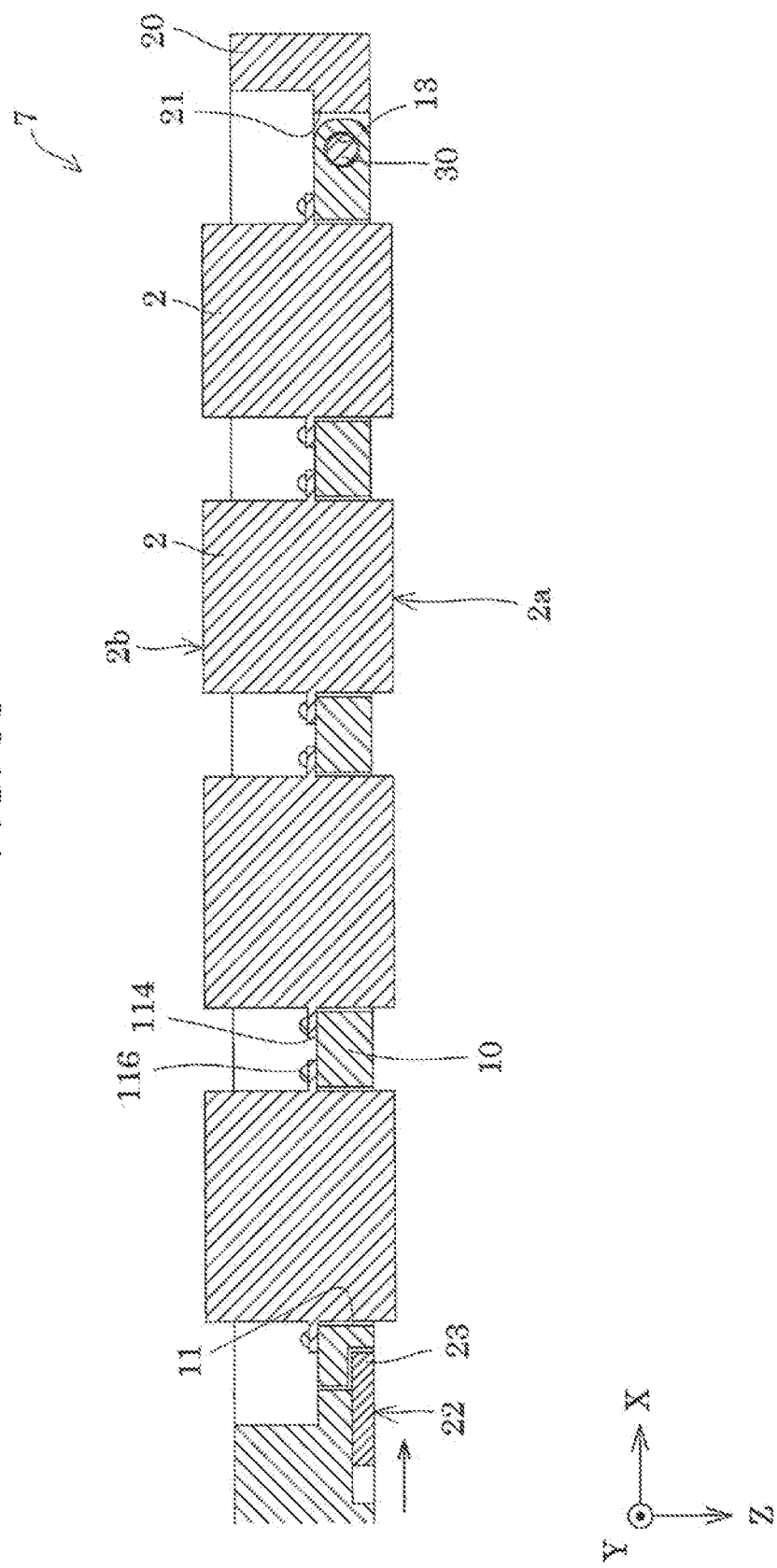
FIG. 36 is a sectional view of a main portion of the liquid ejecting apparatus illustrating a modification example of the restriction mechanism.
Figure 37:
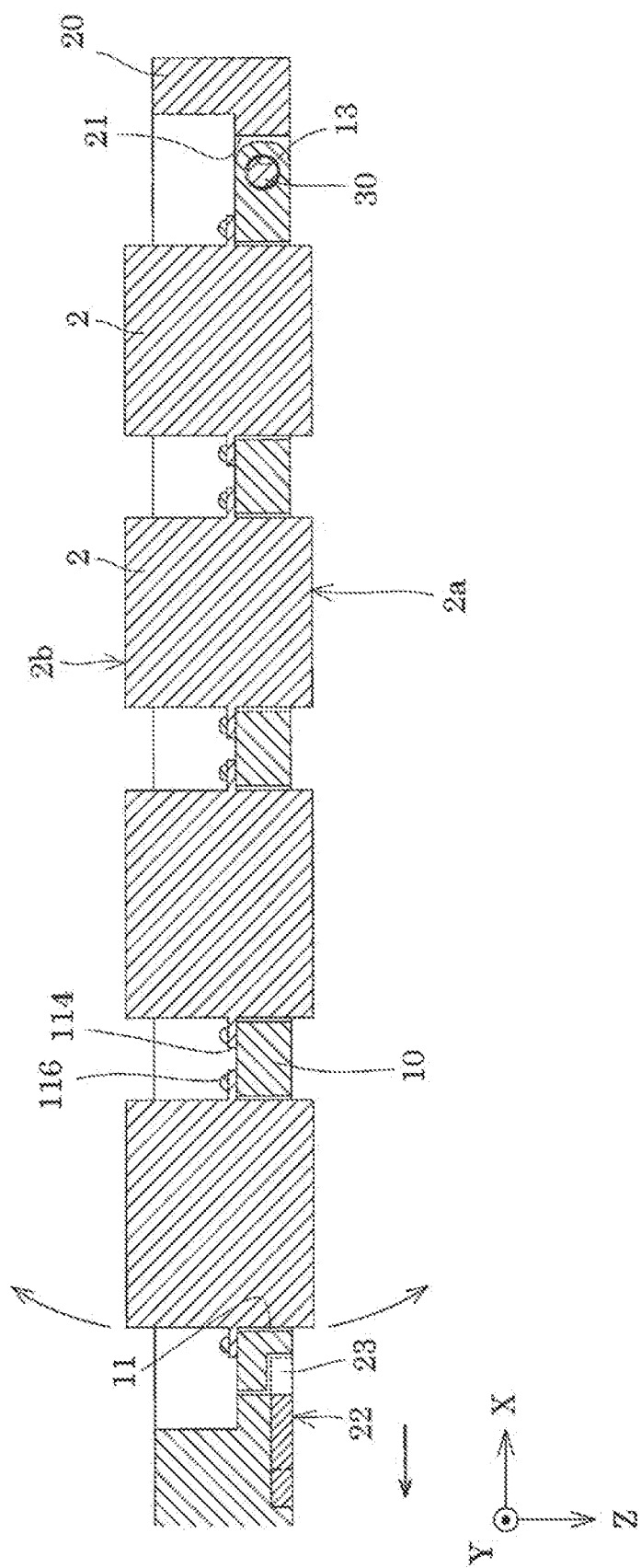
FIG. 37 is a sectional view of a main portion of the liquid ejecting apparatus illustrating a modification example of the restriction mechanism.

FIG. 30 is a plan view of a main portion of the liquid ejecting apparatus 1 for explaining a modification example of the restriction mechanism 22 when viewed in the +Z direction. FIG. 31 is a sectional view taken along the line K-K of FIG. 30 and is a view illustrating a restricted state by the restriction mechanism 22. FIG. 32 is a sectional view taken along the line K-K of FIG. 30 and is a view illustrating a non-restricted state by the restriction mechanism 22. FIG. 33 is a sectional view of the support unit 7 taken along the line K-K, and is a view illustrating a restricted state. FIG. 34 is a sectional view of the support unit 7 taken along the line K-K, and is a view illustrating a non-restricted state. FIG. 35 is a sectional view of the support unit 7 taken along the line K-K, and is a view illustrating a non-restricted state. FIG. 36 is a sectional view of the support unit 7 taken along the line K-K, and is a view illustrating a restricted state. FIG. 37 is a sectional view of the support unit 7 taken along the line K-K, and is a view illustrating a non-restricted state. In the modification examples illustrated in FIGS. 30 to 37, the "first direction" is the +Y direction, and the "second direction" is the +X direction.

As illustrated in FIGS. 30 to 33, the restriction mechanism 22 includes an opening portion 27 provided in the base portion 20, a restriction member 28 provided in the opening portion 27 to reciprocate along the X-axis direction.

Plate-shaped slide projections 28a are provided respectively on both side surfaces of the restriction member 28 in the Y-axis direction. Groove portions 27a into which the slide projections 28a are inserted are provided along the X-axis direction on the inner surfaces of the opening portion 27 on both sides in the Y-axis direction. By inserting the slide projection 28a into the groove portion 27a, the restriction member 28 can reciprocate along the X-axis direction in a state where the movement in the X-axis direction is restricted with respect to the base portion 20.

A recess portion 28b that fits to the support body 10 is provided at the end portion of the restriction member 28 in the +X direction. As illustrated in FIG. 31, the restriction member 28 moves in the +X direction with respect to the base portion 20, and accordingly, the recess portion 28b fits into the end portion of the support body 10 in the −X direction, and the end portion of the support body 10 in the −X direction is restricted from rotationally moving in the +Z direction and the −Z direction. In addition, as illustrated in FIG. 32, the restriction member 28 moves in the −X direction with respect to the base portion 20, and accordingly, the fitted state of the recess portion 28b into the end portion of the support body 10 in the −X direction is released, and the end portion of the support body 10 in the −X direction is allowed to rotationally move in the +Z direction and the −Z direction.

In this manner, in the printing posture, the restriction mechanism 22 restricts the rotational movement of the end portion of the support body 10 in the −X direction in the +Z direction and the −Z direction, and accordingly, the rotational movement of the support body 10 due to vibration or impact during printing can be suppressed. Further, at the time of maintenance, the restriction mechanism 22 releases the restriction on the rotational movement of the support body 10, and accordingly, the support body 10 can be in an inclined posture, and the maintenance work can be easily performed.

Further, as illustrated in FIGS. 33 to 35, the restriction mechanism 22 may be provided in the base portion 20 and may include a restriction hole 29 that opens on an inner surface of the support hole 21 in the −X direction, a pin 60 provided to be movable in the X-axis direction in the restriction hole 29, and a compression spring 61, which is provided in the restriction hole 29 and urges the pin 60 in the +X direction.

The support body 10 is provided with a recess portion 15 at a position facing the pin 60. As illustrated in FIG. 33, in the printing posture, the pin 60 is inserted into the recess portion 15 of the support body 10 to restrict the end portion of the support body 10 in the −X direction from moving in the +Z direction and the −Z direction.

As illustrated in FIG. 34, the pin 60 is moved in the −X direction by rotationally moving the support body 10 against the urging force of the compression spring 61. As a result, as illustrated in FIG. 35, the end portion of the support body 10 in the −X direction can be moved in the −Z direction. In FIG. 34, the end portion of the support body 10 in the −X direction is rotationally moved in the −Z direction, but the same applies to the rotational movement in the +Z direction.

Further, as illustrated in FIGS. 36 and 37, the protrusion portion 23 of the restriction mechanism 22 illustrated in Embodiment 1 may be movable in the X-axis direction. In the printing posture, as illustrated in FIG. 36, the protrusion portion 23 moves in the +X direction, thereby restricting the rotational movement of the end portion of the support body 10 in the −X direction in the +Z direction. As in Embodiments 1 to 5, in the state illustrated in FIG. 36, the rotational movement of the end portion of the support body 10 in the −X direction in the −Z direction is not restricted. Further, as illustrated in FIG. 37, by moving the protrusion portion 23 in the −X direction, rotational movement of the end portion of the support body 10 in the −X direction in the +Z direction and the −Z direction is allowed.

The restriction mechanism 22 of FIGS. 30 to 37 is a mechanism obtained by changing the restriction mechanism 22 of Embodiment 1, but it is needless to say that the restriction mechanism can also be applied to the restriction mechanism 22 of other embodiments and the sub-restriction section 42. Further, by providing the restriction mechanism 22 illustrated in FIGS. 30 to 37, the support body 10 can be rotated in the +Z direction with respect to the base portion 20, that is, can be rotated in the "reverse direction." In other words, rotating the support body 10 is not limited to rotating the support body 10 in the −Z direction with respect to the base portion 20, but also includes rotating the support body 10 in the +Z direction. In other words, the inclined posture of the support body 10 may be a posture in which the nozzle surface 2a of the liquid ejecting head 2 faces the operator 100, that is, the opening portion 8a. Incidentally, by rotating the support body 10 in the +Z direction with respect to the base portion 20, the operator 100 can easily access the nozzle surface 2a side and perform maintenance on the nozzle surface 2a side such as cleaning the nozzle surface 2a. Further, when the liquid ejecting head 2 is attached and detached on the surface side of the support body 10 facing the +Z direction in the printing posture, by rotating the support body 10 in the +Z direction with respect to the base portion 20, the maintenance such as replacement work of the liquid ejecting head 2 and fastening work with the screw 116 can be performed. Further, the support body 10 is provided to be rotatable in the forward direction and the reverse direction, and accordingly, even when the screw 116 for fixing the liquid ejecting head 2 and the support body 10 is provided on any of a surface of the support body 10 facing the +Z direction or a surface facing the −Z direction, the work of attaching and detaching the screw 116 can be easily performed. Further, even when the flow path coupling section 112 and the electrical coupling section 113 and the nozzle surface 2a in the liquid ejecting head 2 are provided on different surfaces, the maintenance such as the work of attaching and detaching the flow path member and the electrical wiring member, or the work of wiping the nozzle surface 2a can be easily performed. Similarly, rotating the sub-support body 40 is not limited to rotating the sub-support body 40 in the −Z direction with respect to the support body 10, but also includes rotating the sub-support body 40 in the +Z direction.

Figure 38:
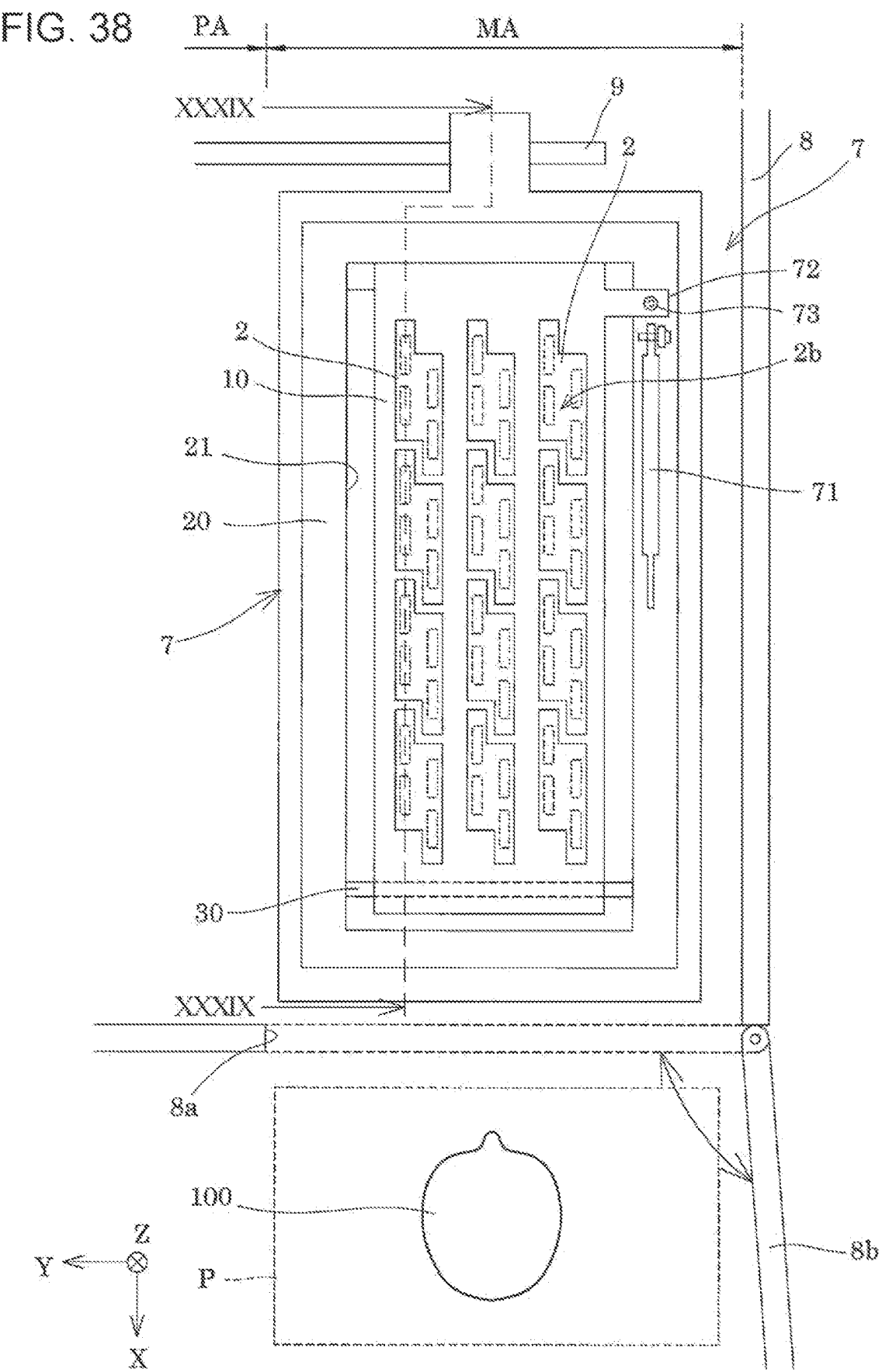
FIG. 38 is a plan view of a main portion of the liquid ejecting apparatus describing a holding mechanism.
Figure 39:
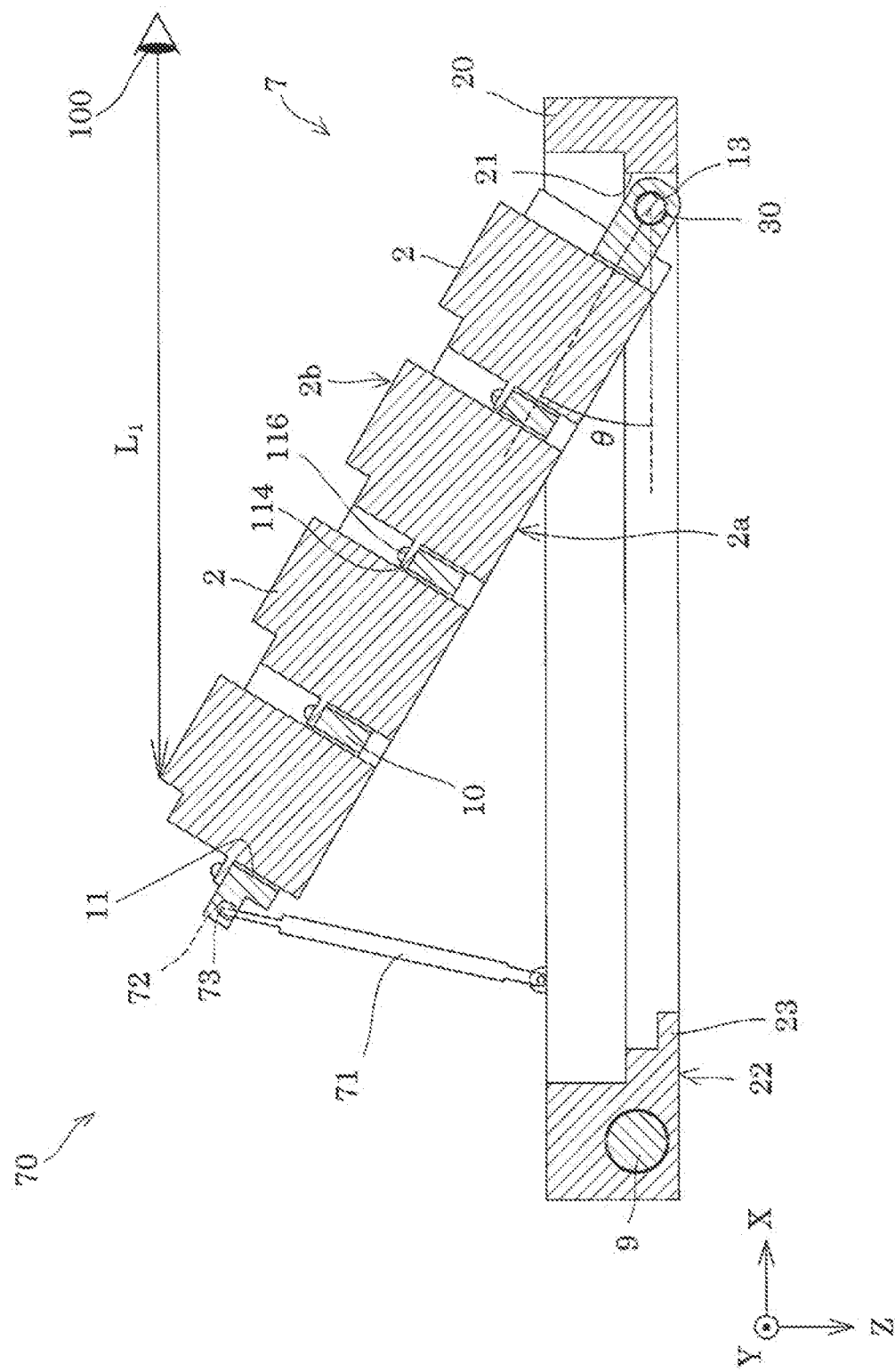
FIG. 39 is a sectional view of a main portion of the liquid ejecting apparatus describing the holding mechanism.

In addition, the liquid ejecting apparatus 1 of each of the above-described embodiments may have a holding mechanism for holding the rotated inclined posture of the support body 10. Here, a configuration in which the holding mechanism 70 is provided in the support unit 7 of Embodiment 1 will be described with reference to FIGS. 38 and 39. FIG. 38 is a plan view of a main portion in which the holding mechanism 70 is provided in the liquid ejecting apparatus 1 of Embodiment 1 when viewed in the +Z direction. FIG. 39 is a sectional view taken along the line XXXIX-XXXIX of FIG. 38 and is a view illustrating an inclined posture. In FIGS. 38 and 39, the "first direction" is the +Y direction, the "second direction" is the +X direction, the support body 10 is the "first support body," and any one of the plurality of liquid ejecting heads 2 supported by the support body 10 is the "first liquid ejecting head."

As illustrated in the drawing, the holding mechanism 70 includes a holding member 71 provided on the base portion 20, a projection portion 72 protruding from the support body 10 in the −Y direction, and a recess portion 73 which is provided on the surface of the projection portion 72 in the +Z direction and into which the end portion of the holding member 71 is inserted.

The holding member 71 is made of a rod-shaped member, and a base end portion is rotatably provided on the surface of the base portion 20 in the −Z direction.

As illustrated in FIG. 39, in the holding member 71, in a state where the support body 10 is rotated with respect to the base portion 20, the holding member 71 is rotated with respect to the base portion 20, and the tip end thereof is inserted into the recess portion 73 provided on the surface of the projection portion 72 in the +Z direction. As a result, the holding member 71 restricts the rotational movement of the end portion of the support body 10 in the −X direction in the +Z direction. That is, the support body 10 is maintained in an inclined state by the holding mechanism 70. That is, the holding mechanism 70 functions as a "restriction member" that restricts the rotation of the support body 10 about the rotation shaft.

An inclination angle θ of the inclined posture with respect to the printing posture of the support body 10 by the holding mechanism 70 is preferably +15 degrees or more and +75 degrees or less when the rotational movement of the support body 10 in the −Z direction with respect to the base portion 20 is expressed as positive. The inclination angle θ is more preferably +30 degrees or more and +60 degrees or less, and even more preferably +40 degrees or more and +50 degrees or less.

By setting the inclination angle θ of the inclined posture to the above range, it is possible to suppress falling of the liquid ejecting head 2 when the fixing between the liquid ejecting head 2 and the support body 10 is released. Further, when the nozzle surface 2a is wiped, it is possible to suppress the dripping of ink from the nozzle surface 2a.

Further, by setting the inclination angle θ in the above range, it is possible to suppress the arrangement of the liquid ejecting head 2 at a high position and a low position with respect to the base portion 20, and to easily perform the maintenance work. Further, by setting the inclination angle θ to the above range, it is not necessary to rotate the support body 10 at a large inclination angle, and thus the space for rotating the support body 10 in the +Z direction can be reduced. Further, by setting the inclination angle θ in the above range, it is possible to suppress the difficulty in performing the maintenance work due to the inclination angle being extremely low.

The holding mechanism 70 is not particularly limited thereto, and may have the same configuration as the restriction mechanism 22 illustrated in FIGS. 30 to 37 described above. That is, by providing the restriction mechanism 22 illustrated in FIGS. 30 to 37 at an appropriate position as the holding mechanism, the support body 10 can be held in an inclined posture rotated in the +Z direction with respect to the base portion 20. When the inclination angle θ for rotating the support body 10 in the +Z direction with respect to the base portion 20 is expressed as negative, the inclination angle θ is preferably −15 degrees or less and −75 degrees or more, and more preferably −30 degrees or less and −60 degrees or more, and more preferably −40 degrees or less and −50 degrees or more. The same effect as described above is obtained even in the rotation in the negative direction. Furthermore, it is preferable that the inclination angle of the support body 10 and the inclination angle of the sub-support body 40 in embodiments and modification examples other than Embodiment 1 be in the same range.

Further, by providing the holding mechanism 70, the holding mechanisms 70 of the first support body 10A and the second support body 10B which are provided in parallel in the +X direction in the above-described Modification Example 2 of Embodiment 2, Embodiment 3 or the like may respectively make the inclination angles different. Furthermore, by providing the holding mechanism 70, the holding mechanisms 70 of each of the plurality of sub-support bodies 40 which are provided in parallel in the +X direction in the above-described Embodiment 4 or the like may make the inclination angles different.

Figure 40:
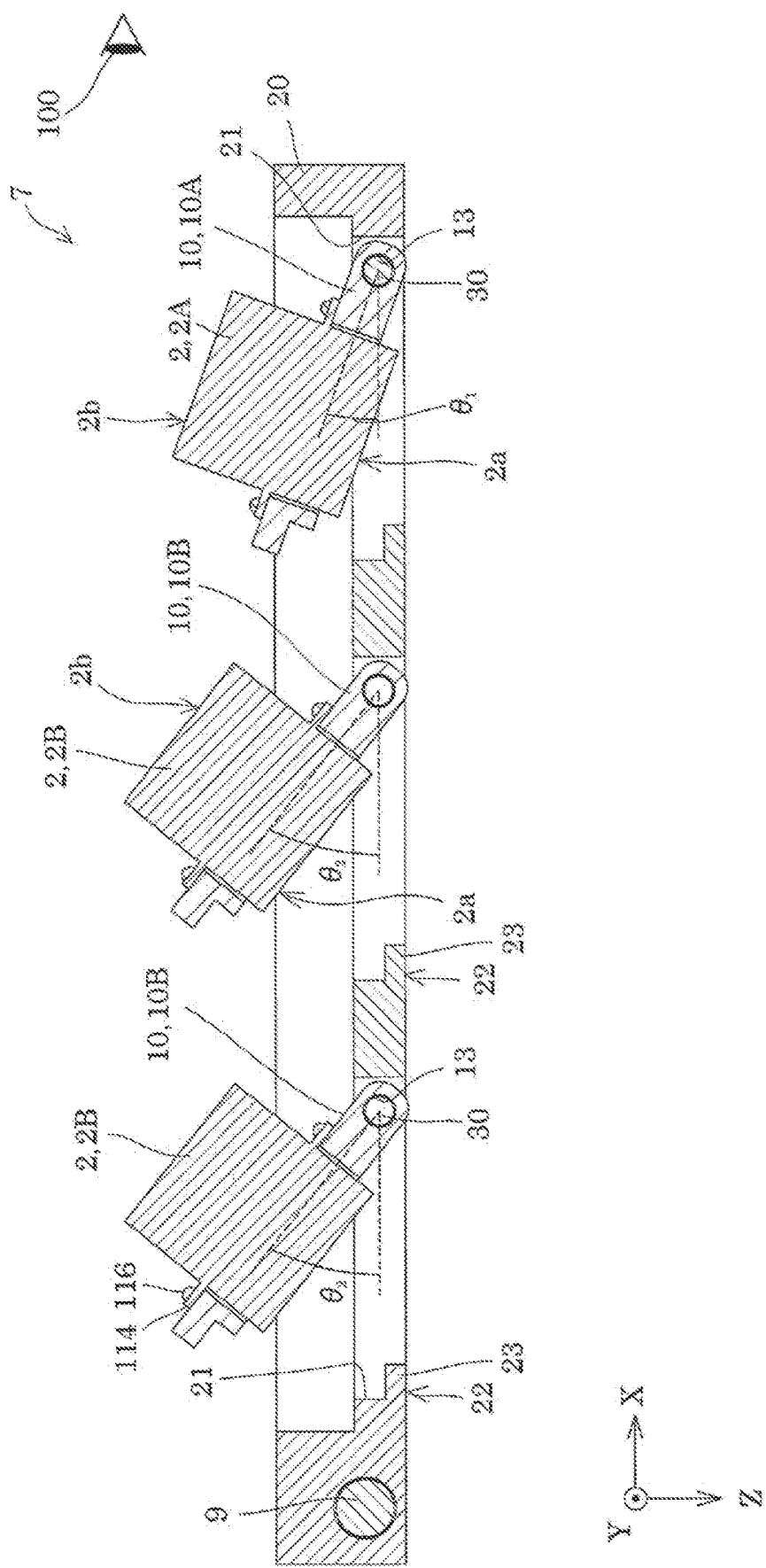
FIG. 40 is a sectional view of a main portion of a modification example of the liquid ejecting apparatus according to Embodiment 2.

Here, a modification example of Embodiment 2 will be described with reference to FIG. 40. FIG. 40 is a sectional view of a main portion illustrating Modification Example 2 of Embodiment 2.

As illustrated in FIG. 40, the first support body 10A and the second support body 10B have the same arrangement as Modification Example 2 of Embodiment 2 described above. That is, among the three support bodies 10 provided in parallel in the +X direction, the support body 10 positioned most in the +X direction is taken as an example of the "first support body 10A," and the support body 10 at the center is taken as an example of the "second support body 10B." Further, in the example illustrated in FIG. 40, the support body 10 positioned most in the −X direction is also taken as an example of the "second support body 10B." Although not illustrated in FIG. 40, the holding mechanisms 70 are provided in each of the first support body 10A and the second support body 10B.

An inclination angle $\theta_2$ in the inclined posture with respect to the printing posture of the second support body 10B supported by the holding mechanism 70 is larger than an inclination angle $\theta_1$ in the inclined posture with respect to the printing posture of the first support body 10A. That is, the inclination angle $\theta_2$ of the second support body 10B and the inclination angle $\theta_1$ of the first support body 10A satisfy the relationship of $\theta_2 > \theta_1$. In this manner, by setting $\theta_2 > \theta_1$, the second support body 10B far from the operator 100 can be brought closer to the operator 100, and it is possible to make it easier for the operator 100 to visually recognize the liquid ejecting head 2 supported by the second support body 10B. Therefore, maintenance of the liquid ejecting head 2 supported by the second support body 10B can be easily performed. Further, by making the inclination angle $\theta_1$ of the first support body 10A smaller than the inclination angle $\theta_2$ of the second support body 10B, the liquid ejecting head 2 supported by the second support body 10B is less likely to be hidden behind the first support body 10A, and the visibility of the liquid ejecting head 2 supported by the second support body 10B is improved to easily perform the maintenance work. It is needless to say that, since the first support body 10A is also in an inclined posture rotated with respect to the base portion 20, the maintenance work of the liquid ejecting head 2 supported by the first support body 10A can be easily performed. The same applies when the first support body 10A and the second support body 10B are rotationally moved in the +Z direction with respect to the base portion 20. It is needless to say that the inclination angles $\theta_1$ and $\theta_2$ may have the opposite relationship. That is, the inclination angle $\theta_1$ of the first support body 10A may be larger than the inclination angle $\theta_2$ of the second support body 10B, that is, the relationship of $\theta_1 > \theta_2$ may be satisfied. The configuration described here can also be applied to Embodiment 3, Embodiment 4, and the like.

Further, in each of the above-described embodiments, the opening portion 8a is disposed on the surface of the housing 8 facing the +X direction, but the present disclosure is not particularly limited thereto. For example, as illustrated in FIG. 41, the opening portion 8a may be provided on the surface of the housing 8 facing the −Y direction. In this case, the operator 100 performs work with the −Y direction of the housing 8 as the work position P. Therefore, the support body 10 is provided to be rotatable about a rotation shaft that coincides with the rotation shaft member 30 extending in the +X direction with respect to the base portion 20. That is, in the configuration illustrated in FIG. 41, the "first direction" is the +X direction, and the "second direction" is the −Y direction. Even with such a configuration, the same effect as that of the above-described Embodiment 1 can be achieved.

Further, in each of the above-described embodiments, the +Z direction is the gravity direction, and the X-axis direction and the Y-axis direction orthogonal to the Z-axis direction are directions along the horizontal plane, but the present disclosure is not limited thereto. For example, the +Z direction may be a substantially gravity direction. Here, the substantially gravity direction means that an angle formed with the gravity direction is within 15 degrees. That is, the XY plane perpendicular to the Z-axis direction may be substantially parallel to the horizontal plane. In other words, the printing posture of the support body 10, the base portion 20, the sub-support body 40, and the like may be a substantially horizontal posture. Further, the "ejection direction" may be a direction opposite to the +Z direction, that is, a −Z direction. Even with such a configuration, the same effect as that of each of the above-described embodiments can be achieved.

Further, in each of the above-described embodiments, the rotational operation of the support body 10 and the sub-support body 40 from the printing posture to the inclined posture may be executed by driving a driving source (not illustrated) controlled by the control unit 4.

In addition, in each of the above-described embodiments, when the number of liquid ejecting heads 2 aligned in the +X direction is m (m is a natural number of 2 or more) and the number of liquid ejecting heads 2 aligned in the +Y direction is n (n is a natural number of 2 or more) in the support unit 7, the relationship of m=n may be satisfied.

In each of the above-described embodiments, the serial type liquid ejecting apparatus 1 in which the support unit 7 supporting the liquid ejecting head 2 is caused to reciprocate is exemplified, but it is also possible to apply the present disclosure to a line type liquid ejecting apparatus in which the plurality of nozzles N are distributed over the entire width of the medium S. In other words, the support unit 7 that holds the liquid ejecting head 2 is not limited to the serial type support unit 7, and may be a structure that supports the liquid ejecting head 2 in a line type. In this case, for example, the plurality of the liquid ejecting heads 2 are aligned in the width direction of the medium S, and the plurality of liquid ejecting heads 2 are held by one support unit 7.

Furthermore, the present disclosure is intended for general liquid ejecting apparatuses including a liquid ejecting head, and is also applicable to a liquid ejecting apparatus including a color material ejecting head used for manufacturing a color filter for a liquid crystal display or the like, an electrode material ejecting head used for forming electrodes for an organic EL display or a field emission display (FED), and a bioorganic material ejecting head used for manufacturing a bio chip, in addition to the recording head such as an ink jet type recording head.

What is claimed is:
1. A liquid ejecting apparatus comprising:
   liquid ejecting heads including a first liquid ejecting head configured to eject a liquid in an ejection direction; and
   a support unit including a first support body that supports the first liquid ejecting head and a base portion that supports the first support body, wherein
   the first support body is rotatable about a rotation shaft extending in a first direction orthogonal to the ejection direction with respect to the base portion, the rotation shaft is disposed in a second direction orthogonal to both the first direction and the ejection direction when viewed in the ejection direction with respect to a center portion of the first support body, the first support body has first and second ends opposite to each other along the second direction, and the first support body is configured to rotate such that the first end of the first support body positions in a direction opposite to the ejection direction with respect to the second end of the first support body.

2. The liquid ejecting apparatus according to claim 1, wherein the liquid ejecting heads include a second liquid ejecting head, the support unit further includes a second support body that is supported by the base portion and supports the second liquid ejecting head, the second support body is rotatable about a rotation shaft extending in the first direction with respect to the base portion, and each of the first support body and the second support body is rotatable independently of the base portion.

3. The liquid ejecting apparatus according to claim 2, wherein the first support body supports a plurality of the liquid ejecting heads including the first liquid ejecting head, and the second support body supports a plurality of the liquid ejecting heads including the second liquid ejecting head.

4. The liquid ejecting apparatus according to claim 3, wherein the first support body and the second support body are aligned in the first direction when viewed in the ejection direction.

5. The liquid ejecting apparatus according to claim 4, wherein the support unit includes a rotation shaft member extending in the first direction, and the first support body and the second support body are rotatable about the rotation shaft member common to the base portion.

6. The liquid ejecting apparatus according to claim 4, wherein each of the first support body and the second support body is elongated in a along the second direction when viewed in the ejection direction, the base portion is disposed in a direction opposite to the second direction with respect to an operator performing maintenance of the liquid ejecting head, and the rotation shaft is disposed in the second direction with respect to a center of the base portion in the second direction.

7. The liquid ejecting apparatus according to claim 3, wherein the first support body and the second support body are aligned in the second direction when viewed in the ejection direction, the support unit includes a first rotation shaft member extending in the first direction and a second rotation shaft member extending in the first direction, the first support body is rotatable about the first rotation shaft member, and the second support body is rotatable about the second rotation shaft member.

8. The liquid ejecting apparatus according to claim 7, wherein each of the first support body and the second support body is elongated in the first direction when viewed in the ejection direction.

9. The liquid ejecting apparatus according to claim 2, wherein the first support body supports one of the first liquid ejecting heads, and the second support body supports one of the second liquid ejecting heads.

10. The liquid ejecting apparatus according to claim 1, wherein all of the liquid ejecting heads are supported by the first support body.

11. The liquid ejecting apparatus according to claim 10, wherein the first support body is elongated in the second direction.

12. The liquid ejecting apparatus according to claim 11, wherein the base portion is disposed in a direction opposite to the second direction with respect to an operator performing maintenance of the liquid ejecting head, and the rotation shaft is disposed in the second direction with respect to a center of the base portion in the second direction.

13. The liquid ejecting apparatus according to claim 12, wherein the support unit further includes a sub-support body supported by the first support body, the liquid ejecting heads include one or a plurality of the liquid ejecting heads directly supported by the first support body, and one or a plurality of the liquid ejecting heads indirectly supported by the first support body via the sub-support body by being directly supported by the sub-support body, and the sub-support body is rotatable about a rotation shaft extending in the first direction with respect to the first support body, and is disposed in a direction opposite to the second direction with respect to a center of the first support body in the second direction.

14. The liquid ejecting apparatus according to claim 10, wherein among the liquid ejecting heads, when the number of the liquid ejecting heads arranged in the second direction is m (m: a natural number of 2 or more), and the number of the liquid ejecting heads arranged in the first direction is n (n: a natural number of 1 or more), m>n.

15. The liquid ejecting apparatus according to claim 1, wherein at least one of the liquid ejecting heads other than the first liquid ejecting head is directly supported by the base portion.

16. The liquid ejecting apparatus according to claim 1, wherein the first support body is rotatable about the rotation shaft both in a forward direction and in a reverse direction with respect to a printing posture which is a posture of the first support body when performing a printing operation of ejecting the liquid from the first liquid ejecting head toward a medium.

17. The liquid ejecting apparatus according to claim 1, wherein the first support body is configured to hold a posture which is rotated within at least one of a range of +15 degrees or more and +75 degrees or less and a range of −15 degrees or less and −75 degrees or more assuming that the rotation in a direction opposite to the ejection direction is positive, with respect to a printing posture which is a posture of the first support body when performing a printing operation of ejecting the liquid from the first liquid ejecting head toward a medium.

18. The liquid ejecting apparatus according to claim 1, wherein the first liquid ejecting head has an upper surface facing a direction opposite to the ejection direction, the base portion is disposed in a direction opposite to the second direction with respect to an operator performing maintenance of the first liquid ejecting head, and the posture of the first support body when the operator performs the maintenance is a posture in which the upper surface of the first liquid ejecting head faces the operator performing the maintenance.

19. The liquid ejecting apparatus according to claim 1, further comprising:

a restriction member that restricts the first support body from rotating about the rotation shaft with respect to the base portion.

20. A liquid ejecting apparatus comprising:

liquid ejecting heads including a first liquid ejecting head configured to eject a liquid in an ejection direction; and a support unit including a first support body that supports the first liquid ejecting head and a base portion that supports the first support body, wherein the first support body is rotatable about a rotation shaft of the rotation shaft member extending in a first direction orthogonal to the ejection direction with respect to the base portion, and the rotation shaft member is disposed at a center portion of the first support body in a second direction orthogonal to the first direction when viewed in the ejection direction.

* * * * *